(12) United States Patent
McCormack et al.

(10) Patent No.: US 9,645,650 B2
(45) Date of Patent: May 9, 2017

(54) USE OF TOUCH AND GESTURES RELATED TO TASKS AND BUSINESS WORKFLOW

(71) Applicant: Microsoft Technology Licensing, LLC, Redmond, WA (US)

(72) Inventors: Michael J. McCormack, Snohomish, WA (US); Ramanathan Ananthanarayan Pallassana, Sammamish, WA (US); Anastasia Paushkina, Redmond, WA (US); Wayne C. Higgins, Seattle, WA (US); Ted A. Cyrek, Sammamish, WA (US); Christian Heydemann, Kirkland, WA (US); Ron Mondri, Bellevue, WA (US); Richard Lee Dickinson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 330 days.

(21) Appl. No.: 13/827,813

(22) Filed: Mar. 14, 2013

(65) Prior Publication Data

US 2013/0246913 A1  Sep. 19, 2013

Related U.S. Application Data

(62) Division of application No. 13/773,630, filed on Feb. 21, 2013.

(60) Provisional application No. 61/612,148, filed on Mar. 16, 2012.

(51) Int. Cl.
G06F 3/01     (2006.01)
G06F 3/0484   (2013.01)
G06F 3/0488   (2013.01)

(52) U.S. Cl.
CPC ............ *G06F 3/017* (2013.01); *G06F 3/0488* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 5,297,032 | A | 3/1994 | Trojan et al. |
| 5,321,750 | A | 6/1994 | Nadan |
| 5,339,392 | A | 8/1994 | Risberg et al. |

(Continued)

FOREIGN PATENT DOCUMENTS

WO    9926127 A1    5/1999

OTHER PUBLICATIONS

Wardley et al., "Next-Generation CRM: Driving Productivity with End-to-End Cloud Services", Retrieved at <<http://az26122.vo.msecnd.net/docs/NextGenCRM_DrivingProductivity(229357).pdf>>, Microsoft Dynamics CRM, Jul. 2011, 20 pages.

(Continued)

*Primary Examiner* — Stella E Higgs
(74) *Attorney, Agent, or Firm* — Christopher J. Volkmann; Kelly, Holt & Christenson PLLC

(57) ABSTRACT

A business data system generates a user interface display showing a business data record. The business data system receives a touch gesture user input to manipulate the business data record to perform an operation, a task or a workflow within the business data system. The business data system performs the operation, task or workflow based on the touch gesture user input.

14 Claims, 58 Drawing Sheets

(56) References Cited

U.S. PATENT DOCUMENTS

| | | | |
|---|---|---|---|
| 5,819,284 A | 10/1998 | Farber et al. | |
| 5,836,011 A | 11/1998 | Hambrick et al. | |
| 5,959,621 A | 9/1999 | Nawaz et al. | |
| 6,111,573 A | 8/2000 | McComb et al. | |
| 6,188,405 B1 | 2/2001 | Czerwinski et al. | |
| 6,216,141 B1 | 4/2001 | Straub et al. | |
| 6,278,448 B1 | 8/2001 | Brown et al. | |
| 6,311,058 B1 | 10/2001 | Wecker et al. | |
| 6,449,638 B1 | 9/2002 | Wecker et al. | |
| 6,456,334 B1 | 9/2002 | Duhault | |
| 6,510,553 B1 | 1/2003 | Hazra | |
| 6,724,403 B1 | 4/2004 | Santoro et al. | |
| 6,832,355 B1 | 12/2004 | Duperrouzel et al. | |
| 6,842,176 B2 | 1/2005 | Sang'udi et al. | |
| 6,976,210 B1 | 12/2005 | Silva et al. | |
| 7,028,264 B2 | 4/2006 | Santoro et al. | |
| 7,082,576 B2 | 7/2006 | Shahine et al. | |
| 7,216,351 B1 | 5/2007 | Maes | |
| 7,376,907 B2 | 5/2008 | Santoro et al. | |
| 7,895,522 B2 | 2/2011 | Wong et al. | |
| 7,933,632 B2 | 4/2011 | Flynt et al. | |
| 7,987,431 B2 | 7/2011 | Santoro et al. | |
| 8,176,096 B2 | 5/2012 | Allyn et al. | |
| 8,195,245 B2 | 6/2012 | Wang et al. | |
| 8,244,851 B1 | 8/2012 | Postoaca | |
| 8,601,019 B1 | 12/2013 | Weininger et al. | |
| 8,949,707 B2 | 2/2015 | Lee et al. | |
| 9,310,888 B2 | 4/2016 | Dickinson et al. | |
| 2002/0084991 A1* | 7/2002 | Harrison | G06F 3/0488 345/173 |
| 2004/0073571 A1 | 4/2004 | Kumhyr et al. | |
| 2004/0093343 A1* | 5/2004 | Lucas et al. | 707/102 |
| 2004/0122693 A1 | 6/2004 | Hatscher et al. | |
| 2004/0133413 A1 | 7/2004 | Beringer et al. | |
| 2004/0141508 A1 | 7/2004 | Schoeneberger et al. | |
| 2004/0162800 A1 | 8/2004 | Reid et al. | |
| 2004/0179042 A1 | 9/2004 | Bear et al. | |
| 2004/0210468 A1 | 10/2004 | Rubel et al. | |
| 2004/0230905 A1 | 11/2004 | Asakawa et al. | |
| 2004/0254805 A1 | 12/2004 | Schwerin-Wenzel et al. | |
| 2005/0075917 A1 | 4/2005 | Flores et al. | |
| 2005/0143124 A1 | 6/2005 | Kennedy et al. | |
| 2005/0183010 A1 | 8/2005 | Iwasaki | |
| 2005/0195217 A1 | 9/2005 | Robertson et al. | |
| 2006/0026502 A1* | 2/2006 | Dutta | 715/511 |
| 2006/0031178 A1 | 2/2006 | Lehrman et al. | |
| 2006/0075337 A1* | 4/2006 | Jones et al. | 715/530 |
| 2006/0080468 A1 | 4/2006 | Vadlamani et al. | |
| 2006/0085245 A1* | 4/2006 | Takatsuka | G06Q 10/0631 705/7.12 |
| 2006/0156247 A1* | 7/2006 | McCormack | G06F 3/0481 715/767 |
| 2006/0190833 A1 | 8/2006 | SanGiovanni et al. | |
| 2006/0235884 A1 | 10/2006 | Pfenninger et al. | |
| 2007/0074121 A1 | 3/2007 | Mullender et al. | |
| 2007/0100845 A1 | 5/2007 | Sattler et al. | |
| 2007/0211293 A1 | 9/2007 | Komamura | |
| 2008/0065675 A1 | 3/2008 | Bozich et al. | |
| 2008/0086265 A1 | 4/2008 | Heuser | |
| 2008/0229212 A1 | 9/2008 | Miyazaki | |
| 2009/0006948 A1* | 1/2009 | Parker | G06F 3/0483 715/255 |
| 2009/0070333 A1 | 3/2009 | Bailey | |
| 2009/0070409 A1 | 3/2009 | Clayton et al. | |
| 2009/0070744 A1 | 3/2009 | Taylor et al. | |
| 2009/0076878 A1 | 3/2009 | Woerner et al. | |
| 2009/0100321 A1 | 4/2009 | Singh et al. | |
| 2009/0125818 A1 | 5/2009 | Ritter et al. | |
| 2009/0171659 A1 | 7/2009 | Pearce et al. | |
| 2010/0070323 A1 | 3/2010 | Polcari et al. | |
| 2010/0082706 A1 | 4/2010 | Lim | |
| 2010/0088630 A1 | 4/2010 | Morris | |
| 2010/0100825 A1 | 4/2010 | Sharoni | |
| 2010/0114698 A1 | 5/2010 | Goel et al. | |
| 2010/0162171 A1 | 6/2010 | Felt et al. | |
| 2010/0302278 A1 | 12/2010 | Shaffer et al. | |
| 2010/0302595 A1 | 12/2010 | Yamada et al. | |
| 2010/0318921 A1 | 12/2010 | Trachtenberg et al. | |
| 2011/0078184 A1 | 3/2011 | Song et al. | |
| 2011/0087990 A1 | 4/2011 | Ng et al. | |
| 2011/0099042 A1 | 4/2011 | Yerkes | |
| 2011/0113348 A1 | 5/2011 | Twiss et al. | |
| 2011/0175826 A1* | 7/2011 | Moore et al. | 345/173 |
| 2011/0214067 A1 | 9/2011 | Tanaka | |
| 2011/0225547 A1 | 9/2011 | Fong et al. | |
| 2011/0275418 A1 | 11/2011 | Forstall et al. | |
| 2011/0283231 A1 | 11/2011 | Richstein et al. | |
| 2011/0296312 A1 | 12/2011 | Boyer et al. | |
| 2011/0307948 A1 | 12/2011 | Ranjan et al. | |
| 2011/0313805 A1 | 12/2011 | Heydemann et al. | |
| 2012/0030627 A1 | 2/2012 | Nurmi et al. | |
| 2012/0036204 A1* | 2/2012 | Cole | 709/206 |
| 2012/0047139 A1 | 2/2012 | Fitzer et al. | |
| 2012/0072260 A1* | 3/2012 | Graham et al. | 705/7.32 |
| 2012/0144309 A1 | 6/2012 | Zendler et al. | |
| 2012/0144320 A1 | 6/2012 | Mishra et al. | |
| 2012/0159355 A1 | 6/2012 | Fish et al. | |
| 2012/0168492 A1 | 7/2012 | Herbst et al. | |
| 2012/0192090 A1 | 7/2012 | Patterson et al. | |
| 2012/0254791 A1 | 10/2012 | Jackson et al. | |
| 2012/0265644 A1 | 10/2012 | Roa et al. | |
| 2012/0290351 A1 | 11/2012 | Bear et al. | |
| 2013/0007586 A1 | 1/2013 | Thomas | |
| 2013/0033523 A1 | 2/2013 | Stovicek et al. | |
| 2013/0154947 A1 | 6/2013 | Abrams et al. | |
| 2013/0159971 A1 | 6/2013 | Gieselmann et al. | |
| 2013/0167071 A1* | 6/2013 | Horiuchi | G06F 3/0484 715/789 |
| 2013/0167110 A1 | 6/2013 | Gross et al. | |
| 2013/0227461 A1 | 8/2013 | Berger et al. | |
| 2013/0241852 A1 | 9/2013 | McCormack et al. | |
| 2013/0241951 A1 | 9/2013 | Dickinson et al. | |
| 2013/0246111 A1 | 9/2013 | McCormack et al. | |
| 2013/0246930 A1 | 9/2013 | Paushkina et al. | |
| 2013/0286410 A1 | 10/2013 | Yasinover et al. | |
| 2013/0321340 A1 | 12/2013 | Seo et al. | |

OTHER PUBLICATIONS

PeopleSoft 8 CRM Interaction Management PeopleBook, Retrieved at <<http://docs.oracle.com/cd/B28702_01/psft/acrobat/crmr8ccic-b0601.pdf>>, Jun. 2001, 34 pages.

"Closing the Deal: the Oracle Fusion Customer Relationship Management User Experience", Retrieved at <<http://www.oracle.com/webfolder/ux/applications/Fusion/whitepaper_pdf/Oracle-Fusion-Customer-Relationship-Management_latest_draft_September_2011.pdf>>, Oracle Fusion Application, Sep. 2011, 18 pages.

Mueller, et al., "Interactive Multimodal User Interfaces for Mobile Devices", Retrieved at <<http://ieeexplore.ieee.org/stamp/stamp.jsp?tp=&arnumber=1265674>>, In Proceedings of the 37th Hawaii International Conference on System Sciences, Jun. 5, 2004, pp. 12.

Niklfeld, et al., "Device independent mobile multimodal user interfaces with the MONA Multimodal Presentation Server", Retrieved at <<http://citeseerx.ist.psu.edu/viewdoc/download?doi=10.1.1.84.6680&rep=rep1&type=pdf>>, In Proceedings of Eurescom Summit 2005, Heidelberg, Germany, Apr. 28, 2005, pp. 8.

Paterno, Fabio, "Multimodality and Multi-device Interfaces", Retrieved at <<http://www.w3.org/2004/02/mmi-workshop/paterno-cnr.pdf>>, In Proceedings of W3C workshop on Multimodal Interaction, Jul. 20, 2004, pp. 4.

Schaefer, et al., "Dialog Modeling for Multiple Devices and Multiple Interaction Modalities", Retrieved at <<http://mitglied.multimania.de/robbie/data/tamodia_rs_sb_wm.pdf>>, In Proceeding of the 5th International Workshop, Task Models and Diagrams for Users Interface Design (TAMODIA) 2006, Hasselt, Belgium, Oct. 23, 2006, pp. 16.

Mayora-Ibarra, Oscar, "Generation of Device Independent User Interfaces", Retrieved at <<http://uhdonline.dt.uh.edu/academic/colleges/sciences/ccsds/grants/mexico/papers/4view/9/mayora.pdf>>, In Proceedings of the International Workshop on Research

(56) References Cited

OTHER PUBLICATIONS and Development of Human Communication Technologies for Conversational Interaction and Learning, Puebla, Mexico, Jan. 2002, pp. 3.
Francis, William J., "Get started with Android Fragments", Mar. 14, 2012, http://www.techrepublic.com/blog/software-engineer/get-started-with-android-fragments, pp. 1-12.
U.S. Appl. No. 13/541,785 Final Office Action dated Oct. 20, 2014 and Amendment dated Aug. 4, 2014. 46 pages.
Chan, Yong Hua, "Gesture-Based OLAP Navigation on Touch-screen Devices", Retrieved at <<http://repository.tudelft.nl/assets/uuid:f5c7d8ca-febb-4531-bafe-de416c24ac7d/Yong_Hua_Chan_Gesture-Based_OLAP_Navigation_on_Touchscreen_Devices.pdf>>, A Thesis submitted in Partial Fulfillment of the Requirements for the Degree of Master of Science in Computer Science, Sep. 21, 2012. 99 pages.
Nitsche et al., "Vague Query Formulation by Design", Retrieved at <<http://red.cs.nott.ac.uk/~mlw/EuroHCIR2012/poster13.pdf>>, In Proceedings of the 2nd European Workshop on Human-Computer Interaction and Information Retrieval, Aug. 25, 2012, 4 pages.
"Design case study: Enterprise line of business Windows Store app (Windows)", Retrieved at <<http://msdn.microsoft.com/en-us/library/windows/apps/jj659079.aspx>>, Retrieved Date: Feb. 25, 2013. 17 pages.
"Raies the Bar on Both Business Intelligence and Web UI with Silverlight", Retrieved at <<http://www.infragistics.com/products/silverlight/>>, Retrieved Date: Feb. 25, 2013. 4 pages.
Non-Final Office Action from U.S. Appl. No. 13/754,896 dated Nov. 6, 2014, 20 pages.
Amendment from U.S. Appl. No. 13/541,785 dated Aug. 4, 2014. 18 pages.
U.S. Appl. No. 13/541,785 Office Action mailed on Apr. 4, 2014, 28 pages.
Meike, Multi-platform fragments, Jun. 22-23, 2011, Portable Droid, Part I, pp. 1-7.
Meike, Multi-platform fragments, Jun. 22-23, 2011, Portable Droid, Part II, pp. 1-6.
Derwent abstract of US 2010/0114698 A1, 2 pages.
Amendment for U.S. Appl. No. 13/754,896 dated Feb. 23, 2015, 12 pages.
Final Office Action for U.S. Appl. No. 13/541,785 dated Jan. 22, 2015, 30 pages.
"Non Final Office Action Received for U.S. Appl. No. 13/773,630", Mailed Date: Apr. 29, 2015, 21 Pages.
Amendment with RCE for U.S. Appl. No. 13/541,785, dated May 14, 2015, 15 pages.
Final Office Action for U.S. Appl. No. 13/754,896 dated Jul. 8, 2015, 28 pages.
"Yelp for Android-App review," available at https://www.youtube.com/watch?v=7vP3w_4mh-s, posted: May 4, 2011; Duration:2m28s, 1 page.
Amendment for U.S. Appl. No. 13/773,630 dated Jul. 10, 2015, 66 pages.
Non-Final Office Action for U.S. Appl. No. 13/541,785 dated Jul. 30, 2015, 37 pages.
Amendment for U.S. Appl. No. 13/827,759 dated Aug. 31, 2015, 15 pages.
"Non Final Office Action Issued in U.S. Appl. No. 13/827,759", Mailed Date: Jun. 10, 2015, 17 Pages.
Applicant-Initiated Interview Summary dated May 19, 2015 for U.S. Appl. No. 13/541,785, 3 pages.
"Final Office Action Issued in U.S. Appl. No. 13/773,630", Mailed Date: May 4, 2016, 22 Pages.
Issue Notification for U.S. Appl. No. 13/541,785 dated Mar. 23, 2016, 1 page.
Non-Final Office Action for U.S. Appl. No. 13/754,896 dated Apr. 22, 2016, 24 pages.
Amendment with RCE for U.S. Appl. No. 13/754,896 dated Oct. 8, 2015 , 13 pages.
Applicant Initiated Interview Summary for U.S. Appl. No. 13/827,759 dated Sep. 3, 2015, 3 pages.
Non-Final Office Action for U.S. Appl. No. 13/773,630 dated Oct. 15, 2015, 27 pages.
Final Office Action for U.S. Appl. No. 13/827,759 dated Nov. 25, 2015, 16 pages.
Prosecution History for U.S. Appl. No. 13/541,785 including: Amendment dated Nov. 30, 2015 and Applicant Initiated Interview Summary dated Nov. 17, 2015, 19 pages.
Notice of Allowance for U.S. Appl. No. 13/541,785 dated Dec. 30, 2015, 11 pages.
Amendment for U.S. Appl. No. 13/773,630 dated Feb. 9, 2016, 15 pages.
Non-Final Office Action for U.S. Appl. No. 13/754,896 dated Oct. 20, 2016, 22 pages.
Amendment with RCE for U.S. Appl. No. 13/773,630 dated Jul. 27, 2016, 15 pages.
Amendment for U.S. Appl. No. 13/754,896 dated Jul. 22, 2016, 15 pages.
Non-Final Office Action for U.S. Appl. No. 13/773,630 dated Oct. 17, 2016, 32 pages.

* cited by examiner

Proposal for Bike Store

FILE HOME INSERT DESIGN PAGE LAYOUT REFERENCES MAILINGS REVIEW VIEW ADD-INS

— 592

HVAC Systems for Bike Store Architecture     610

Table of Contents

1. Introduction .................................................. 3
2. Your Needs .................................................. 3
3. Our Approach ............................................... 3
   3.1 Objectives ............................................... 3
   3.2 Approach ................................................ 4
   3.3 Benefits .................................................. 4
4. Implementation Plan ..................................... 4
   4.1 Methodology ........................................... 4
   4.2 Schedule ................................................ 5
   4.3 Resources .............................................. 5
   4.4 Qualifications ......................................... 5
5. Costs .......................................................... 6
6. Conclusion .................................................. 7
Appendix A: Terms and Conditions ................... 7
Appendix B: The History of Contoso ................. 9

Page 1 of 9    1289 Words

— 594

CRM SYSTEM                                    ⊗

SALES STAGE                     Tasks
Proposal      10%               CLOSE DATE
                                12/23/2011    4
                                              — 596

1500 Bikes Bike Store
Info

Primary Contact    Revnue      Rating
                   $15,000     4.5/5
Phil B.            Probability Credit Limit
Billing, Bike Store 80%        $12,500

Add recommended sections

☐ Company History
  ★☆☆☆☆

☐ Competitive Analysis
  $ $ $ $

☐ Extended Service Plan
  $ $ $ $

☐ Product Comparison
  ★★★★★

What's New

@ Ted C. can I get you to take a look at the Methodology section of our
implementation plan for this opportunity? I could really use your feedback on
the engineering costs?

— 554

Post 558                            612

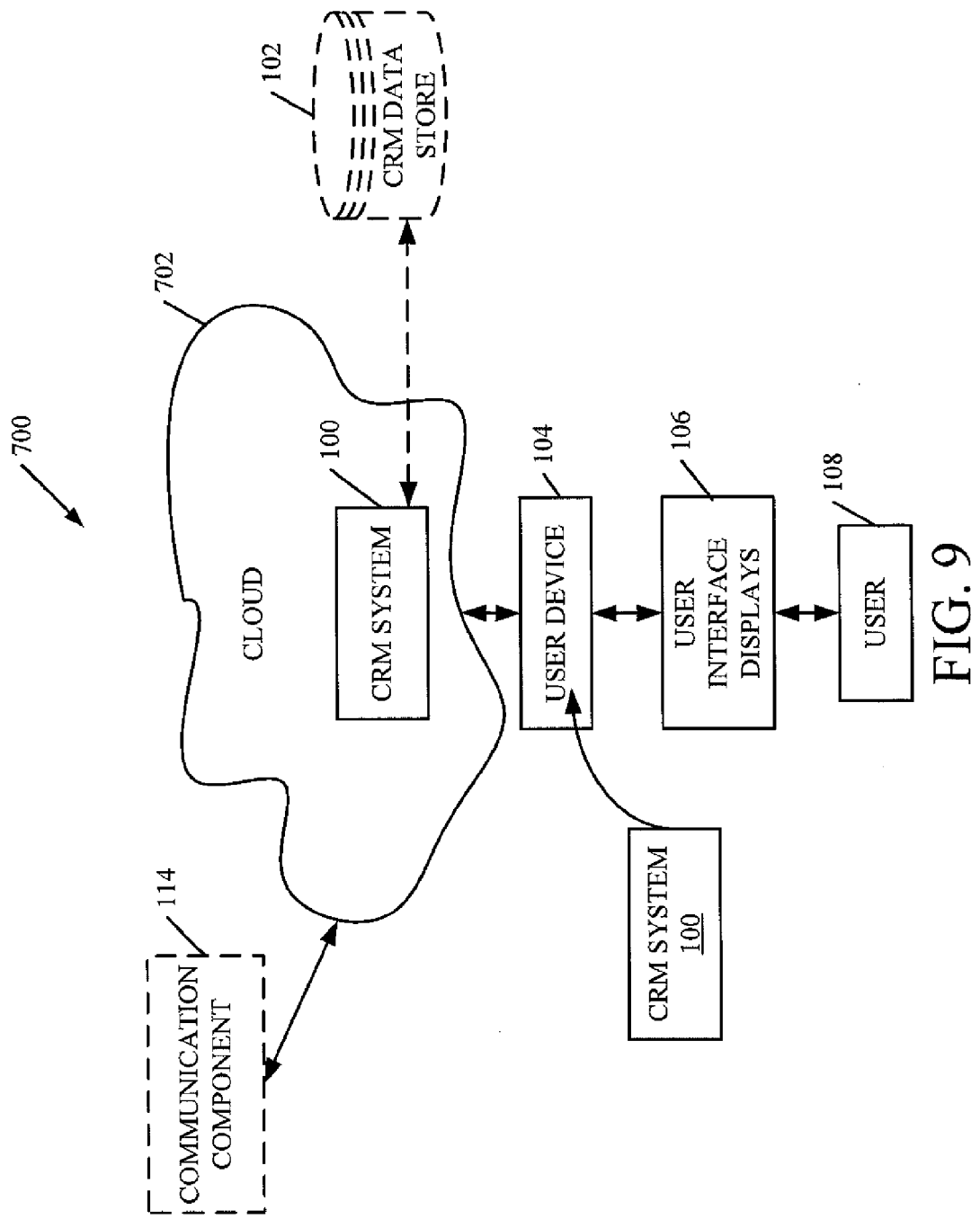

USE OF TOUCH AND GESTURES RELATED TO TASKS AND BUSINESS WORKFLOW

BACKGROUND

There are a wide variety of different types of business data systems. Some such systems include customer relations management (CRM) systems, enterprise resource planning (ERP) systems, line-of-business (LOB) applications, and other business systems. These types of systems often enable creation and maintaining of business data records. Some of these records include customer records that have details about customers, vendor records that include details of vendors, sales records, sales proposals, quotes, order records, records that contain product or service information, and records related to business contacts, among many others. The system can also include workflows that enable users to perform various tasks and workflows using the business data system.

An example of a workflow provided in some business data systems is one that allow(s) users or organizations to track various business opportunities. For instance, if there is an opportunity to make a sale of products or services to another organization, the business data system allows users to enter information that may be helpful in converting that opportunity into an actual sale. Similarly, some such systems allow many other types of tasks or workflows to be performed as well. For instance, some systems allow users to prepare a quote for a potential customer. Then, when the customer accepts the terms of the quote, the user can convert the quote into an actual order. These are merely two examples of a wide variety of different types of tasks and workflows that can be performed within a business data system.

In performing these and other types of tasks and workflows, some users may wish to contact other people associated with the business data records being operated on. For instance, where a customer has a primary contact, it may be that the user wishes to call or otherwise communicate with that person in order to discuss the terms of a proposal or order. Therefore, some business data systems allow a user to search for contacts, and communicate with a given contact.

The use of mobile devices is also increasing rapidly. Some mobile devices include smart phones, cellular telephones, and tablet computers, to name a few. These types of devices often have different types of user input mechanisms than desktop computers. For example, a desktop computer may have user interface displays with user input mechanisms that can be actuated by a point and click device (such a mouse or track ball) or a hardware keyboard. However, mobile devices often have touch sensitive screens. This enables a user to actuate user input mechanisms using touch gestures, such as by using a finger, a stylus, or other device.

The discussion above is merely provided for general background information and is not intended to be used as an aid in determining the scope of the claimed subject matter.

SUMMARY

A business data system generates a user interface display showing a business data record. The business data system receives a touch gesture user input to manipulate the business data record to perform an operation, a task or a workflow within the business data system. The business data system performs the operation, task or workflow based on the touch gesture user input.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 7A-7I show illustrative user interface displays.

FIG. 9 shows one embodiment of the system shown in FIG. 1 in different architectures.

DETAILED DESCRIPTION

Figure 1:
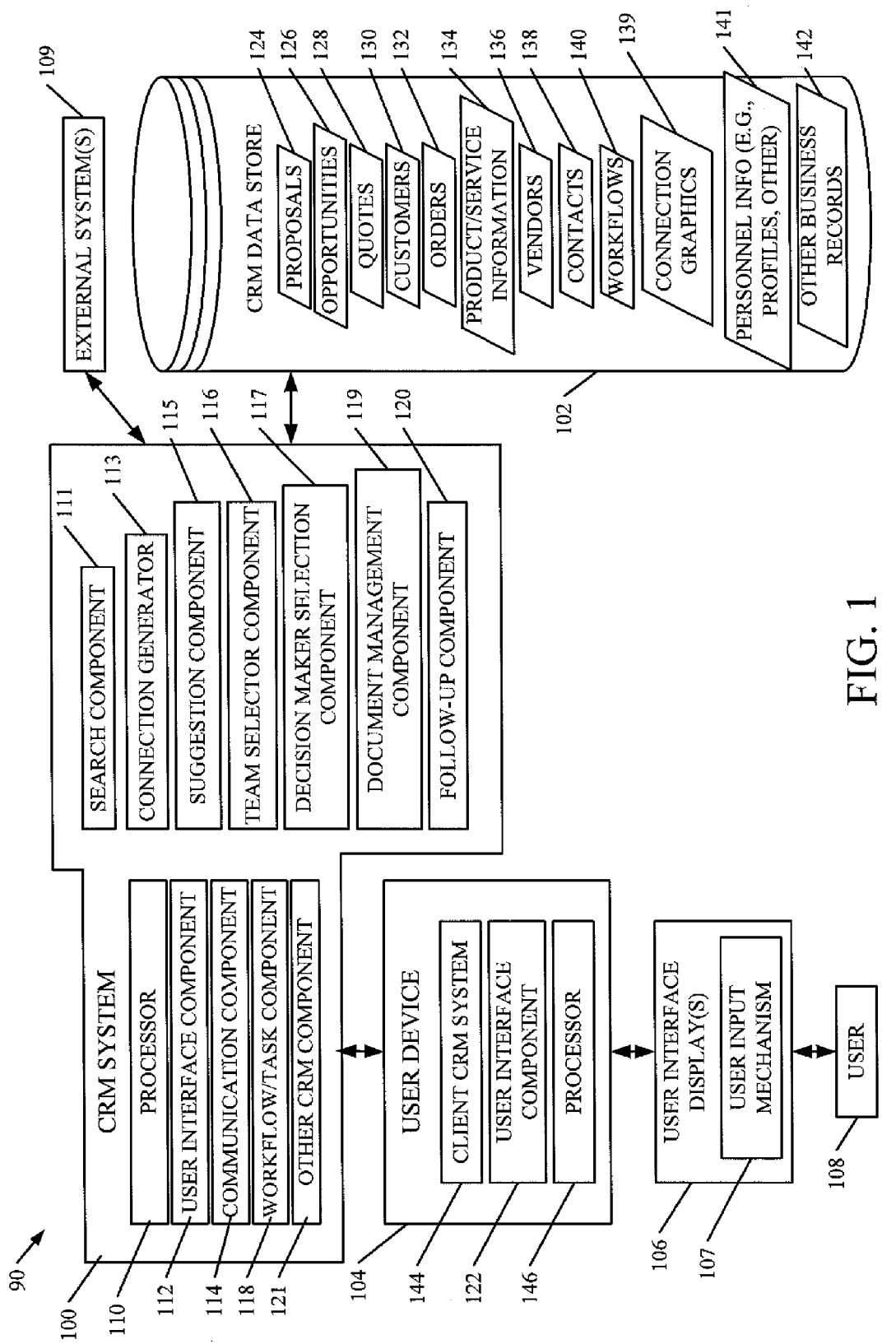
FIG. 1 is a block diagram of one illustrative business data environment.

FIG. 1 shows one illustrative embodiment of a business data architecture 90. Business data architecture 90 includes CRM system 100, CRM data store 102 and user device 104. User device 104 is shown generating user interface displays 106 for interaction by user 108. FIG. 1 also shows that CRM system 100 can be connected to, or connectable to access, other external systems 109. While CRM system 100 can be any business data system (such as a CRM system, an ERP system, an LOB system, or another business data application or business data system) it is described herein as a CRM system, for the sake of example only.

CRM system 100 illustratively includes processor 110, search component 111, user interface component 112, connection generator 113, communication component 114, suggestion component 115, team selector component 116, decision maker selection component 117, workflow/task component 118, document management component 119, follow-up component 120 and other CRM components 121.

Processor 110 is illustratively a computer processor with associated memory and timing circuitry (not separately shown). It is a functional part of CRM system 100 and is activated by, and facilitates the functionality of, the other components and items in CRM system 100. It will also be noted that while only a single processor 110 is shown, processor 110 can actually be multiple different computer processors as well. In addition, the multiple different computer processors used by system 100 can be local to system 100, or remote from system 100, but accessible by system 100.

Search component 111 illustratively generates user interface displays with user input mechanisms that can be actuated by user 108. The interface displays allow user 108 to use touch gestures to search for information in data store 102 or external system 109, or both, using touch gestures.

User interface component 112 illustratively generates user interface displays with user input mechanisms that can be actuated by user 108 using touch gestures. The user interface displays 106 (that user 108 interacts with) can be generated by user interface component 112 in CRM system 100 and passed to device 104 where they can be displayed (by device 104, as user interface displays 106) for interaction by user 108.

Connection component (or connection generator) 113 illustratively allows user 108 to find connections between various people using touch gestures. Connection component 113, in one embodiment, can use various metrics to calculate a strength of connection as well. This is described in greater detail below with respect to FIGS. 6C-6E.

Communication component 114 illustratively facilitates communication among various users of CRM system 100, or between users of CRM system 100 and other individuals who may not necessarily be users of system 100, based on touch gestures. For instance, if user 108 wishes to communicate with a contact who may not necessarily have access to CRM system 100 (such as by initiating a phone call, an instant message, etc.), communication component 114 illustratively facilitates this type of communication. Therefore, communication component 114 can illustratively facilitate email communication, telephone or cellular telephone communication, instant message communication, chat room communication, or other types of communication.

Suggestion component 115 illustratively receives user inputs (through touch gestures) and makes suggestions to the user based on those inputs. For instance, where a user is generating a sales proposal or an opportunity for a given company, suggestion component 115 can use search component 111 to search for information on the given company and generate a suggestion for additional products or services that the user may wish to include in the opportunity or proposal. Similarly, where the user is attempting to identify an individual to fill a position as a team member, for instance, suggestion component 115 can access various personnel information in data store 102 and make suggestions for individuals to fill that position on the team. In making suggestions, suggestion component 115 can use a wide variety of different types of information. Some of these are described below in greater detail with respect to FIGS. 5A-5C.

Team selector component 116 illustratively generates user interface displays with user input mechanisms that allow user 108 to use touch gestures to configure a team, and select team members corresponding to a business record. For instance, where user 108 identifies a business opportunity, user 108 can generate a business record representing that opportunity. In doing so, user 108 may wish to assemble a team (or at least request a team) to work on pursuing that business opportunity. Team selector component 116 illustratively walks the user through the process of identifying team members and selecting them for the team. One embodiment of this is described in greater detail below with respect to FIGS. 7A-7I.

Decision maker selection component 117 illustratively generates user interface displays that allow user 108 to use touch gestures to identify decision makers corresponding to a business record. Again, taking the example that the business record represents a business opportunity, user 108 may attempt to identify the people at the business opportunity that are the decision makers that are to be persuaded in order to make a sale. One embodiment of this is described in greater detail below with respect to FIGS. 6-6G.

Workflow/task component 118 illustratively generates user interface displays 106 so that user 108 can perform other tasks and carryout other workflow within CRM system 100 using touch gestures. For instance, workflow/task component 118 illustratively allows user 108 to add contact information to CRM system 100, to track opportunities within system 100, to convert quotes to orders, or to input various other types of information or perform other tasks or workflows, using touch gestures.

Document management component 119 illustratively generates user interface displays 106 that allow user 108 to perform various document management tasks using touch gestures. A number of different embodiments of this are discussed below with respect to FIGS. 8-8F.

Follow-up component 120 illustratively uses user interface component 112 to generates user interface displays that allow user 108 to generate a follow-up directly from a business data record within CRM system 100, using touch gestures. One illustrative embodiment of this is described below with respect to FIGS. 8F-8N.

Other CRM components 121 illustratively provide the functionality for other things that can be done in CRM system 100. There are a wide variety of other things that users can do within CRM system 100, and these various functions are provided by other components 121.

It will be noted that in one embodiment, the various items that generate user interface displays can do so using component 112. In another embodiment, some or all of the items generate the user interface displays themselves, without using component 112. Both are contemplated herein.

CRM system 100 has access to CRM data store 102. CRM data store 102 illustratively stores a variety of different business data records. While data store 102 is shown as a single data store, it can be multiple different data stores. It can be local to system 100 or remote therefrom. Where it includes multiple different data stores, they can all be local to or remote from system 100, or some can be local while others are remote.

The data records can include, by way of example only, proposals 124, opportunities 126, quotes 128, customer data records 130, orders 132, product/service information 134, vendor records 136, contacts 138, connection graphs 139, workflows 140, personnel information 141, and other business data records 142. Each of the business data records may be an object or entity, or another type of record. The records can include links to other records, or stand by themselves. All of these types of structures, and others are contemplated herein.

Proposals 124 illustratively include business information for a proposal that can be made to a customer. Opportunities 126 illustratively include a wide variety of different types of information (some of which is described below with respect to FIGS. 3A-3F) that enable user 108 to track a sales opportunity within CRM system 100. Quotes 128 illustratively include information defining quotes that can be provided to customers. Customers 130 include customer information, such as contact information, address, billing information, etc. for different customers. Orders 132 illustratively include order information that reflects orders that have actually been made by various customers. Product/service information 134 illustratively includes information that describes products or services in CRM system 100. Vendors 136 illustratively include information describing vendors that are used by the organization in which CRM system 100 is deployed. Contacts 138 illustratively include contact information for various people that are either users of CRM system 100, or that are related to any of the other business data records in CRM data store 102 (for instance they can be contacts at vendors, customers, other users, etc.).

Connection graphs 139 illustratively show how various people in CRM system 100, or outside system 100, are connected to one another. For instance, if person A is the boss of person B and person B is on the same team for a project as person C, then the connection graph between person A and person C might be:

person A→person B→person C, meaning that person A and person C are connected through person B. Of course, the connection graphs can have substantially any length and a wide variety of different connection criteria. Also, they can take different forms, the connections can be labeled, etc.

Workflows 140 illustratively define the various workflows that user 108 can perform within CRM system 100. The workflows can take a wide variety of different forms. For instance, they may simply be data entry workflows, workflows posting information to a ledger, workflows fleshing out proposals or quotes, or a wide variety of other things. In any case, CRM system 100 accesses workflows 140 in order to generate the user interface displays 106 that can be manipulated by user 108, in order to perform the different workflows.

User device 104 illustratively includes user interface component 122, client CRM system 144, and processor 146. Client CRM system 144 is illustratively used by user device 104 in order to access CRM system 100. Of course, client CRM system 144 can be a stand alone system as well, in which case it has access to CRM data store 102, or a different CRM data store. As described herein, however, it is simply used in order to access CRM system 100. This is but one option.

User interface component 122 illustratively generates the user interface displays 106 on user device 104. In the embodiment described herein, device 104 has a touch sensitive user interface display screen. Therefore, user interface component 122 illustratively generates the displays for display on the user interface display screen. The displays 106 have user input mechanisms 107 that can be actuated, using touch gestures, by user 108.

Processor 146 is illustratively a computer processor with associated memory and timing circuitry (not separately shown). Processor 146 is illustratively a functional part of device 104 and is activated by, and facilitates the functionality of the other systems, components and items in device 104. While processor 146 is shown as a single processor, it could be multiple processors as well.

As briefly discussed above, user interface displays 106 are illustratively user interface displays that are provided for interaction by user 108. User input mechanisms 107 can be a wide variety of different types of user input mechanisms. For instance, they can be buttons, icons, text boxes, drop-down menus, soft keyboards or virtual keyboards or keypads, links, check boxes, active tiles that function as a link to underlying information or applications or functions and that actively or dynamically show information about the underlying information, application or function, or a wide variety of other user input mechanisms that can be actuated using touch gestures.

It will also be noted that the touch gestures mentioned herein can take a wide variety of different forms. They can be simple touches or taps, swipes, slides, multi-touch inputs, positional gestures (gestures at a specific position or location on the screen), brushing, multi-finger gestures, touch and hold gestures, etc. The speed of the gestures can be used for control as well (e.g., a quick swipe can pan quickly while a slow swipe pans slowly, etc.). These and other gestures are all contemplated herein.

Figure 2A:
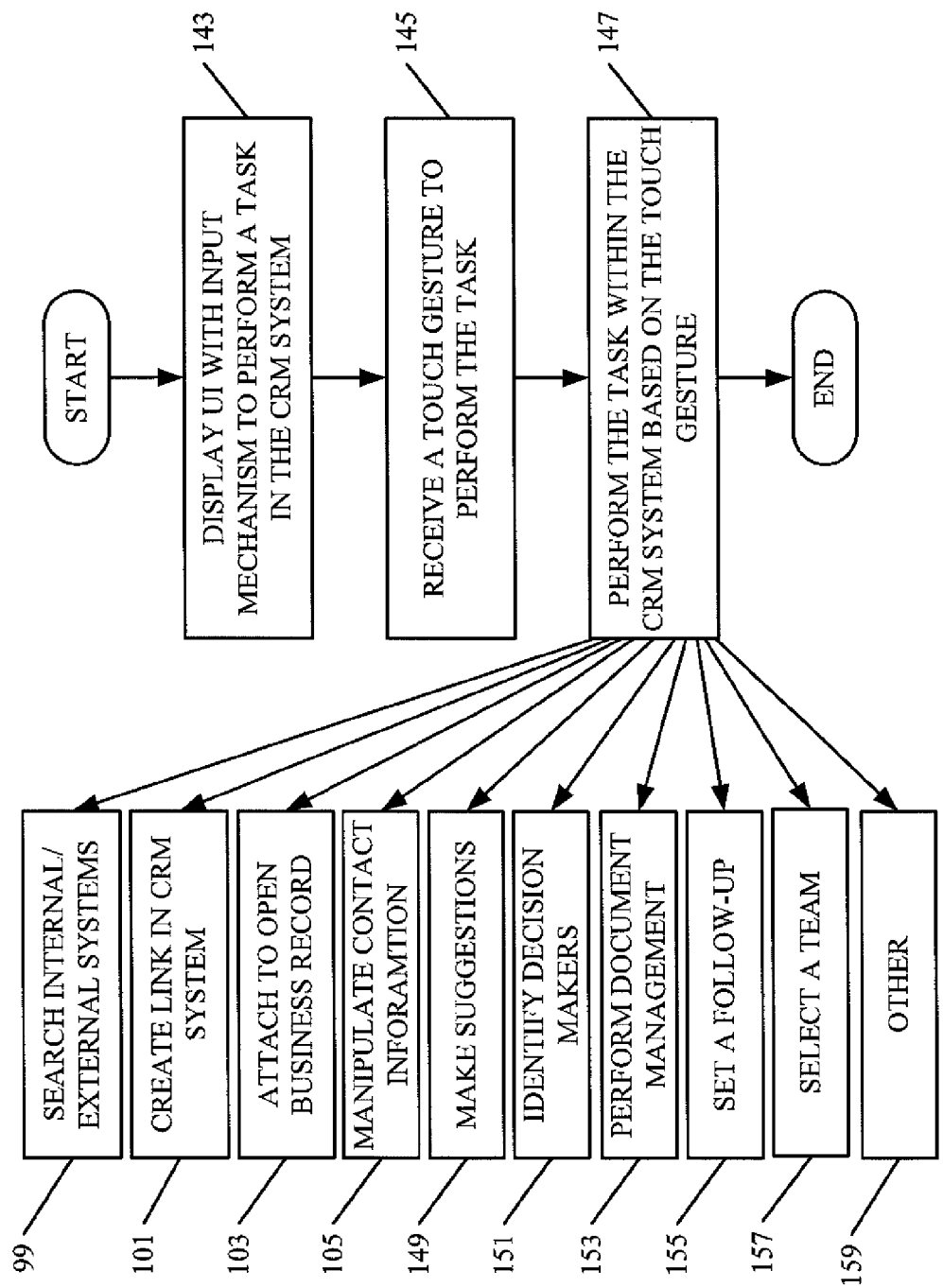
FIG. 2A is a flow diagram of one embodiment of the operation of the system shown in FIG. 1 in performing a task based on a touch gesture.

FIG. 2A is a flow diagram illustrating one embodiment of the operation of the architecture shown in FIG. 1 in performing a task or workflow or other operation based upon a touch gesture received from a user. Depending on the particular task workflow or operation to be performed, one of the components in CRM system 100 illustratively uses user interface component 112 to generate a user interface display with a user input mechanism that allows user 108 to perform the task, workflow, or operation, in CRM system 100. This is indicated by block 143 in FIG. 2A.

CRM system 100 then receives a touch gesture on the user input mechanism indicating that the user wishes to perform the task, workflow or operation. This is indicated by block 145.

In response to the touch gesture, CRM system 100 (or a specific component or set of components or items in CRM system 100) perform the task within the CRM system 100 based upon the touch gesture. This is indicated by block 147 in FIG. 2A.

Of course, the task, workflow or operation can be one of a wide variety of different ones, and some of those are shown in FIG. 2A. For instance, search component 111 can search an internal or external system (such as CRM data store 102, or a data store associated with one of external systems 109). This is indicated by block 99 in FIG. 2A. One or more of the components or items in CRM system 100 can also create a link in the CRM system to internal or external data records. This is indicated by block 101. Similarly, the CRM system 100 can attach internal or external information directly to an open business record, as indicated by block 103. CRM system 100 can manipulate contact information based on the touch gesture as indicated by block 105. Suggestion component 115 can access a variety of different types of information and make suggestions to user 108 based on the touch gesture. This is indicated by block 149. Decision maker selection component 117 can identify decision makers, as indicated by block 151. Document management component 119 can perform document management steps based on the touch gestures as indicated by block 153, and follow component 120 can generate follow-ups within CRM system 100, based on the touch gesture. This is indicated by block 155. Team selector component 116 can configure a team or add a team member, as indicated by block 157. Of course, CRM system 100 can perform a wide variety of other tasks, workflows or operations based on the touch gesture and this is indicated by block 159.

Figure 2B:
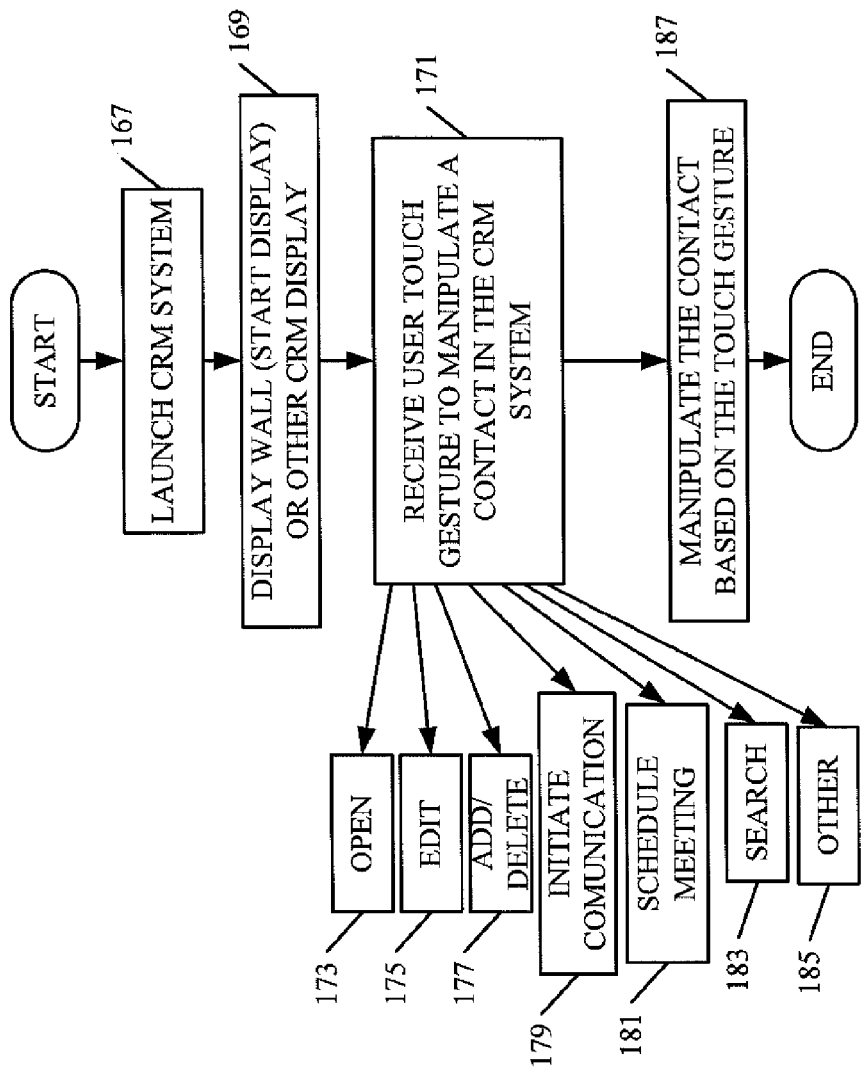
FIG. 2B is a flow diagram of one embodiment of the operation of the system shown in FIG. 1 in manipulating contact information based on a touch gesture.

FIG. 2B is a flow diagram illustrating one embodiment of the operation of the architecture shown in FIG. 1 in manipulating contacts using touch gestures within CRM system 100. User 108 first illustratively provides an input indicating that he or she wishes to access CRM system 100. This can launch client CRM system 144 which provides access to CRM system 100, or it can launch CRM system 100 and provide direct or indirect access. In response, CRM system 100 uses user interface component 112 to generate a user interface display 106 that displays a wall or other CRM display. Launching the CRM system is indicated by block 167 in FIG. 2B, and displaying the wall (or start screen) display is indicated by block 169. The CRM display illustratively includes user input mechanisms 107 that allow user 108 to manipulate them and thus control and manipulate CRM system 100.

Figure 3A:
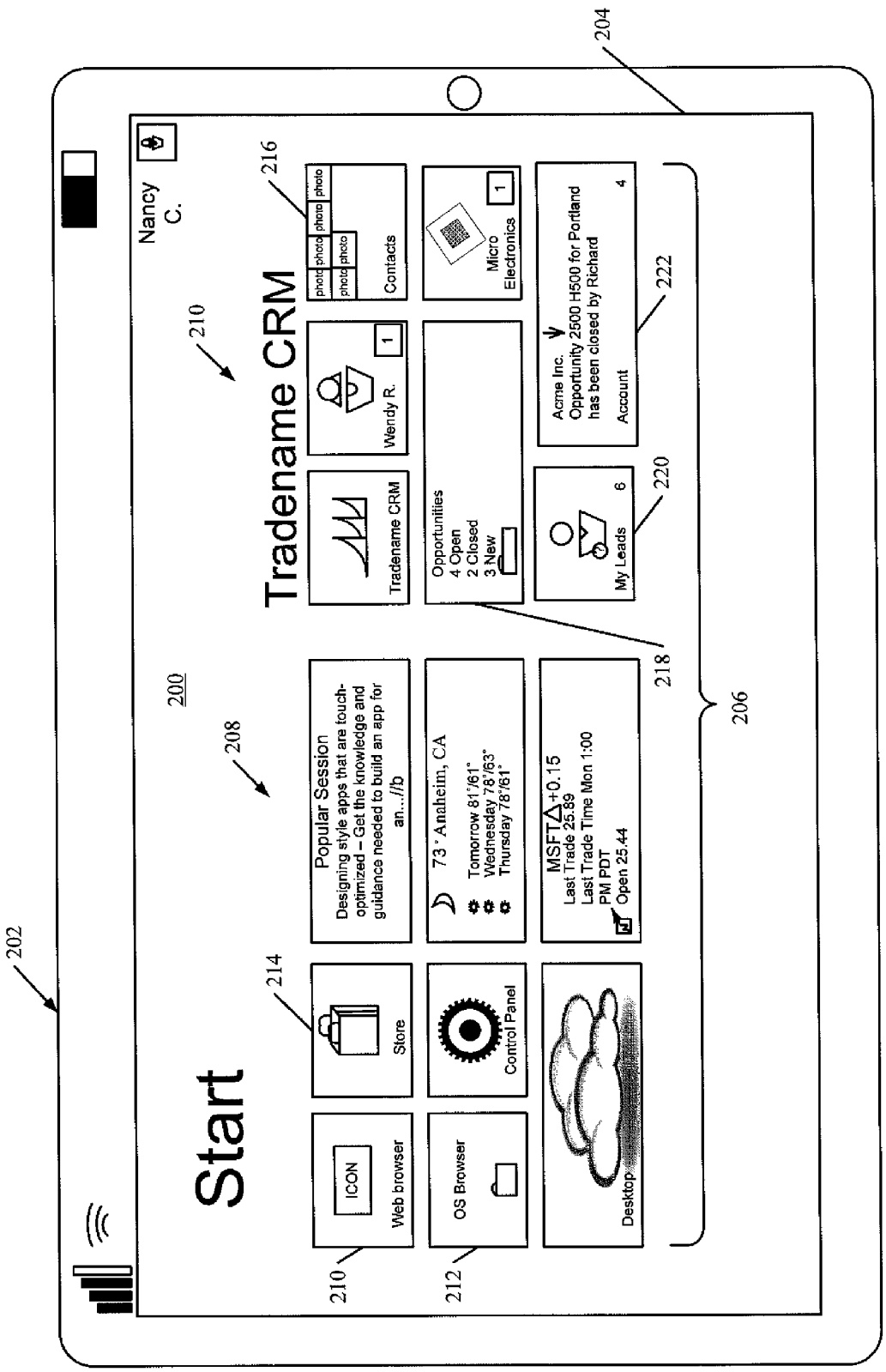
FIGS. 3A-3F show exemplary user interface displays.

FIG. 3A is one illustrative example of a user interface display 200 that shows a wall or a CRM start screen. Display 200 is shown on user device 202 which is illustratively a tablet computer. Tablet computer 202 illustratively includes touch sensitive display screen 204. Of course, it will be noted that device 202 could be any other type of device that has a touch sensitive display screen. Start screen (or wall) 200 is shown with a plurality of tiles, or icons 206.

In the embodiment shown in FIG. 3A, the icons (or tiles) are divided generally into two different sections. The first section is a personal section 208, and the second section is a business section 210. These sections are exemplary only and may or may not be used. The tiles in section 208 are illustratively user actuatable links which, when actuated by a user, cause a corresponding function to happen. For example, when either one of a pair of browser tiles 210 or 212 are actuated by the user, they launch a browser. When store tile 214 is actuated by the user, it launches an on-line store application or portal. Other tiles are shown for navigating to the control panel, for viewing weather, for viewing stock information of identified companies, or that indicate popular browsing sessions. Of course, the tiles shown in the personal section 208 are exemplary only and a wide variety of additional or different tiles could be shown as well.

The business section 210 of start display 200 also includes a plurality of tiles which, when actuated by the user, cause the CRM system 100 to take action. For instance, contact tile 216, when actuated by the user, opens a contact menu for the user. Opportunities tile 218, when actuated by the user, opens opportunity records or an opportunities menu that allows the user to navigate to individual opportunity records. The "my leads" tile 220, when actuated by the user, causes the CRM system 100 to open a menu or records corresponding to leads for the given user. A news tile 222 provides news about one or more items that have taken place in CRM system 100, and that are of interest to the user.

In the example shown in FIG. 3A, tile 222 shows that an opportunity for the ACME Company has been closed by another sales person. When the user actuates tile 222, the CRM system 100 navigates the user to additional information about that closed opportunity. For instance, it may navigate the user to the opportunity record or to the sales record, or simply to the ACME Company general record. The other tiles, when actuated by the user, cause the CRM system to navigate the user to other places of interest or to launch other components of the CRM system. Those displayed are shown for the sake of example only.

Once the CRM system 100 is launched and the start screen is displayed, CRM system 100 then receives a user touch gesture to manipulate a contact in CRM system 100. This is indicated by block 171 in FIG. 2B. By way of example, the user can simply touch contacts tile 216. This causes CRM system 100 to display a contact menu that allows the user to take a variety of other actions, such as to open a contact 173, edit a contact 175, add or delete contacts 177, initiate communication with one or more contacts 179, schedule a meeting with a contact 181, touch a search button to begin a search 183 for a contact, or perform other contact manipulation steps 185. In response, CRM system 100 manipulates the contact based on the touch gestures. This is indicated by block 187 in FIG. 2B.

It should also be noted that the user can manipulate contacts in other ways as well. For instance, instead of actuating contact tile 216, or one of the specific contacts represented by the photos or images on tile 216, the user may open up other business data records in CRM system 100. Many of those business data records may have individual people, or contacts, associated with them. Therefore, user 108 can manipulate contacts from within those business data records as well.

Figure 2C:
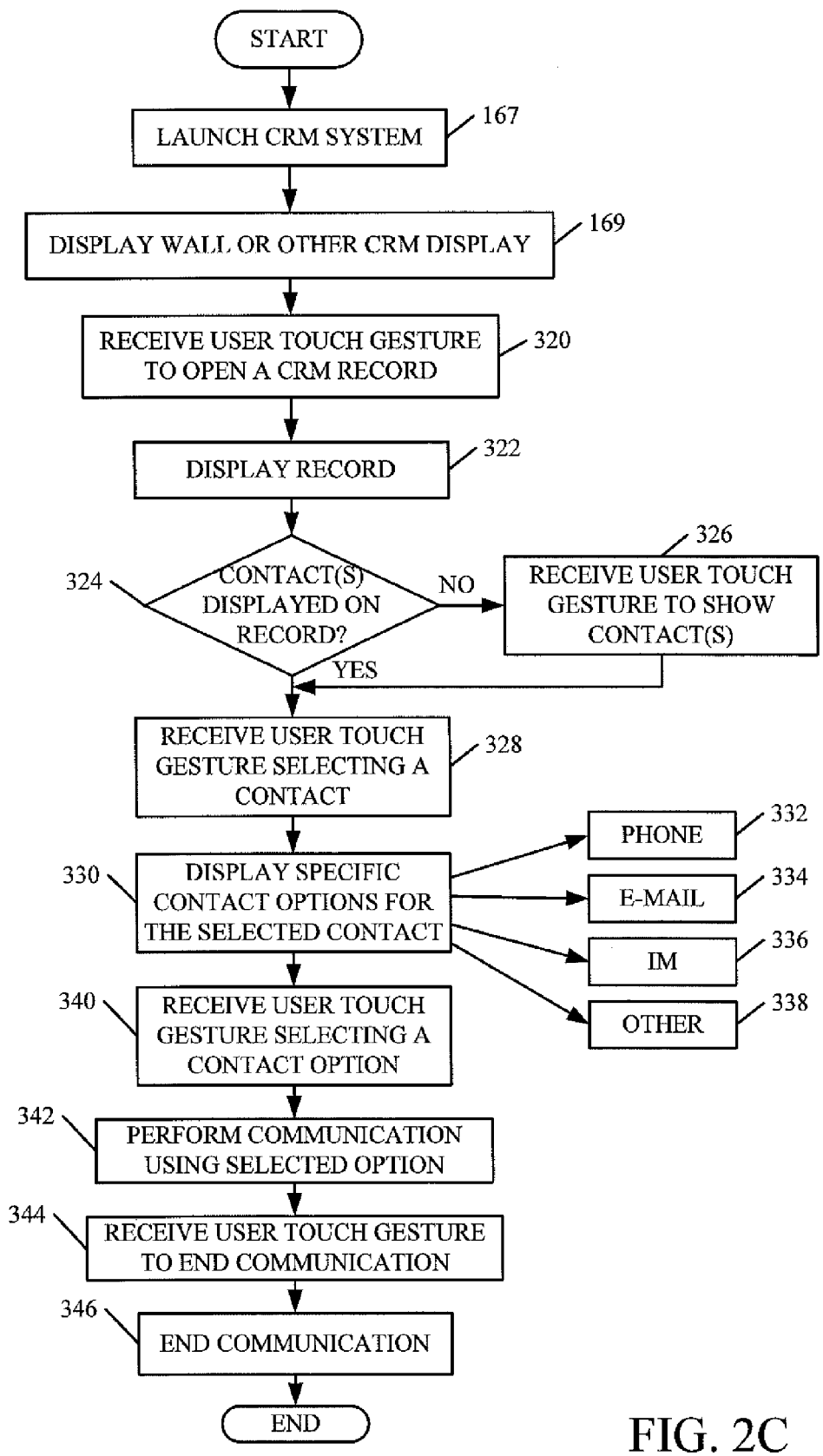
FIG. 2C is a flow diagram illustrating one embodiment of the operation of the system shown in FIG. 1 in manipulating a contact, within a business record, using touch gestures.

FIG. 2C is a flow diagram illustrating one embodiment of this type of contact manipulation. The first two blocks in FIG. 2C are similar to the first two blocks shown in FIG. 2B, and they are similarly numbered. Therefore, at block 167, the user launches the CRM system 100 and at block 169 the CRM system 100 displays a start display or wall or other CRM user interface display.

Figure 3B:
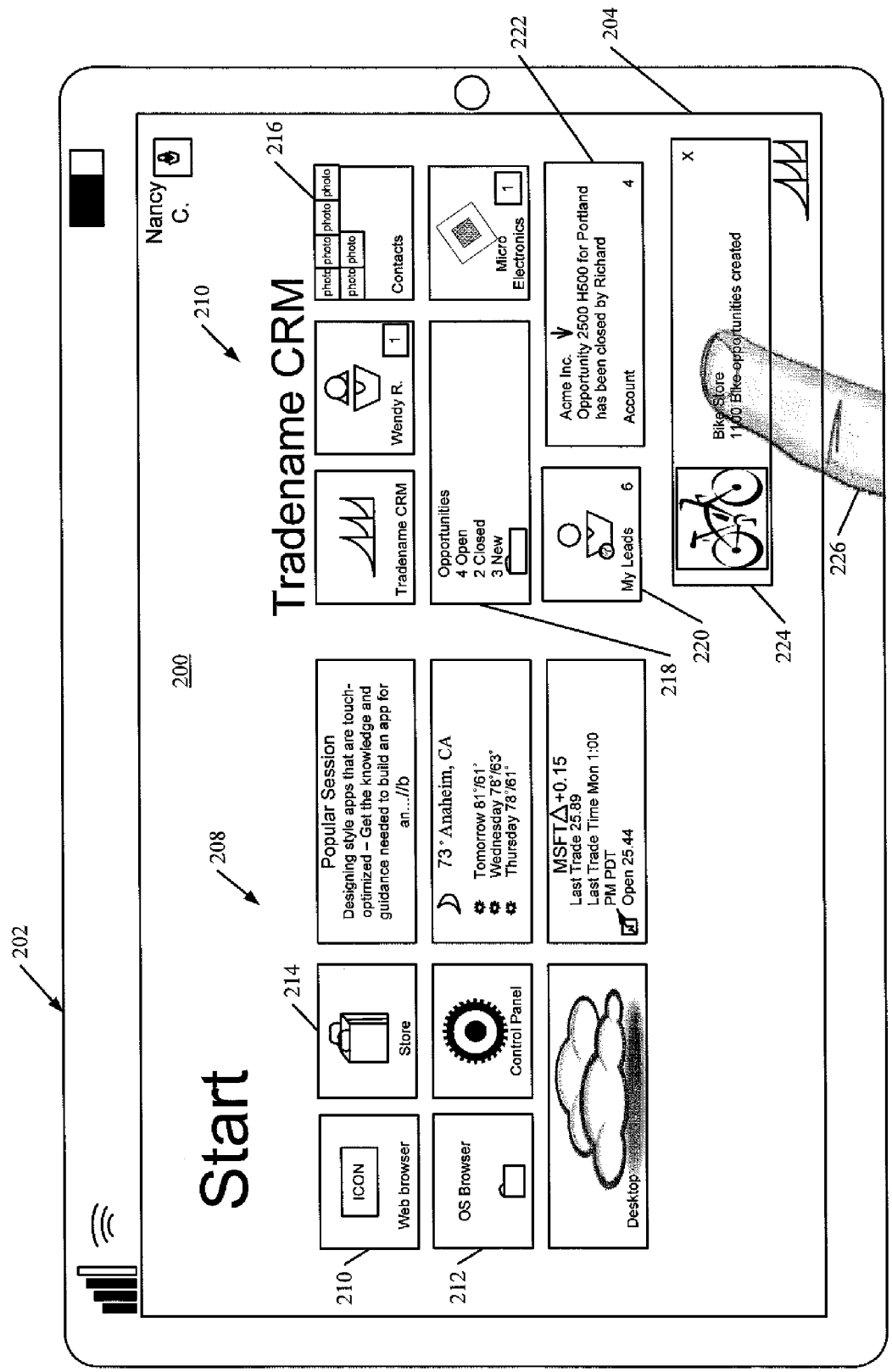

In the embodiment shown in FIG. 2C, the user then provides a touch gesture to open a CRM record. FIG. 3B shows one example of this. In the embodiment shown in FIG. 3B, the user has illustratively actuated tile 218, such as by touching it. In response, CRM system 100 displays an opportunities tile 224. Opportunities tile 224 is illustratively indicative of a new opportunity that has been created. The user then actuates tile 224, using a touch gesture (e.g., by touching it) with his or her finger 226. This causes CRM system 100 to open another user interface display, such as user interface display 228 shown in FIG. 3C, corresponding to the newly created opportunity. Receiving the user input to open the CRM record is indicated by block 320 in FIG. 2B, and having the CRM system 100 display the record is indicated by block 322.

Figure 3C:
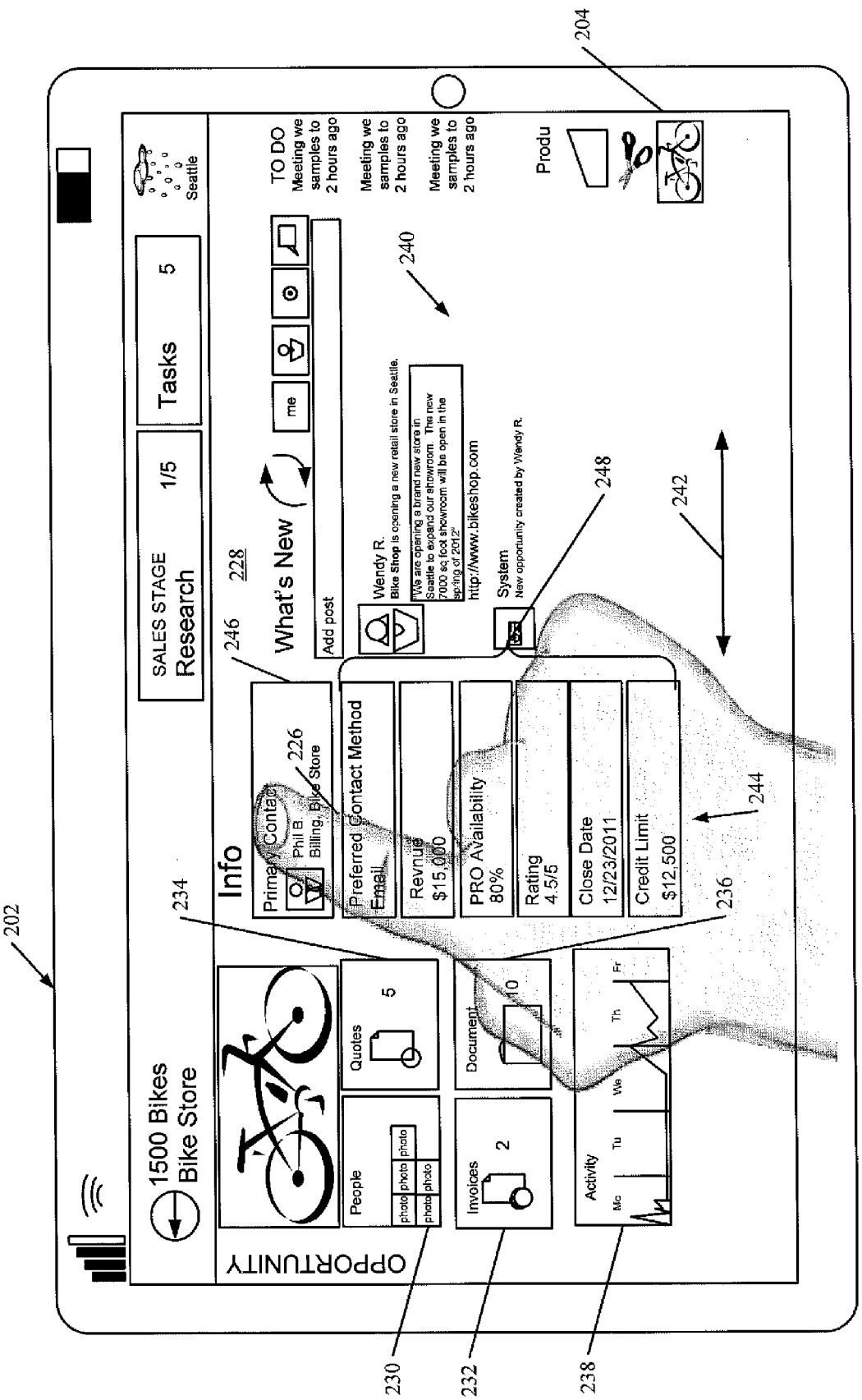

FIG. 3C shows that the business record display 228 displays tiles or links (or other icons or user-actuatable items) that allow the user to view a variety of different kinds of information. For instance, display 228 includes a "people" or "contact" tile 230. Tile 230 identifies people either at the organization for which the opportunity has been generated, or at the organization that employs the CRM system, that are somehow related to the opportunity. By way of example, the opportunity tile 230 may link user 108 to other people in the company that employs the CRM system, who are working on converting the opportunity into an actual sale. In addition, tile 230, when actuated by the user, may navigate the user to contact information for individuals at the company for which the opportunity was developed. In any case, if the user actuates tile 230, the CRM system 100 illustratively navigates user 108 to either a contact menu or a specific contact and allows the user to manipulate the contact in a similar way as described above with respect to FIG. 2B. For instance, the user can open a contact, delete or edit it, initiate communication, etc.

FIG. 3C also shows examples of other information that can be shown in a business data record. For instance, user interface display 228 includes a wide variety of actuable items that take the user to other information corresponding to the opportunity. Invoices tile 232, when actuated by the user, navigates the user to another display where the user can view information related to invoices that correspond to this opportunity. Quotes tile 234, when actuated by the user, navigates the user to additional information about quotes generated for this company or somehow related to this opportunity. Document tile 236 illustratively navigates the user to other related documents corresponding to this opportunity, and activity tile 238 shows, in general, the amount of activity related to this opportunity. When the user actuates tile 238, CRM system 100 can navigate the user to additional displays showing the specific activity represented by the tile 238.

User interface display 228 also illustratively includes a "What's new" section 240. What's new section 240 can display posts by user 108, or other users of the CRM system, that are related to the opportunity being displayed.

In addition, as shown in FIG. 3C, display 228 is illustratively pannable in the directions indicated by arrow 242. By way of example, if the user uses his or her finger 226 and makes a swiping motion to the left or to the right, display 228 illustratively pans to the left or to the right based on the touch gesture.

User interface display 228 also illustratively includes an information section 244 that displays a primary contact tile 246 corresponding to a primary contact for this opportunity. A plurality of additional tiles 248 are displayed below the primary contact tile 246, and provide information corresponding to the individual represented by primary contact tile 246. The tiles 248, for instance, provide a preferred contact method for the primary contact, an amount of revenue generated by the primary contact, an indicator of the availability of the primary contact, a reputation or rating for the primary contact, a date when the opportunity corresponding to the primary contact closes, and a credit limit for the primary contact. Of course, all of the tiles 248 are exemplary only, and additional or different information corresponding to the primary contact, or other information, can be displayed as well.

Since the opportunity record represented by user interface 228 has a primary contact (or tile) 246 that represents the primary contact for the displayed opportunity, the user can manipulate that contact information from within the opportunity business record displayed in user interface display 228. If there were no contact information corresponding to the business opportunity displayed on display 220, CRM system 100 would illustratively provide a user input mechanism that allows user 108 to navigate to contact information corresponding to the displayed business data record. Determining whether contact information is displayed on the business data record represented by user interface display 228 is indicated by block 324 in FIG. 2C. If not, receiving the user touch gesture to show contact information is indicated by block 326.

As described above, in the embodiment shown in FIG. 3C, both the contact tile 230 and the primary contact tile 246 are shown in user interface display 228. Therefore, the user need not provide an additional touch gesture to see contact information.

FIG. 3C also shows that the user is using his or her finger 226 to actuate tile 246. Thus, user 108 is selecting primary contact 246, by actuating the corresponding tile. Receiving a touch gesture selecting a contact is indicated by block 328 in FIG. 2C.

Actuation of tile 146 causes CRM system 100 to generate another user interface display that allows the user to manipulate the contact information. As described above with respect to FIG. 2B, this can take a wide variety of different forms. However, in the embodiment discussed with respect to FIG. 2C, actuating primary contact tile 246 causes CRM system 100 to generate a display, such as user interface display 250, shown in FIG. 3D. It can be seen that a number of the items in user interface display 250 are the same as those shown in user interface display 228 in FIG. 3C, and they are similarly numbered. However, FIG. 3D also shows that, since the user actuated tile 246, this causes CRM system 100 to display communication bar 252. Communication bar 252 displays the specific contact options for the selected contact, who was selected when the user actuated tile 246. Communication bar 252, itself, illustratively includes a plurality of user actuatable items each of which represents a method for contacting the primary contact represented by tile 246. For instance, communication bar 252 includes phone button 332, email button 334, instant messenger button 336 and other button 338. Displaying the specific contact options for the selected contact is indicated by block 330 in FIG. 2C.

Figure 3D:
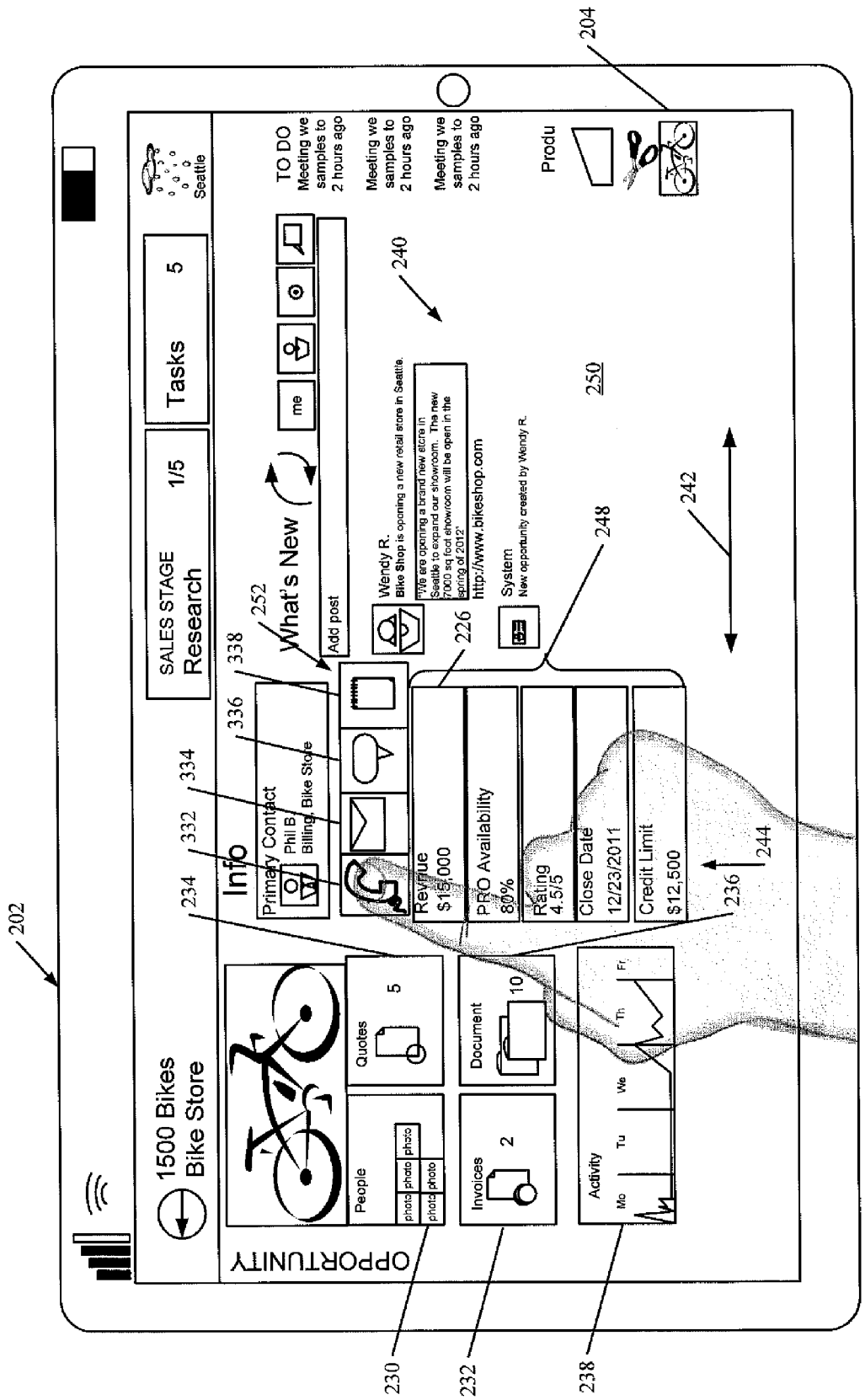

When the user actuates any of the buttons in communication bar 252, this causes CRM system 100 to illustratively initiate communication with the primary contact using the selected method of communication. FIG. 3D shows that the user 108 has used his or her finger 226 to actuate the phone button 332. In the embodiment shown, the user simply touches button 332 to actuate it. Receiving the user touch gesture selecting a contact option is indicated by block 340 in FIG. 2C and performing the communication using the selected option is indicated by bock 342.

Figure 3E:
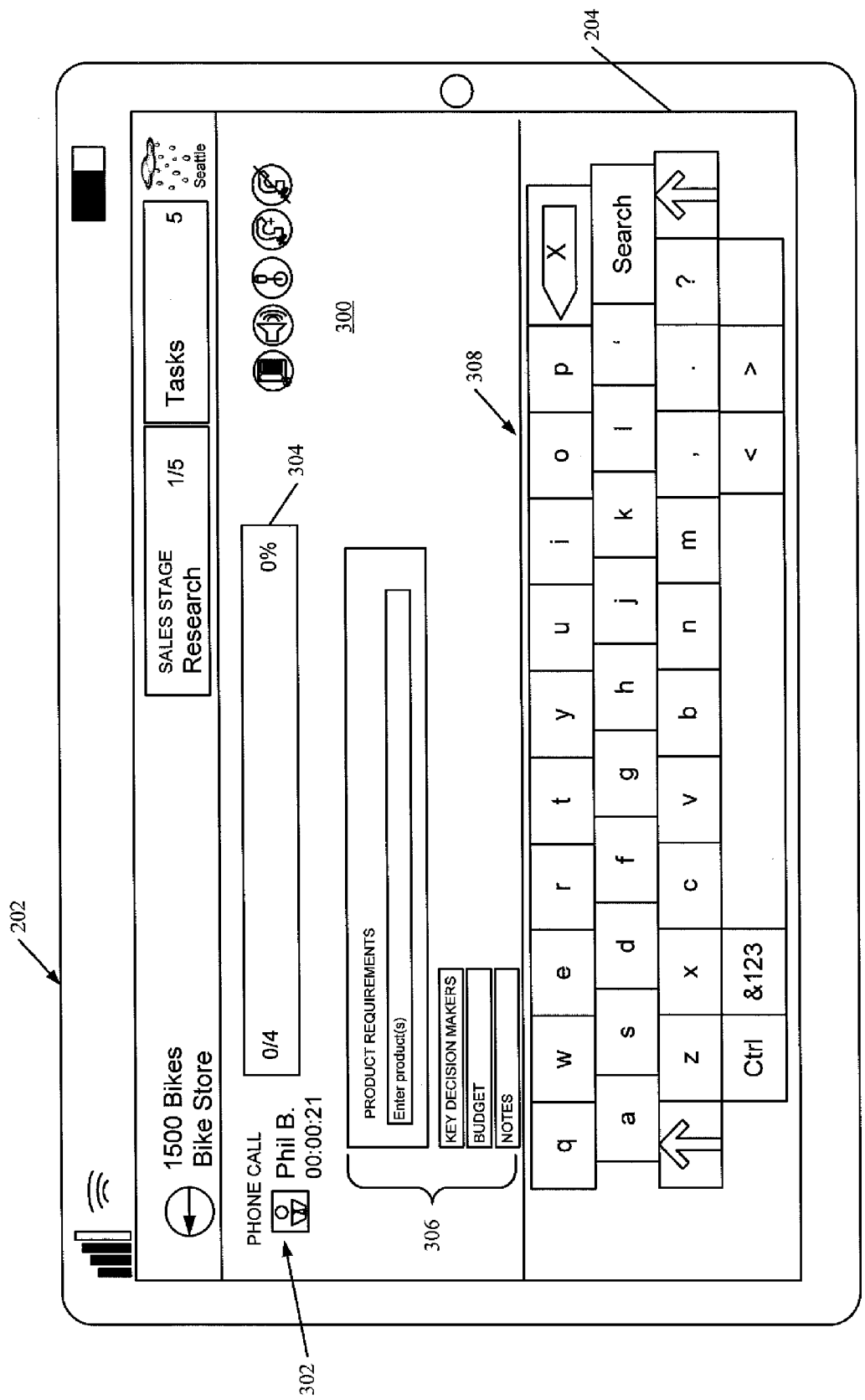

In response to the user actuating the phone button 332, communication component 114 in CRM system 100 illustratively initiates a phone call to the primary contact "Phil B." represented by tile 246 and generates a suitable user interface display indicating that the call has been initiated. FIG. 3E shows one exemplary user interface display 300 that illustrates this. It can be seen in display 300 that a phone call is underway to Phil B. This is indicated generally at 302. Display 300 shows the identity of the person being called, an indication that it is a phone call, and the elapsed time of the call. Of course, this information is exemplary only and a wide variety of additional or different information can be shown as well. In any case, user interface display 300 illustrates that a call has been placed.

A number of other exemplary things are shown in display 300. A list of objectives to be accomplished are shown generally at 306. A status bar 304 shows how many of the objectives for the phone call have been completed. The objectives listed are "product requirements", "key decision makers", "budget", and "notes". In one embodiment, these are the agenda items for the phone call. Of course, they may be simply "to do" items or a variety of other listed items as well.

FIG. 3E also shows that a soft keyboard is displayed generally at 308. This allows user 108 to type information into the text boxes at 306, or to otherwise enter alphanumeric information, using touch.

Figure 3F:
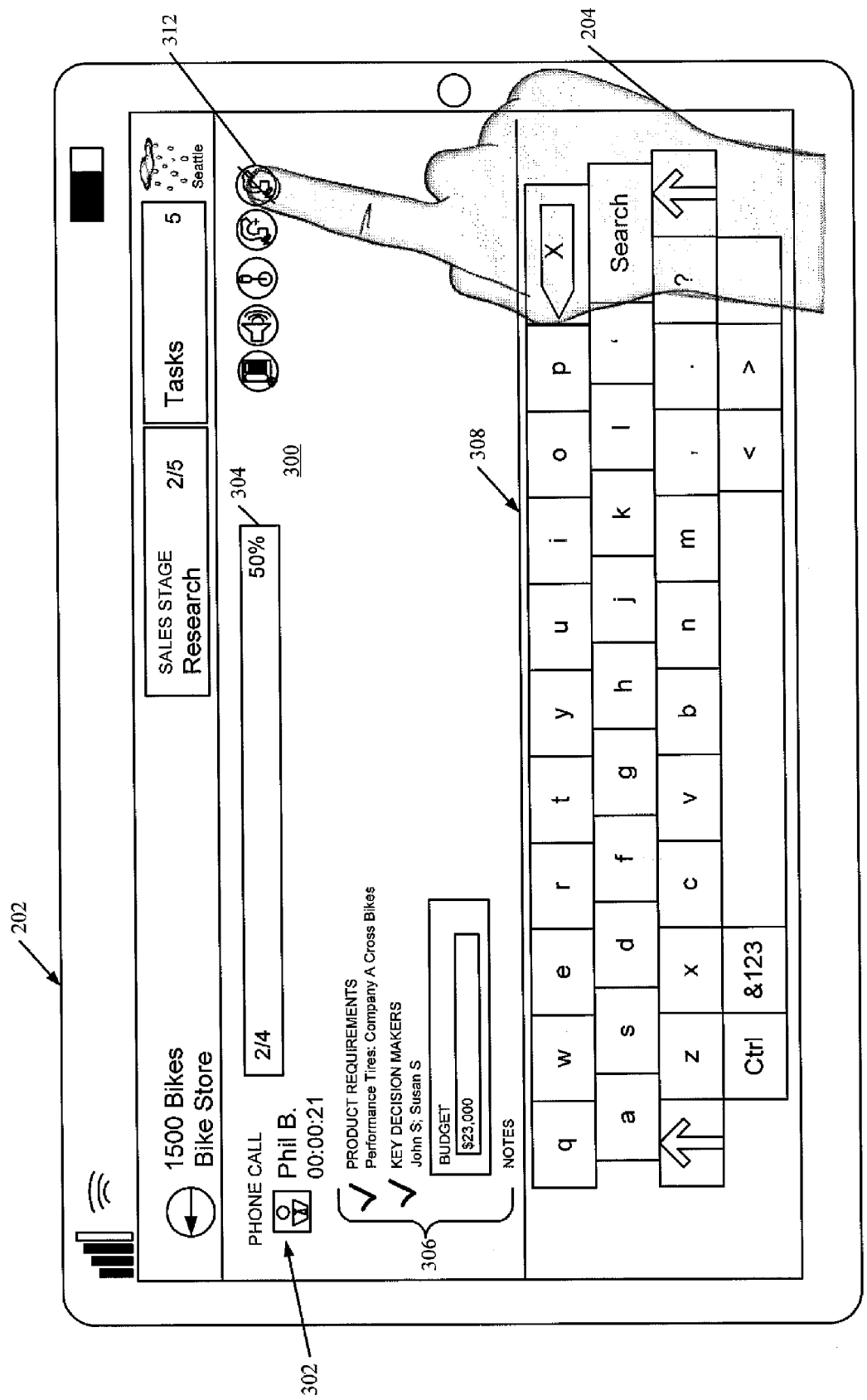

The communication (e.g., the telephone call) can proceed until one of the parties stops the communication. This can be done, in one embodiment, by user 108 simply touching an appropriate button on the user interface display. FIG. 3F shows one illustrative way of doing this. FIG. 3F shows user interface display 310, which is similar to user interface display 300 shown in FIG. 3E, and similar items are similarly numbered. However, it can be seen in FIG. 3F that the parties to the call have accomplished two of the agenda items, and therefore status bar 304 shows that two out of four items have been completed. Display 310 also shows that the user has touched a "hang up" button 312. Hang up button 312 allows user 108 to terminate the call, simply by actuating button 312. Receiving a user touch gesture to end the communication is indicated by block 344 in FIG. 2C. In response, communication component 114 of CRM system 100 hangs up the call, or disconnects the call, or otherwise discontinues the telephone communication. This is indicated by block 346 in FIG. 2C.

It can thus be seen that a user can quickly and easily manipulate contact information within a CRM system, or other business data system. When contact information is displayed, the user can use a touch gesture to manipulate it. This can make manipulation of contact information much easier and less cumbersome.

Figure 4:
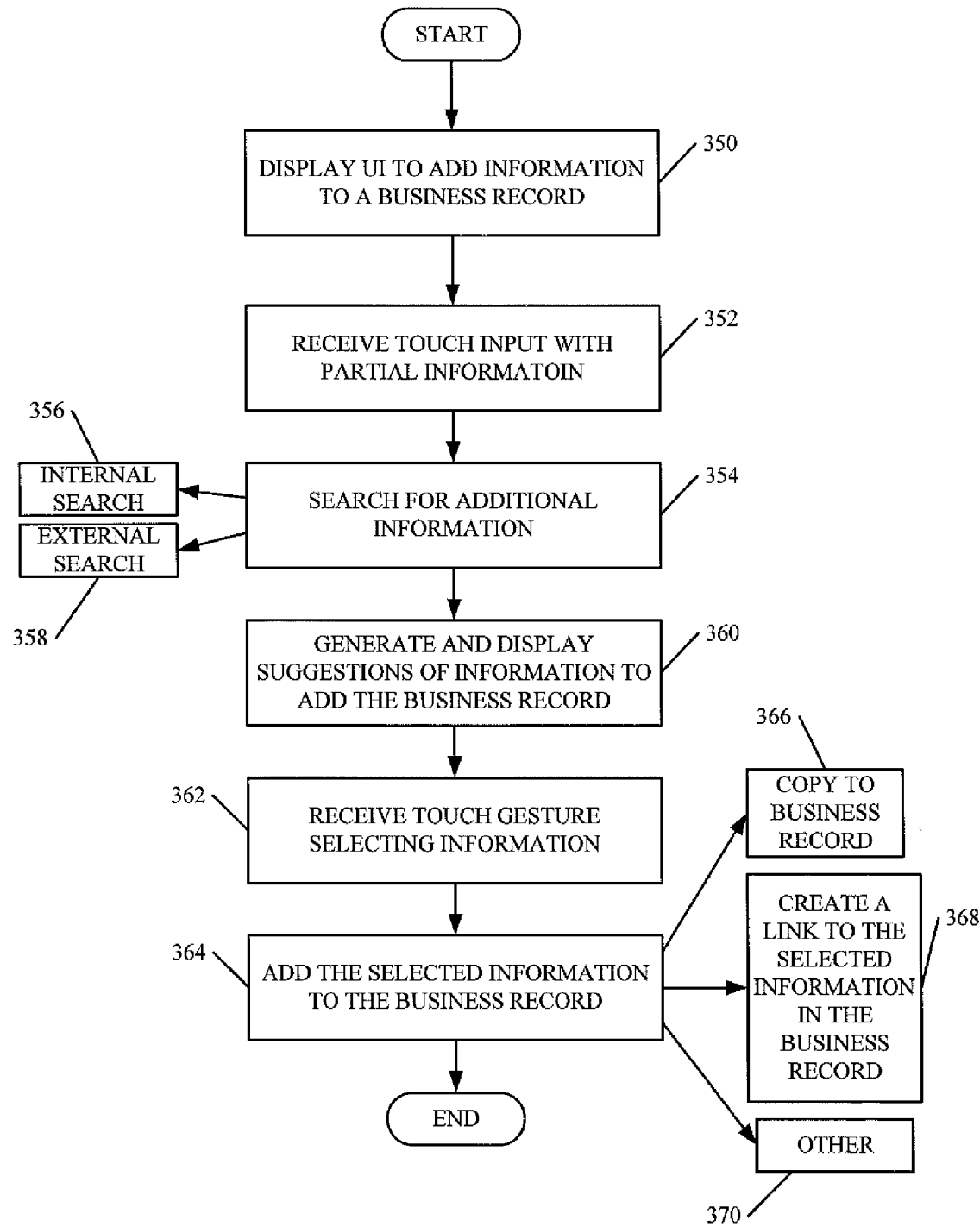
FIG. 4 is a flow diagram illustrating one embodiment of the operation of the system shown in FIG. 1 in receiving touch gestures to generate suggestions of information to add to a business record based on partial information.

FIG. 4 is a flow diagram illustrating one embodiment of the operation of the system shown in FIG. 1 in receiving partial information from a user based on touch gestures, performing a search, and suggesting additional information. It will be noted that, the system can perform the operation shown in FIG. 4 in order to perform a wide variety of tasks, workflows, or operations. For instance, when user 108 is searching for product information, user 108 can provide partial product information in a search box and system 100 can perform its own searching and suggest additional information. Similarly, when user 108 is looking for an individual person, user 108 can provide partial information and system 100 can perform searching and suggest additional information. While the operation discussed with respect to FIG. 4 is general in nature, a number of specific examples are discussed in greater detail below, for the sake of enhanced understanding.

First, in order to provide additional information, based on partial information, user interface component 112 (under the direction of another component or item in CRM system 100) displays a user interface display to add information to a business record. This is indicated by block 350 in FIG. 4. The user interface display illustratively has user input mechanisms that allow user 108 to provide partial information that can be used by system 100 in suggesting additional information.

System 100 then receives a touch input from the user, that provides the partial information. This is indicated by block 352. By way of example, if the user 108 is looking for a specific individual, the user may only know that individual's first name and the first letter of their last name. Therefore, the user can provide this using touch, through a virtual keyboard (for instance), and search component 111 can search personnel information in CRM data store 102 or in external systems 109. Based on the returned search results, suggestion component 115 can suggest a full personnel record based on the partial information (the first name and last letter of the last name) input by the user. This is but one example.

In another example, if user 108 is attempting to identify products that might be sold to an organization that has been identified as a business opportunity, search component 111 can search the available information on an external system 109 corresponding to the organization. Search component 111 can return product information indicative of products that are sold or used by the organization. Based on this information, suggestion component 115 can suggest additional products or services that may be sold to the organization. This additional information can be added to the opportunity data record corresponding to that organization. This is exemplary only.

Continuing with the more general discussion of FIG. 4, once user 108 provides the partial information using touch inputs, search component 111 searches for the additional information. This is indicated by block 354 in FIG. 4. As briefly mentioned above, search component 111 can search CRM data store 102 (or any other data store that is part of system 100) or it can search external systems 109. The external systems can be accessed over a wide area network (such as the Internet) or they can be any other desired external systems as well. Searching internal systems is indicated by block 356 in FIG. 4 and searching external systems is indicated by block 358.

Based upon the returned search results, suggestion component 115 generates and displays suggestions of information to add to the business record. This is indicated by block 360 in FIG. 4.

System 100 then receives a touch gesture selecting information to be added to the business record. This is indicated by block 362 in FIG. 4. By way of example, suggestion component 115 may suggest a list of names, or a list of additional products or services that may be sold to the company corresponding to the business opportunity. The user can touch any of these items to have them added. Based upon the user's touch gesture, system 100 adds the selected information to the business record. This is indicated by block 364 in FIG. 4. Again, by way of example, system 100 can add a name as a contact to the business opportunity record or can add the additional product information to the business opportunity record, etc. Both of these examples are described below in greater detail.

System 100 can add the information to the business record in a variety of different ways. For instance, system 100 can simply copy the information to the business record, as indicated by block 366. However, where the information resides on an external system (or even where it resides on an internal data store), system 100 can create a link in the business record to the selected information. This is indicated by block 368. Of course, system 100 can add the selected information to the business record in other ways as well, and this is indicated by block 370.

Figure 5:
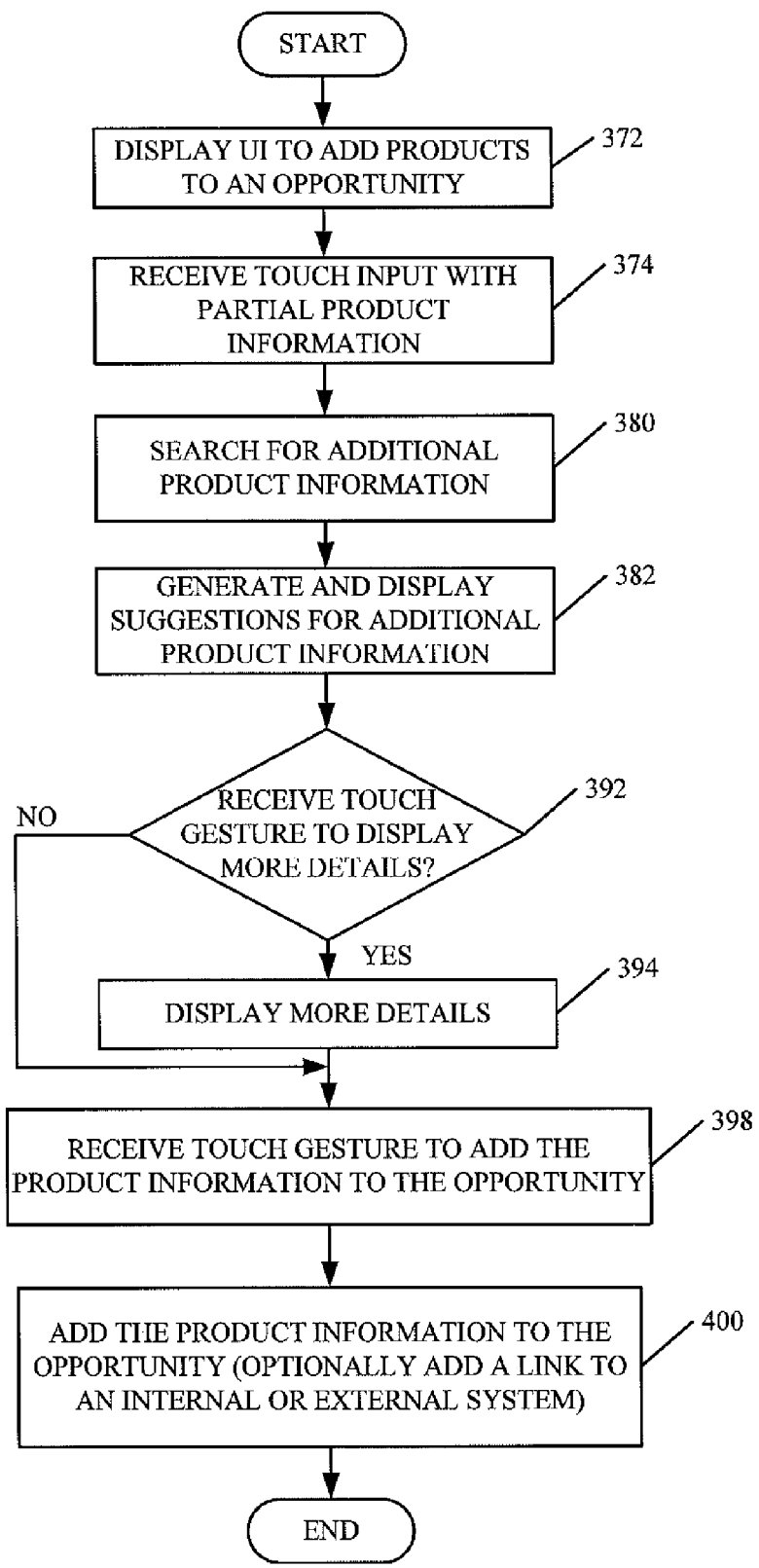
FIG. 5 is a flow diagram illustrating one embodiment of the operation of the system shown in FIG. 1 in adding product information to a business opportunity based on touch gestures.
Figure 5A:
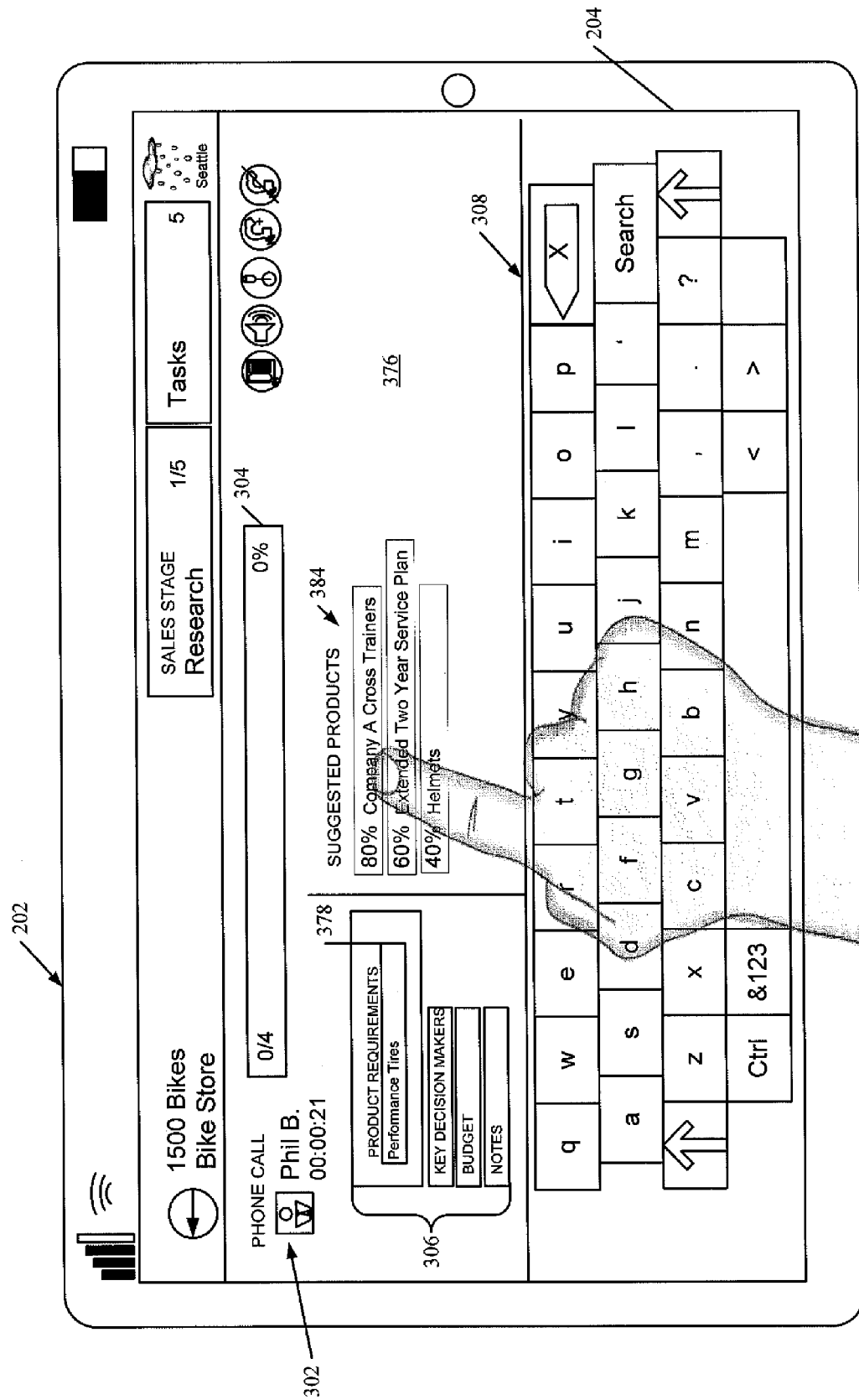
FIGS. 5A-5C are illustrative user interface displays.
Figure 5B:
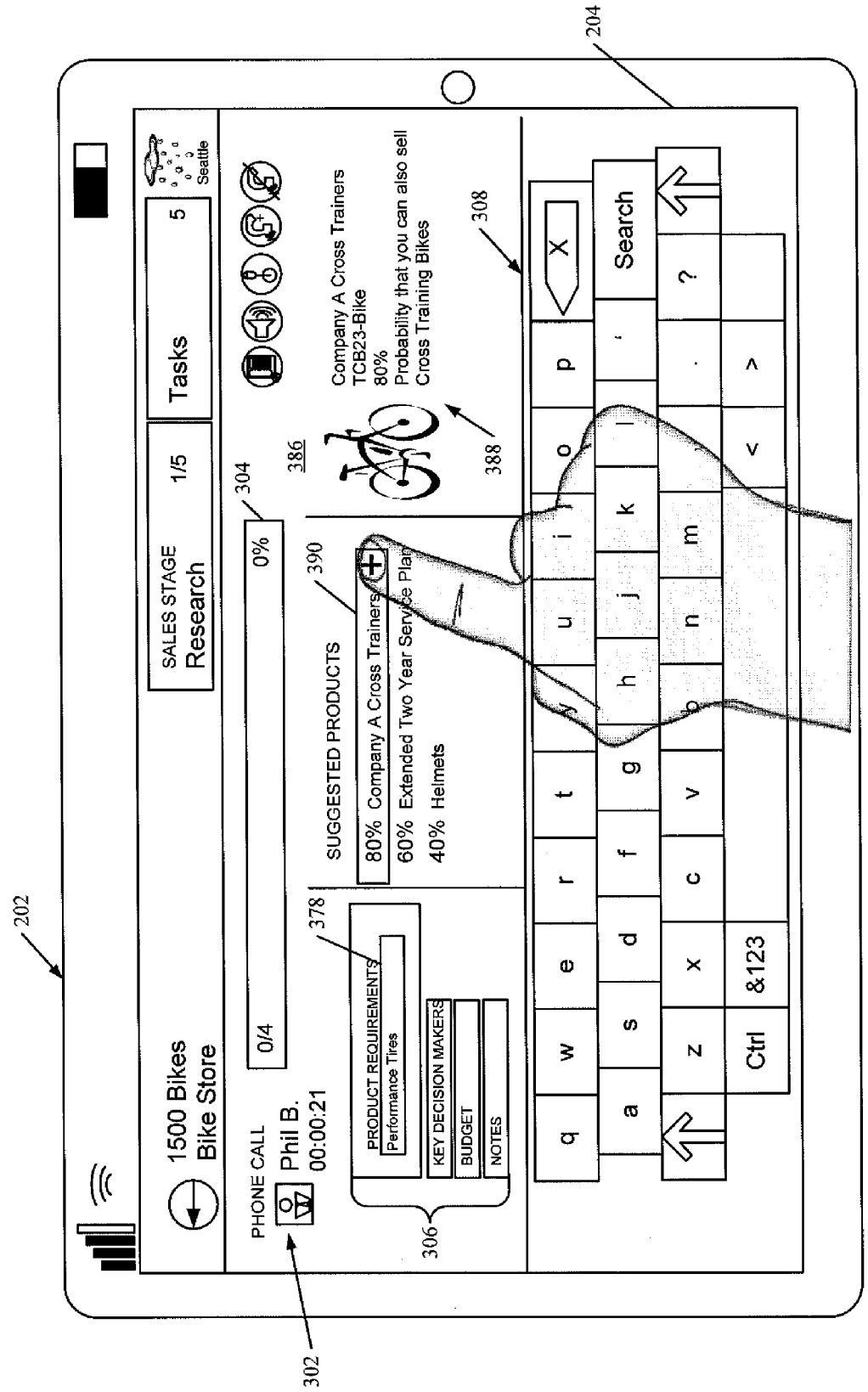

FIG. 5 is a flow diagram illustrating one embodiment of the operation of the system shown in FIG. 1 in adding specific information to a business record. FIGS. 5A-5B are illustrative user interface displays. FIGS. 5-5B will now be discussed in conjunction with one another.

In the embodiment discussed with respect to FIG. 5, the user wishes to add product information to an opportunity business record. The product information is information that identifies products that user 108 may be able to sell to the company represented by the business opportunity record. This is but one example of information that can be added to a business data record, using touch gestures.

In order to perform this operation, one of the components (such as workflow/task component 118 or other CRM component 121) in CRM system 100 uses user interface component 112 to generate a user interface display that can be used by user 108 to add product information to an opportunity business record. This is indicated by block 372 in FIG. 5.

CRM system 100 then receives a touch input from user 108 that provides partial product information to be added to the business opportunity record. This is indicated by block 374. FIG. 5A shows one example of a user interface display 376 that is similar to user interface display 300, shown in FIG. 3E, except that the user has used virtual keyboard 308 to enter "performance tires" in text box 378. This indicates the products that user 108 wishes to sell to the company (ACME) corresponding to the business opportunity record displayed.

Search component 111 then receives the partial information ("performance tires") and searches, in this embodiment, the external system 109 corresponding to the ACME Company in an attempt to identify any other products or services that user 108 may be able to sell to that company. Of course, search component 111 can also search internal records if they are helpful. For example, it may be that the company that user 108 works for has already sold some products or services to the ACME Company, in other parts of the country. That information may be helpful in identifying additional products or services as well. In any case, searching for additional product information is indicated by block 480 in FIG. 5.

The information from search component 111 is then returned to suggestion component 115. Suggestion component 115 generates and displays suggestions for additional product information that can be added to the business opportunity record shown in FIG. 5A. This is indicated by block 382 in FIG. 5. FIG. 5A shows that suggestion component 115 (e.g., using user interface component 112) has displayed a set of suggested products 384, along with a success indicator. For instance, the first entry in the suggested products 384 states "80% Company A cross trainers". The second entry states "60% extended 2 year service plan", and the third entry states "40% helmets".

Each of these entries are illustratively user actuatable buttons or links. When actuated, they cause CRM system 100 to display additional information corresponding to the actuated link. FIG. 5B is an example of a user interface display 386 which is similar to user interface display 376 shown in FIG. 5A, except that it shows that the user has touched the first entry in suggested products 384. This causes system 100 to retrieve and display more detailed information about the selected button, and this is shown generally at 388. Receiving the touch gesture to display more detail is indicated by block 392, and displaying the additional details at 388 is indicated by block 394 in FIG. 5. It can be seen that the display at 388 provides additional information regarding "Company A cross trainers".

It can also be seen that CRM system 100 displays a button 390 (in the embodiment shown it is in the form of a plus sign) that allows the user to add the suggested products to the "product requirements" for the business opportunity. FIG. 5B shows that the user is touching the button 390. This causes CRM system 100 to add the suggested product corresponding to button 390 to the opportunity record.

Figure 5C:
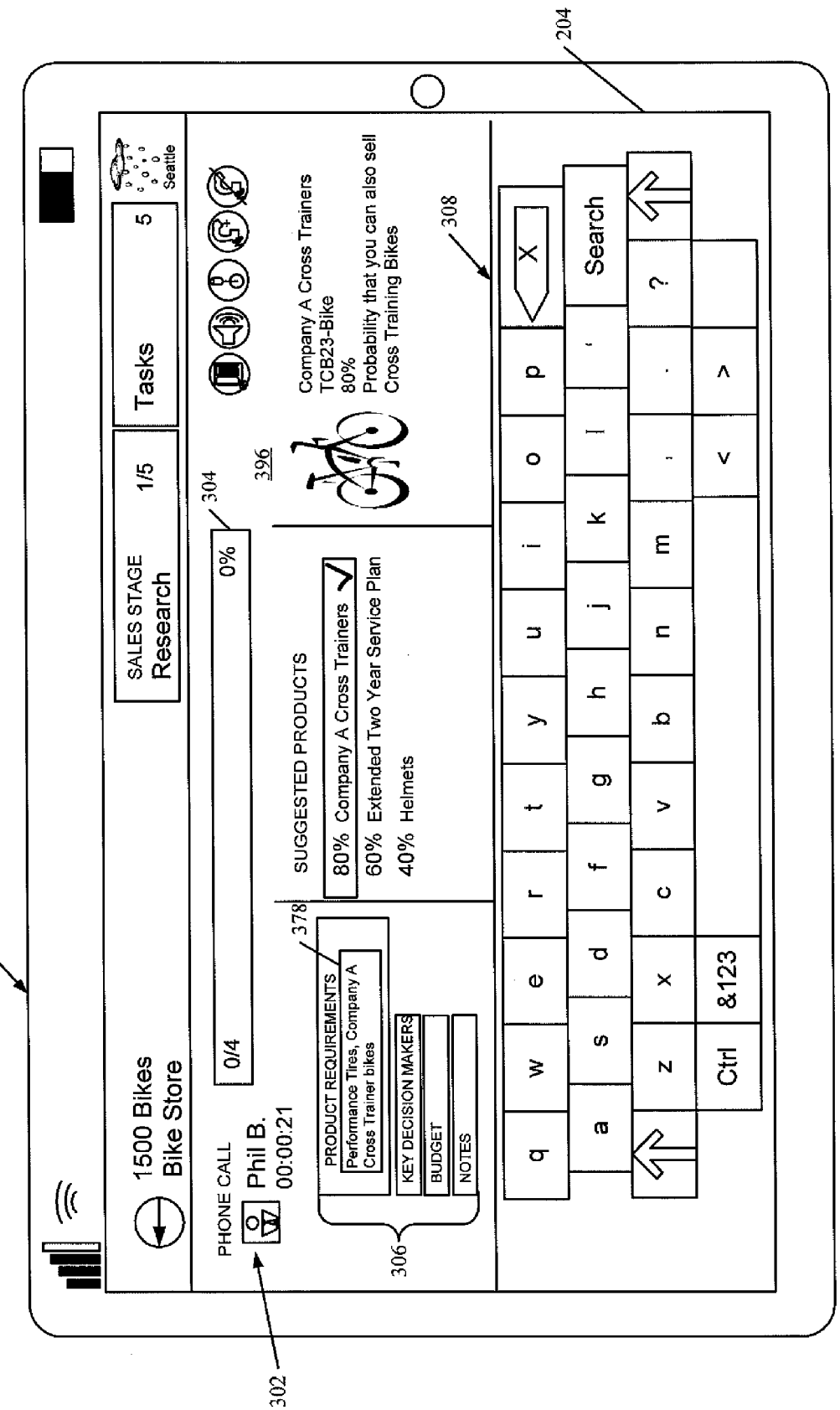

FIG. 5C shows a user interface display 396 which is similar to user interface display 386 shown in FIG. 5B, except that the "Company A cross trainer bikes" have now been added to the product requirements for the business opportunity record, shown generally at 378. Receiving the touch gesture to add the additional product information to the opportunity record is indicated by block 398 in FIG. 5, and having system 100 add that information to the opportunity record is indicated by block 400 in FIG. 5. Again, it will be appreciated that system 100 can add the information by copying all of the information related to the "Company A cross trainers" into the opportunity record, or it can create a link in the opportunity record to the additional information, or both. In any case, it can now be seen that the business opportunity record corresponding to the ACME Company has both performance tires and Company A cross trainer bikes as product information which can potentially be sold to the ACME Company.

Figure 6:
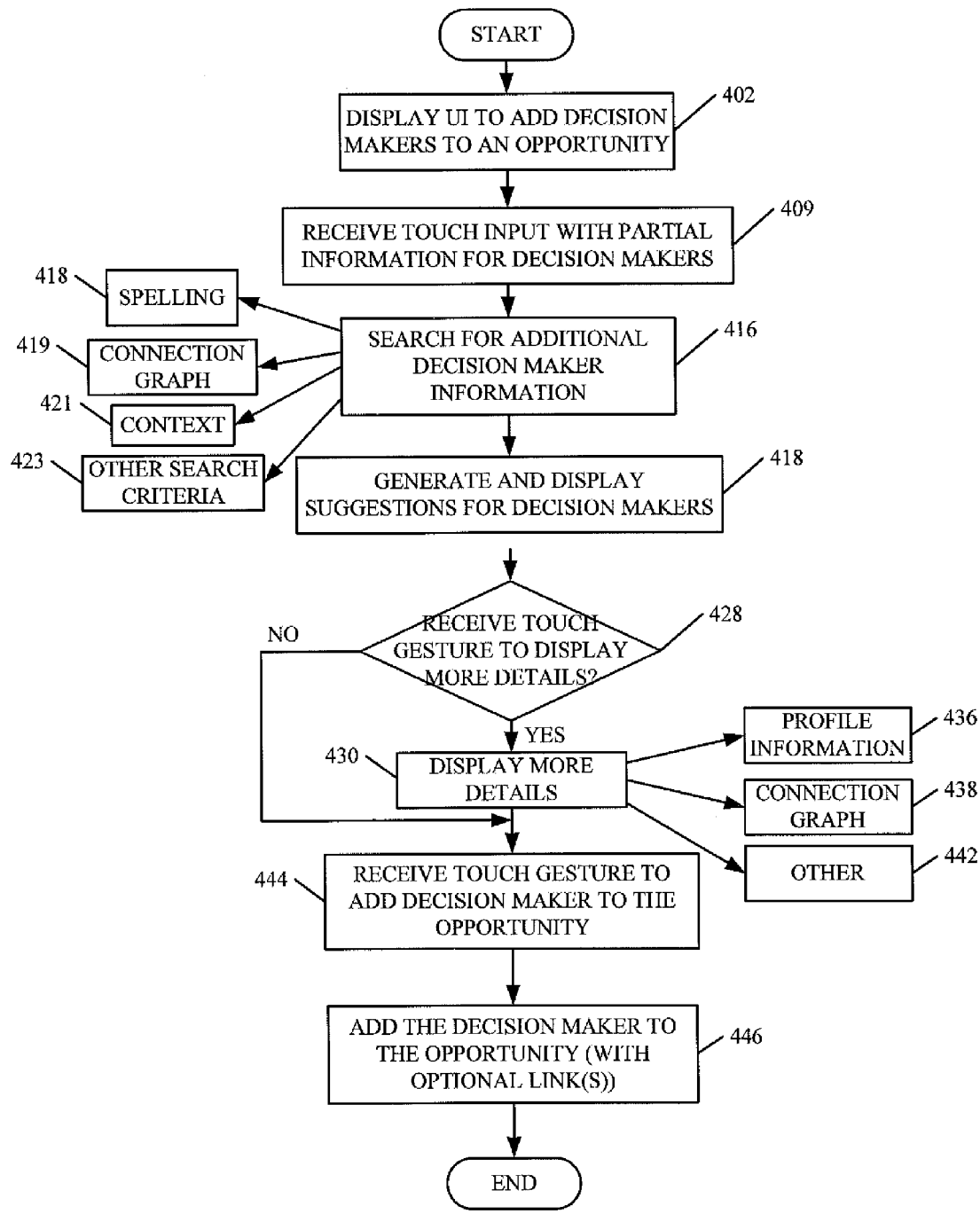
FIG. 6 is a flow diagram illustrating one embodiment of the operation of the system shown in FIG. 1 in receiving touch gestures to add decision makers to a business record, based on touch gestures.

FIG. 6 is a flow diagram illustrating one embodiment of the operation of the system shown in FIG. 1 in allowing user 108 to identify decision makers for a company corresponding to a business opportunity, and add them to the business opportunity record in CRM system 100. FIGS. 6A-6I are illustrative user interface displays. FIGS. 6-6I will now be discussed in conjunction with one another.

Decision maker selection component 117 first uses user interface component 112 to generate and display a user interface display that allows user 108 to add decision makers to the opportunity record. This is indicated by block 402 in FIG. 6.

Figure 6A:
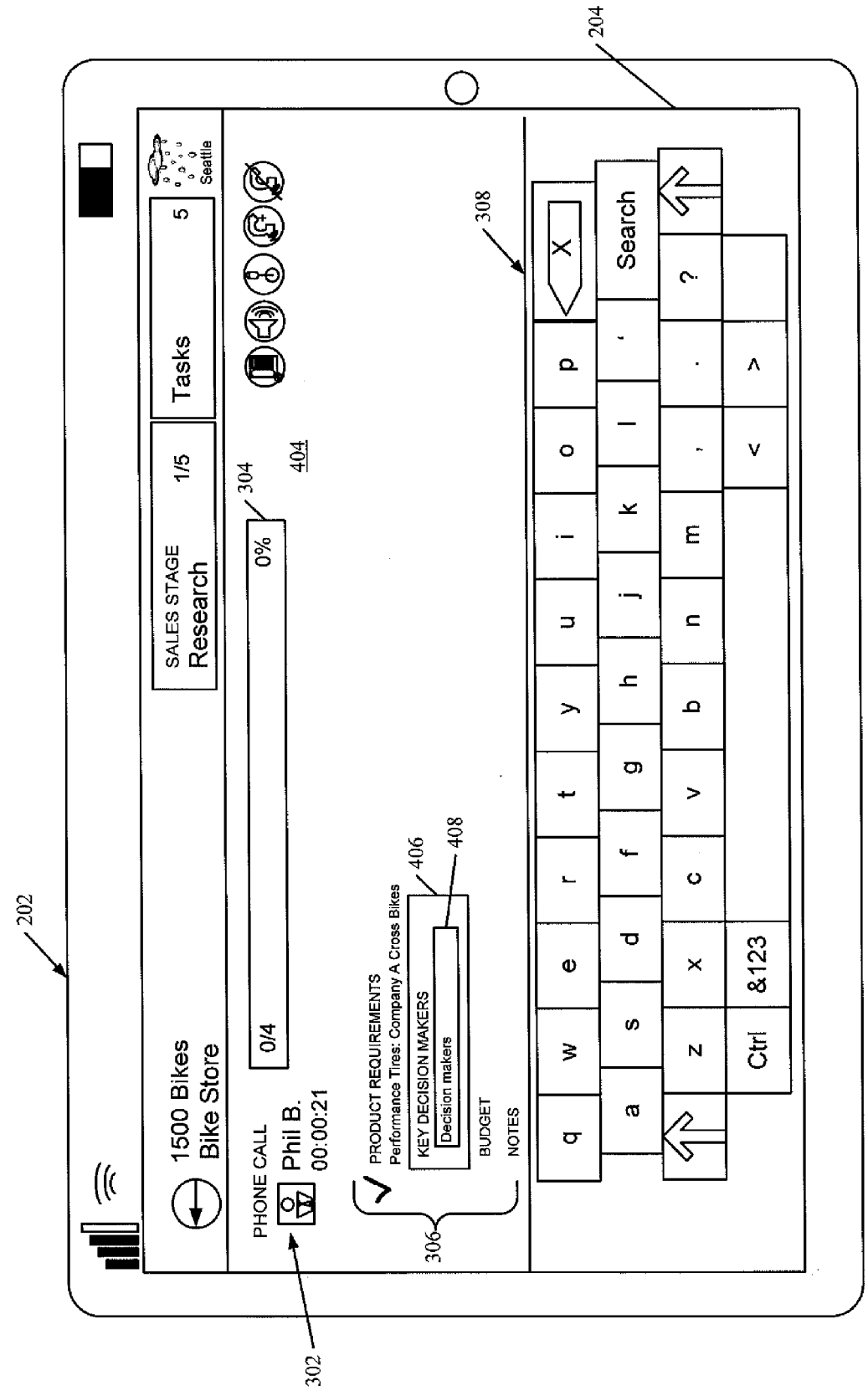
FIGS. 6A-6I show illustrative user interface displays.

FIG. 6A shows one embodiment of a user interface display 404 that allows user 108 to do this. It can be seen that user interface display 404 is similar to user interface display 276 shown in FIG. 5A and similar items are similarly numbered. However, it can be seen that the user has now touched the "key decision makers" button 406. This causes user interface display 404 to display a text box 408 that allows user 108 to enter the names of key decision makers for the present opportunity, using keyboard 308. User 108 then provides a touch input (such as by using virtual keyboard 308) to provide partial information for the decision makers, by entering text in box 408. This is indicated by block 409 in FIG. 6.

Figure 6B:
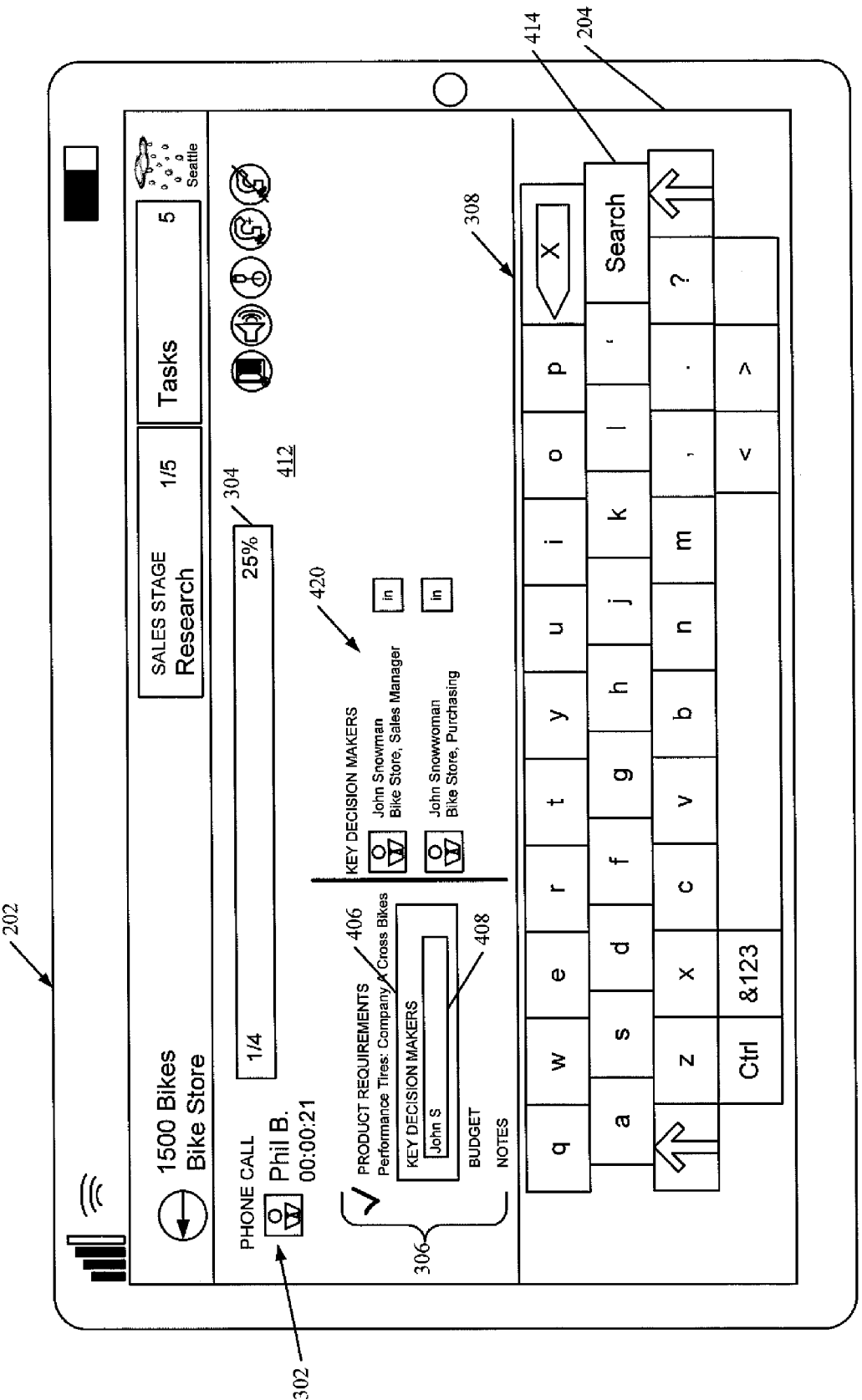

FIG. 6B shows one embodiment of a user interface display 410, which is similar to user interface display 404 shown in FIG. 6A, and similar items are similarly numbered. However, in FIG. 6B, it can be seen that user 108 has entered partial information "John S." in text box 408 using touch inputs on keyboard 308. User 108 can then optionally touch the "search" button 414. This can cause search component 111 to begin searching based on the partial information input in text box 408. It will also be noted that if system 100 includes a search-as-you-type function, then as user 108 is typing information in text box 408, search component 111 is performing searches, and refining the searches, based on additional information typed into text box 408. In any case, at some point, search component 111 searches internal or external data stores, or both, for additional information. This is indicated by block 416 in FIG. 6, and the searching can be performed in any of a variety of different ways.

For example, search component 111 can perform the searching based on the spelling or letters input in text box 408. This is indicate by block 418 in FIG. 6. Search component 111 can also illustratively search based on connection graphs 139 in data store 102. For instance, if a given individual not only has the first name John and the first letter of his last name is S, but he also has a strong connection to the upper management in the ACME Company, then this information can be used to preferentially return data corresponding to that individual as a potential decision maker. This is indicated by block 419. Of course, search component 111 can use other information as well in returning search results, such as the context of the search (e.g., whether the search is for a financial person, a decision maker, a purchasing agent, a sales representative, etc.) as indicated by block 421, or using other search criteria as indicated by block 423.

In any case, search component 111 illustratively returns the information to decision maker selection component 117 which generates a user interface display (using user interface component 112) identifying potential key decision makers based upon the partial information input in text box 408. Generating and displaying the suggestions for the key decision makers is indicated by block 418 in FIG. 6, and the display of the key decision makers is shown generally at 420 on display 412 of FIG. 6B.

It can be seen in FIG. 6B that two key decision makers have been identified. Each of the entries under the Key Decision Makers at 420 is illustratively a user actuatable button or link which, when actuated by the user, causes decision maker selection component 117 to retrieve and display additional information corresponding to the individual person identified.

Figure 6C:
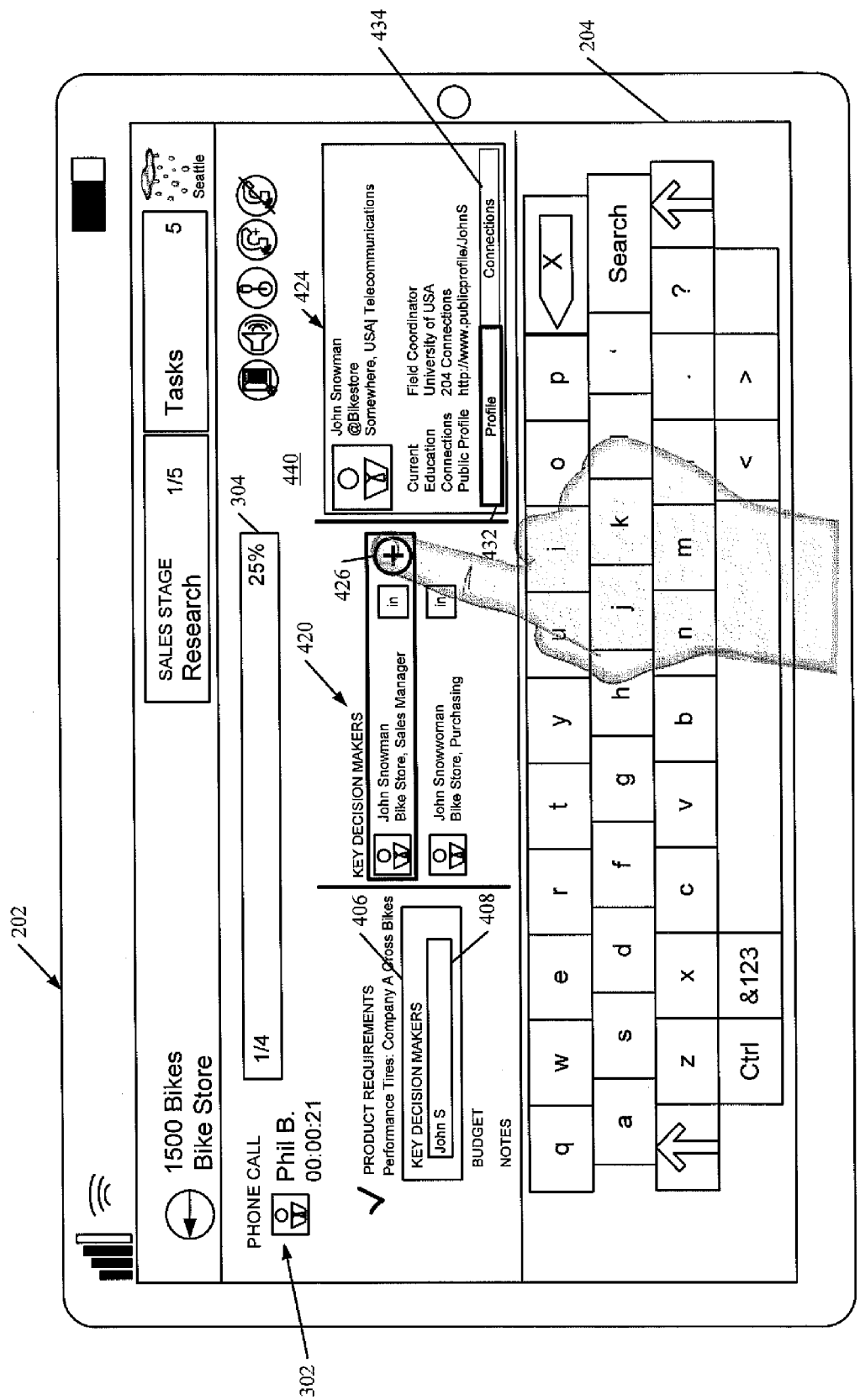

FIG. 6C shows an exemplary user interface display 422, that is similar to user interface display 412 shown in FIG. 6B, and similar items are similarly numbered. However, FIG. 6C shows that the user has touched the first entry under the key decision makers (for John Snowman). This causes decision maker selection component 117 to display the additional information (such as profile information) corresponding to John Snowman in the additional information section 424. Receiving the touch gesture to display additional details is indicated by block 428 in FIG. 6, and displaying the additional details is indicated by block 430. In the embodiment shown in FIG. 6C, the additional information can take a number of different forms. For example, section 424 is provided with two user actuatable buttons, including a profile button 432 and a connections button 434. FIG. 6C shows that the user has actuated the profile button 432 so that the additional information shown at 424 is profile information corresponding to John Snowman. Profile information is indicated by block 436 in FIG. 6.

Figure 6D:
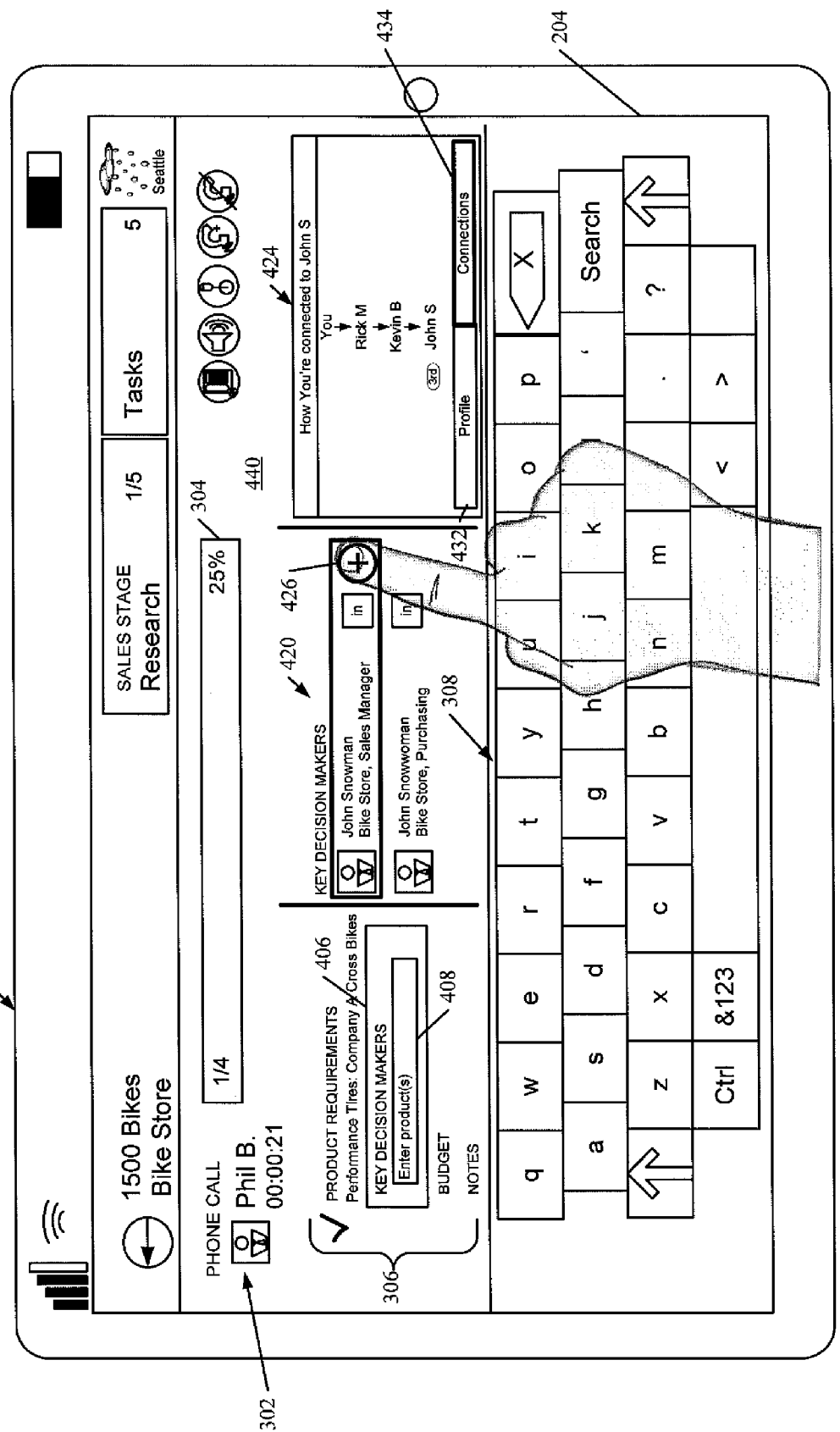

However, when the user actuates connections button 434, this causes connection generator 113 in CRM system 100 to display the connection graph indicating how user 108 is connected to John Snowman. The connection graph is indicated by block 438 in FIG. 6, and one embodiment of this is shown in FIG. 6D. FIG. 6D shows a user interface display 440, which is similar to user interface display 22 shown in FIG. 6C, and similar items are similarly numbered. However, FIG. 6D shows that, because the user 108 has actuated the connections button 434, a connection graph 438 is displayed in section 424 as the more detailed information corresponding to John Snowman. The connection graph shows how user 108 is connected to John Snowman. Of course, the additional information 424 can take other forms as well, and this is indicated by block 442 in FIG. 6.

Figure 6E:
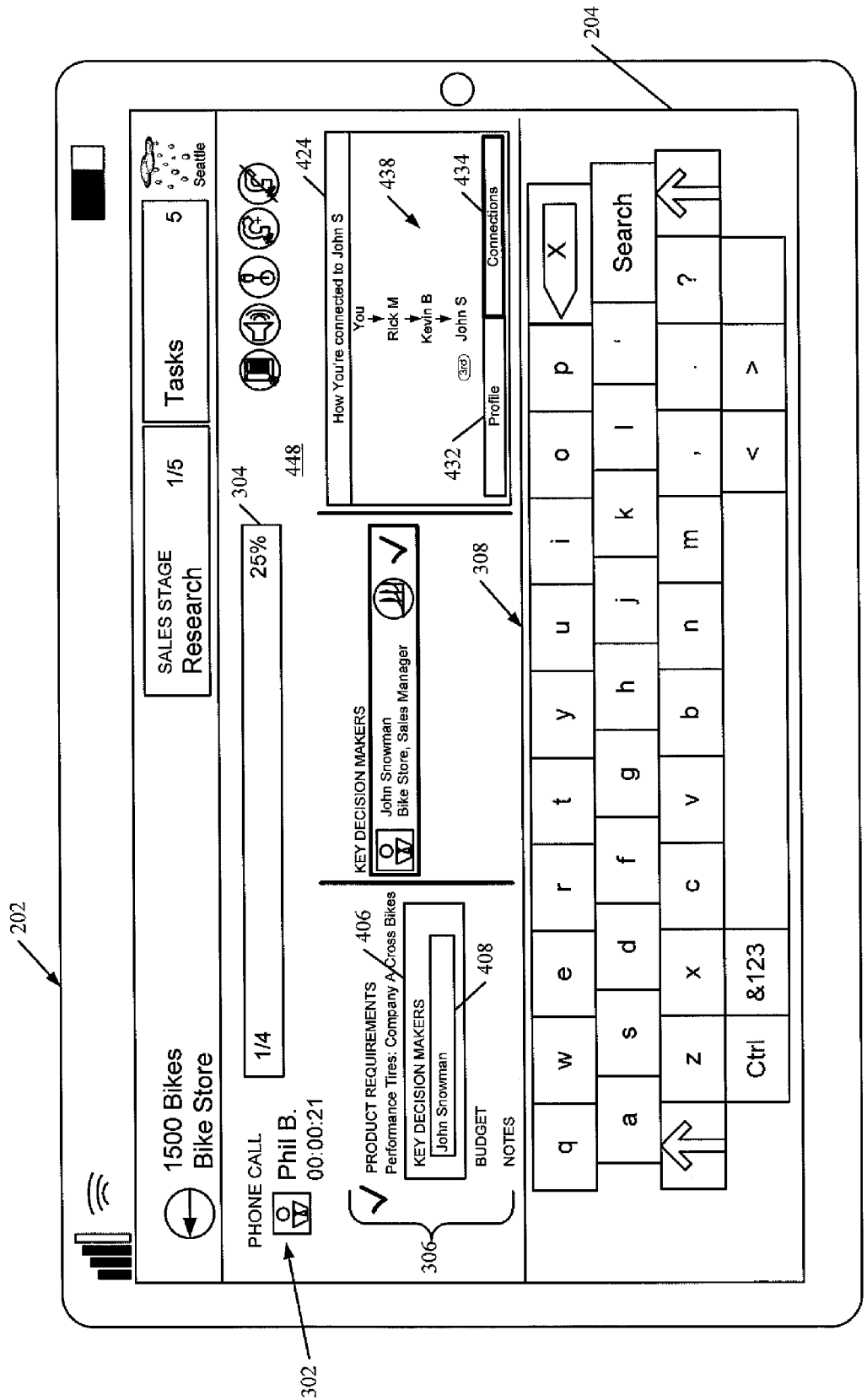

User interface display 422 also has addition button 426 displayed adjacent the key decision maker entry which allows the user 108 to add that person to the opportunity record. FIG. 6E also shows user interface display 448 in which user 108 has touched the addition button 426 to add John Snowman to the opportunity record as a key decision maker. Receiving the touch gesture to add the decision maker is indicated by block 444 in FIG. 6. In response, decision maker selection component 117 adds John Snowman to the opportunity record in CRM system 100. This is indicated by block 446 in FIG. 6. It can be seen that user interface display 448 is similar to user interface display 440 shown in FIG. 6D, except that user interface display 448 now shows that John Snowman has been added as a key decision maker to the opportunity record in text box 408.

Figure 6F:
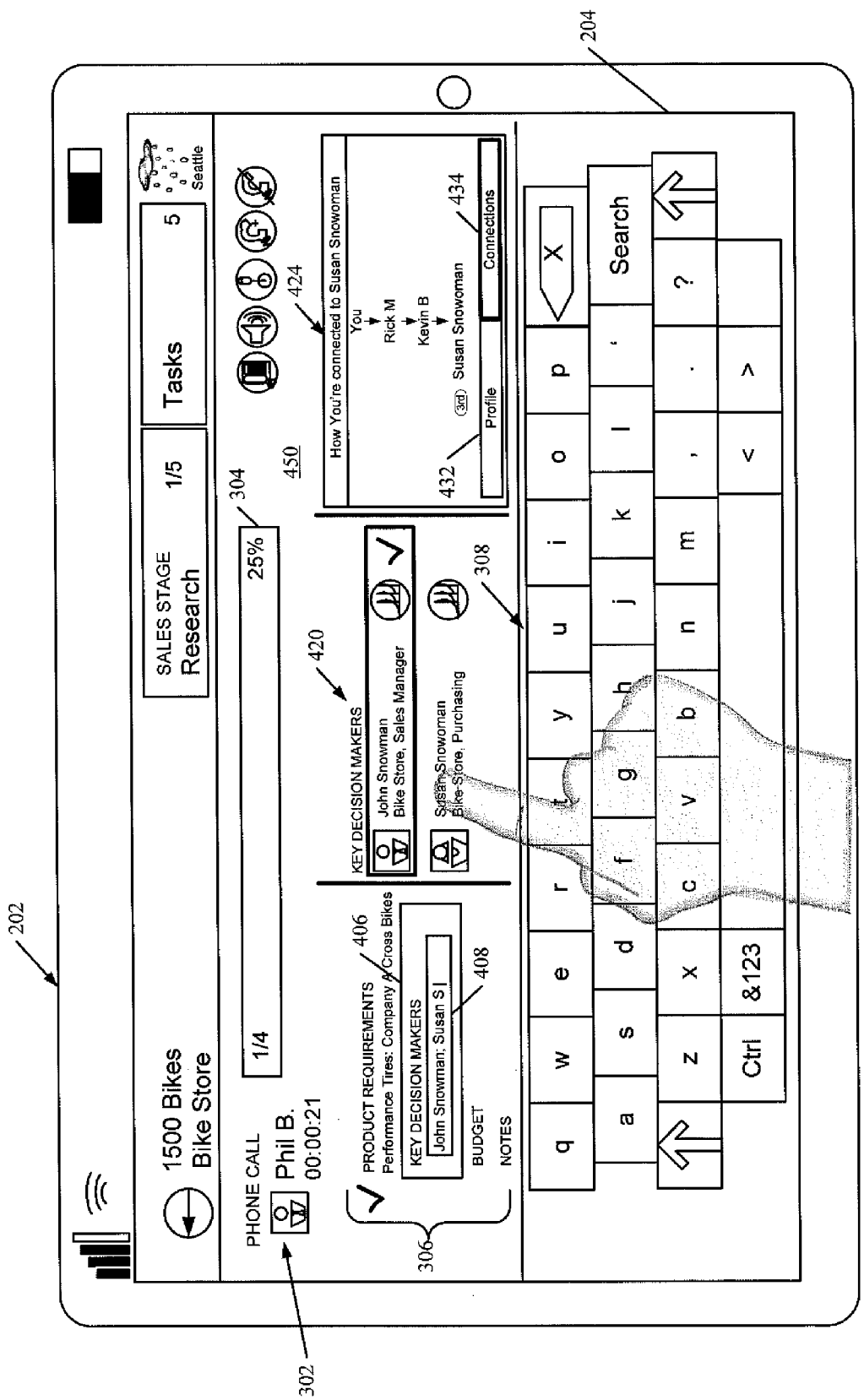
Figure 6G:
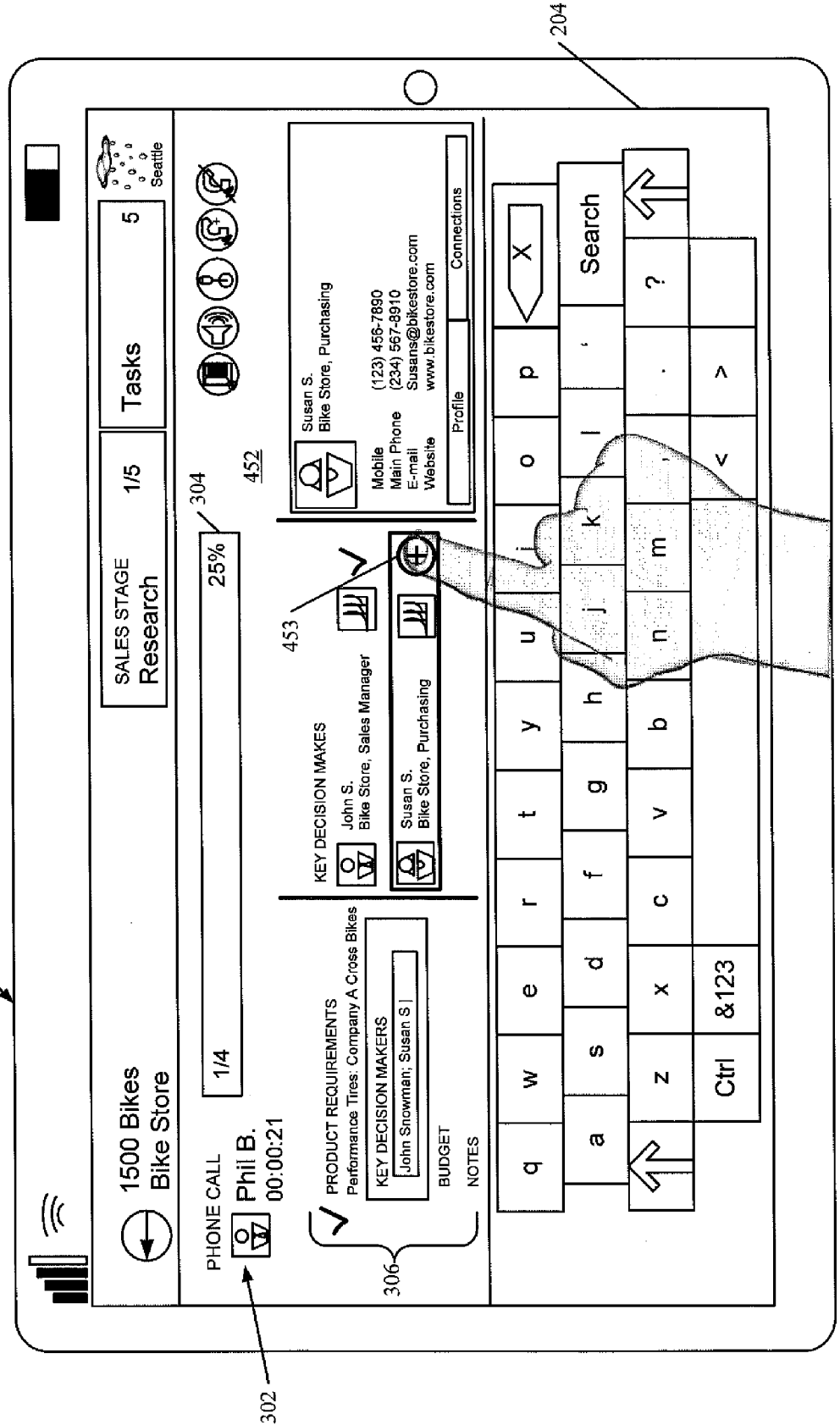
Figure 6H:
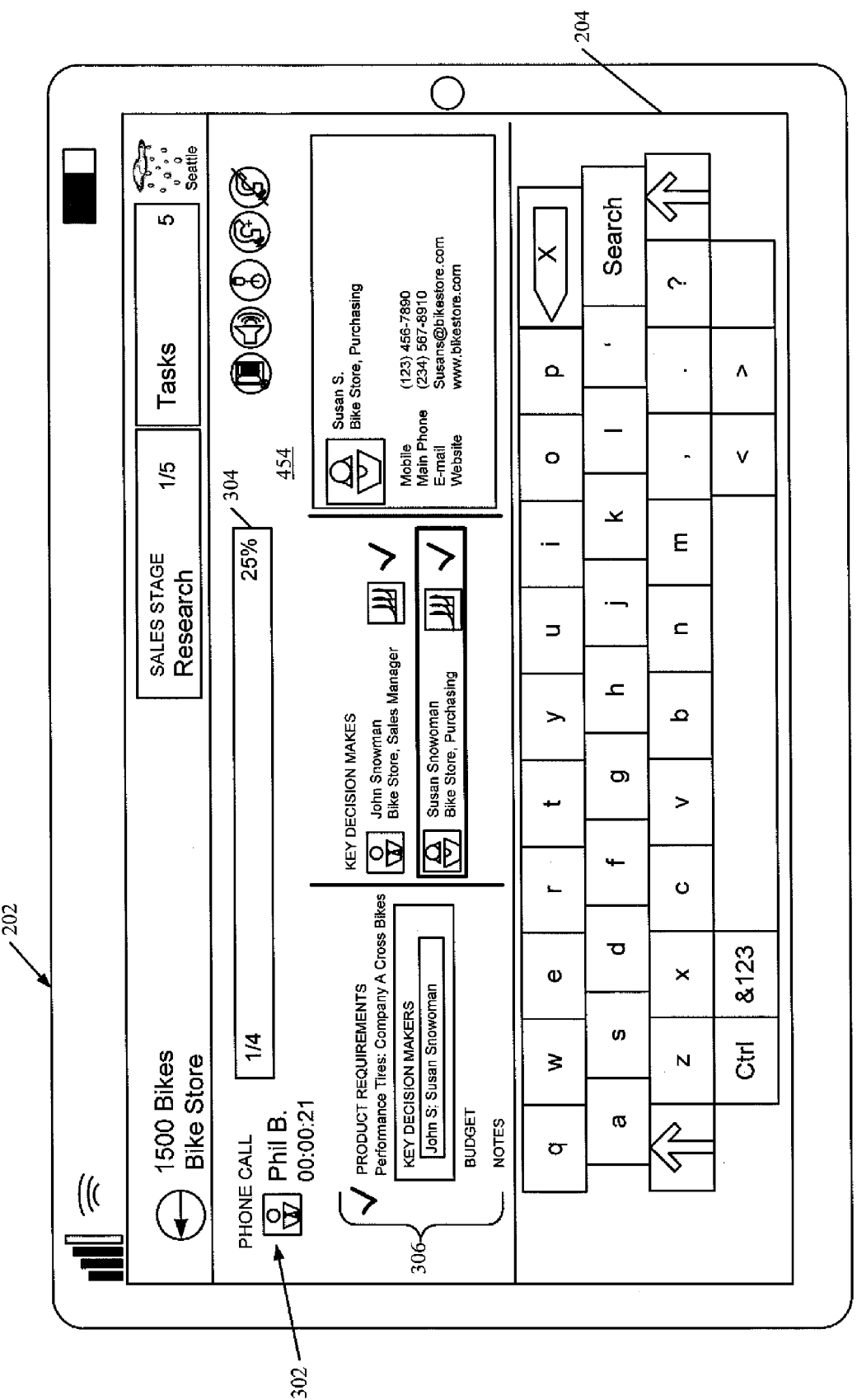
Figure 6I:
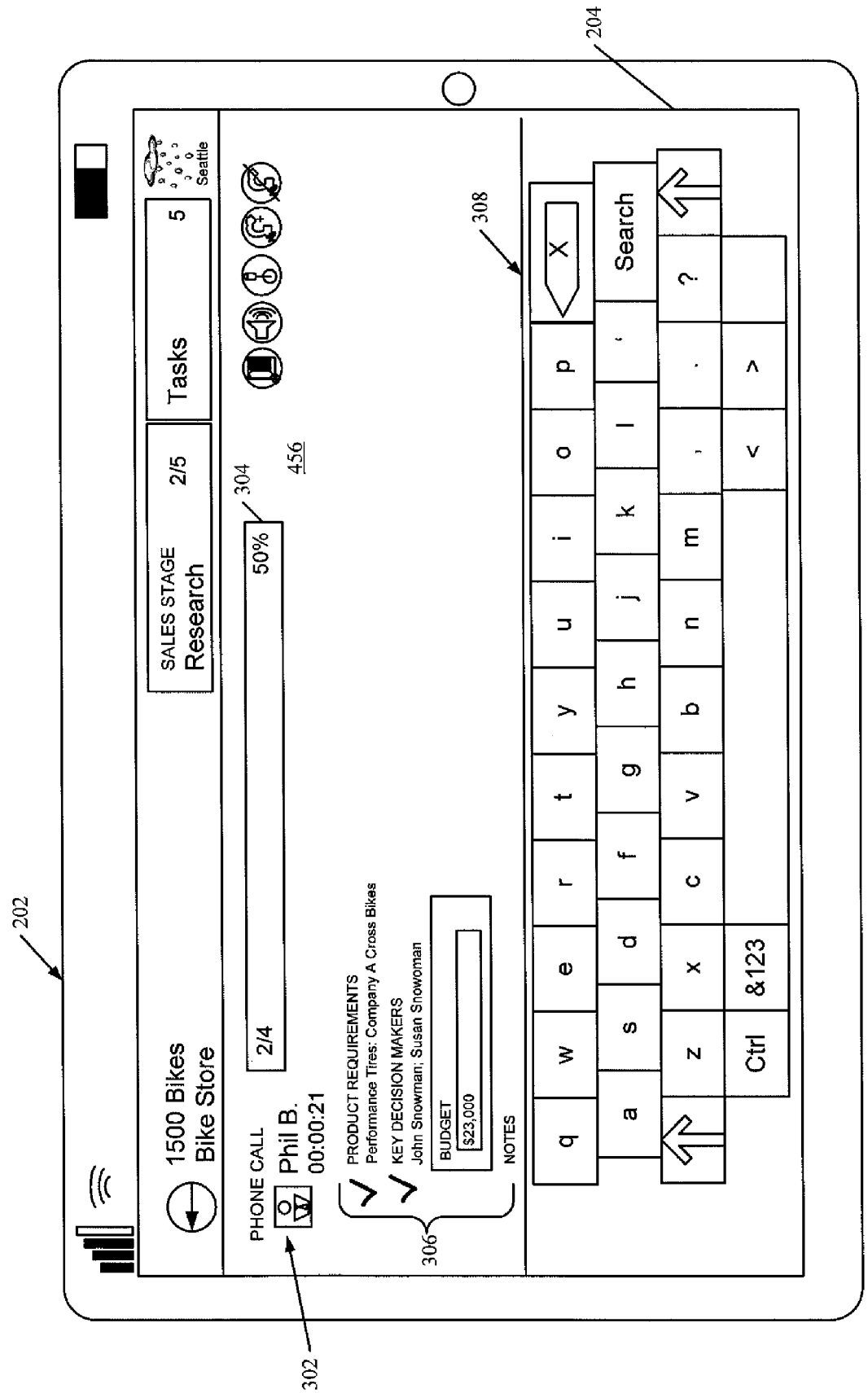

Of course, the process can be repeated to add additional decision makers as well. For instance, FIG. 6F shows one embodiment of a user interface display 450. User interface display 450 shows that user 108 has entered more partial information in text box 408. Specifically, the user has entered "Susan S". This causes search component 111 to conduct another search and return information for decision maker selection component 117. In response, component 117 generates a display of a suggested key decision maker "Susan Snowwoman". When the user touches that entry, additional information section 424 is updated with additional information (such as profile information or a connection graph) indicating profile information for Susan Snowwoman or showing a connection graph of how user 108 is connected to Susan Snowwoman. FIG. 6F shows that the user has selected the connections button 434 so a connection graph is shown. FIG. 6G shows a user interface display 452 that shows the user has selected the profile button 432 so that profile information is shown. FIG. 6G also shows that the user is actuating an addition button 453 corresponding to the Susan Snowwoman link under the key decision makers at 420. This adds Susan Snowwoman as a key decision maker in the opportunity record and this is shown in the user interface display 454 in FIG. 6H.

FIG. 6I is an exemplary user interface display 456. User interface display 456 now shows that, during the call with Phil B., the opportunity record was updated to include not only the product requirements of the opportunity, but also to identify the key decision makers at the ACME Company (the company for which the opportunity record is being generated).

Figure 7:
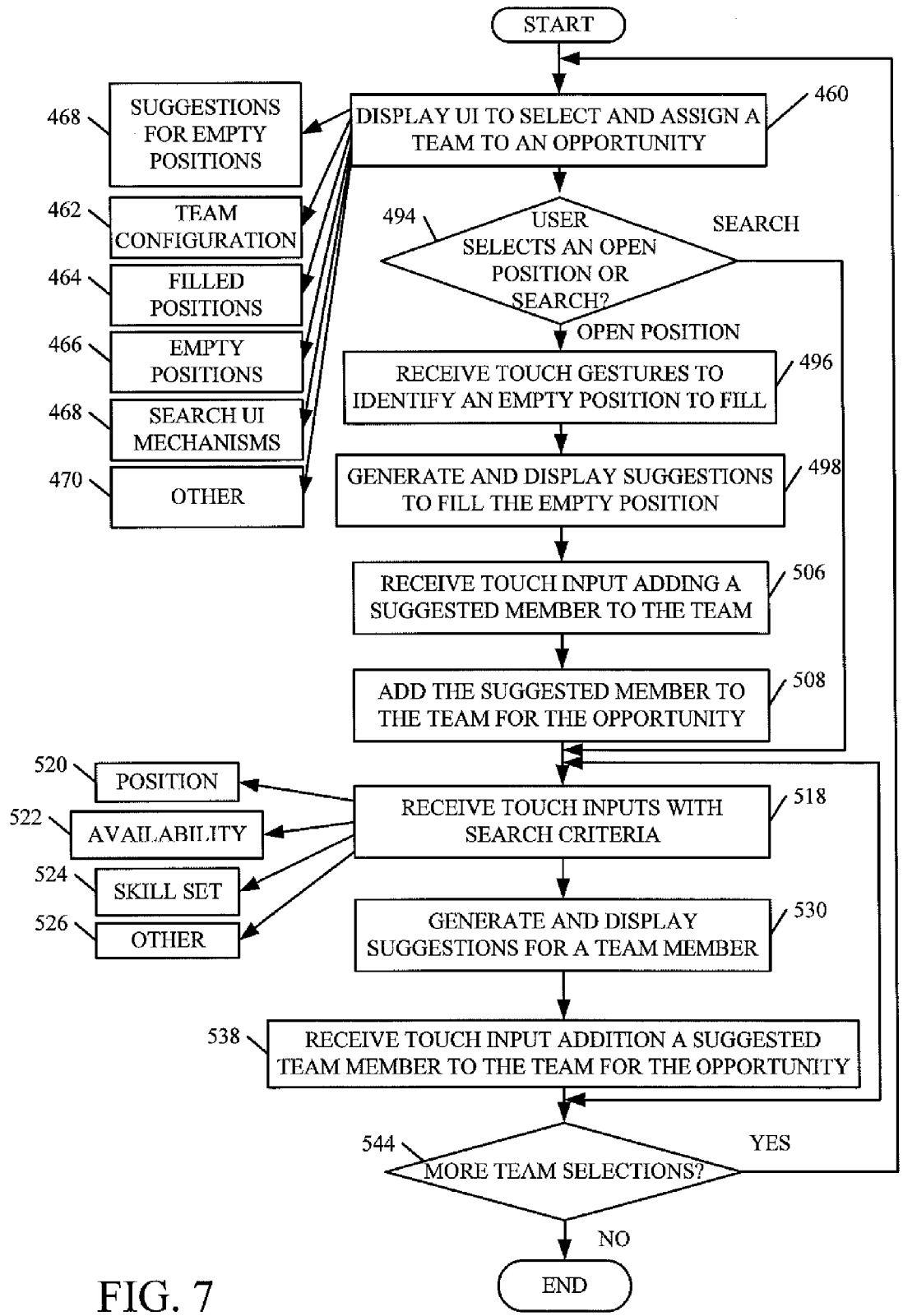
FIG. 7 is a flow diagram illustrating one embodiment of the operation of the system shown in FIG. 1 in adding team members to a business record, based on touch gestures.

FIG. 7 is a flow diagram illustrating one embodiment of the operation of the system 100 shown in FIG. 1 in configuring a team and assigning team members to a business data record. More specifically, FIG. 7 shows one embodiment of selecting and assigning team members to a business opportunity data record in CRM system 100. FIGS. 7A-7I are illustrative user interface displays. FIGS. 7-7I will now be described in conjunction with one another.

In the embodiment shown in FIG. 7, team selector component 116 first generates a user interface display with user input mechanisms that allow user 108 to select and assign a team to the opportunity record. This is indicated by block 460 in FIG. 7.

The user input mechanisms can allow user 108 to configure the team, such as by specifying the various positions that are to be filled for the team. This is indicated by block 462. The user interface display can also indicate which positions have already been filled as indicated by block 464, and which positions are empty as indicated by block 466. Further, suggestion component 115 can suggest individuals to fill the various empty positions on the team, and this is indicated by block 468.

The user interface display can also illustratively provide search user input mechanisms that allow user 108 to search the personnel information in CRM data store 102 to identify various persons that may be appropriate team members. This is indicated by block 468. Of course, the user interface display can include other items as well, and this is indicated by block 470.

Figure 7A:
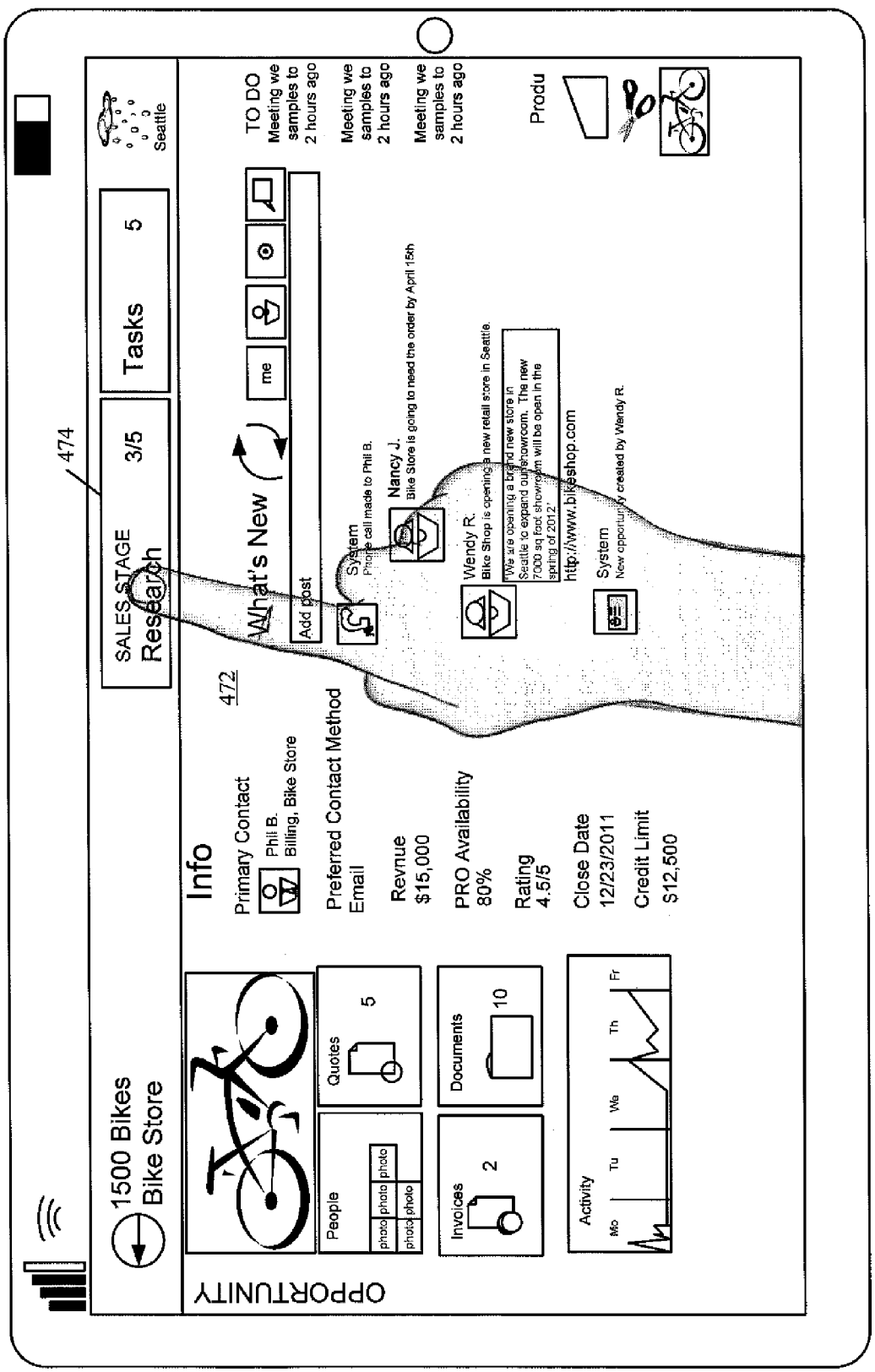
Figure 7B:
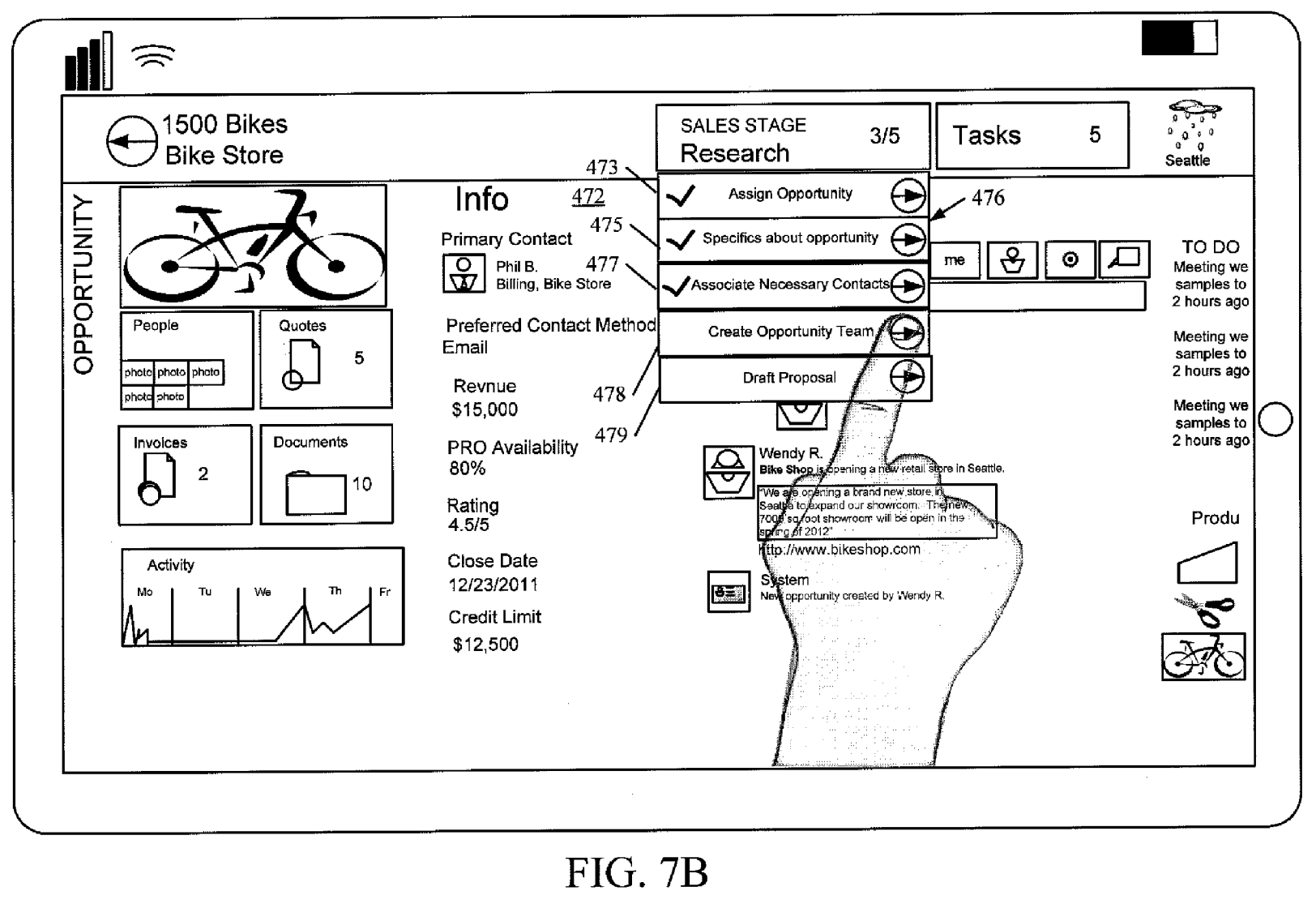

FIG. 7A is one illustrative user interface display 472 that allows the user to begin the process of selecting and assigning a team to the opportunity record. User interface display 472 illustratively includes a user actuatable research button 474. When button 474 is actuated by the user, a dropdown menu is displayed, such as menu 476 shown in FIG. 7B. Dropdown menu 476 allows the user to choose one of a number of different options for further adding information to, or configuring, the opportunity represented by user interface display 472. For instance, the user can assign the opportunity to a company or to a primary contact or other personnel as indicated by button 473. The user can input specifics about the opportunity or associate contacts to the opportunity as indicated by buttons 475 and 477. All of these operations have been completed in the embodiment shown in FIG. 7B. The user can also create an opportunity team by actuating button 478 from dropdown menu 476 or draft a proposal by actuating button 479. FIG. 7B shows that the user is actuating button 478 to create an opportunity team.

Figure 7C:
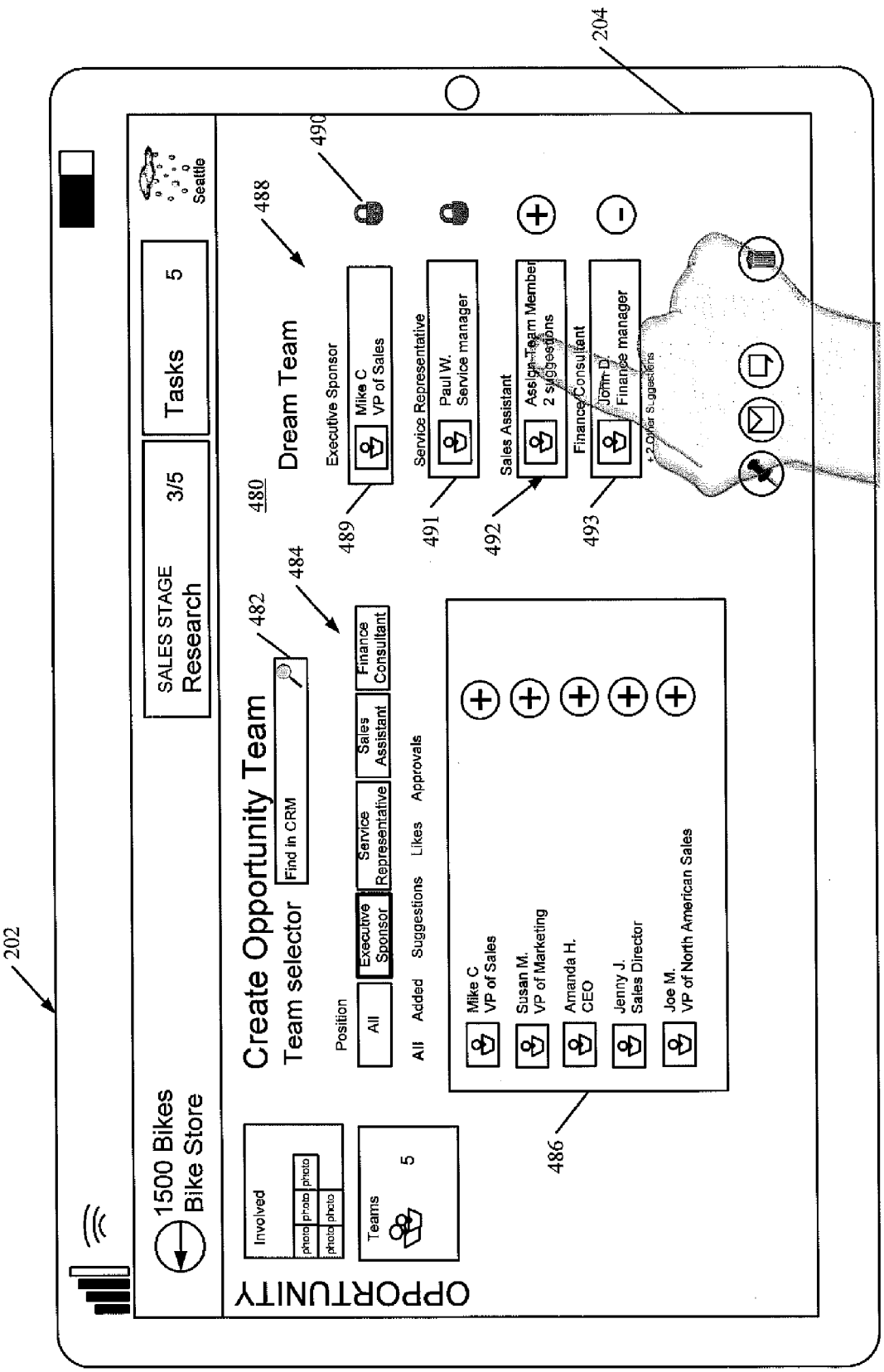

In response to actuating button 478, team selector component 116 uses user interface component 112 to generate a user interface that allows user 108 to select team members and assign them to a team associated with the opportunity represented by user interface display 472. FIG. 7C shows one embodiment of a user interface display 480 that allows user 108 to do this. It can be seen that user interface display 480 show in FIG. 7C has a team selector search box (or team selector field) 482 that allows the user to type in search criteria so that search component 111 can search for appropriate possible team members. User interface display 480 also has a position bar 484 with a plurality of buttons, one button corresponding to each of a variety of different positions on the team. When the user selects and actuates one of the buttons in position bar 484, a suggestion field 486 is populated by suggestion component 115 and team selector component 116 with suggestions to fill the position corresponding to the actuated button. For instance, in the embodiment shown in FIG. 7C, the "executive sponsor" team position button has been selected and actuated by the user. Therefore, field 486 includes a plurality of different suggestions for filling the "executive sponsor" position. By touching the plus sign adjacent the corresponding name in suggestion field 486, user 108 can assign that individual (or at least request them to be assigned) to the identified position in bar 484.

FIG. 7C also shows that user interface display 480 illustratively includes a team field 488. Team field 488 includes the various positions that are to be filled for the team, along with the identity of an individual who has filled each position, or an indication that the position has not yet been filled. For instance, user interface display 480 shows that the executive sponsor position has been filled by "Mike C.". An indication that Mike C. has finally been assigned to this position is shown at 490. That is, the lock indicates that Mike C. has been finally assigned to (or is locked into) the position. Similarly, field 488 shows that the sales representative position has been filled by Paul W. However, field 488 also shows that a sales assistant position and a finance consultant position have not yet been filled.

Each of the positions in field 488 illustratively has a corresponding user actuable input mechanism identified by box 489, 491, 492 and 493. These boxes are, of course, exemplary only. FIG. 7C shows that the user is selecting an open position (the sales assistant position) by touching the button or user actuatable input mechanism 492 associated with that position. Of course, it will be noted that the user could also enter search criteria into box 482 in order to obtain suggestions to fill a position as well. The user selecting either an open position or entering search criteria is indicated by block 494 in the flow diagram of FIG. 7.

Because the user has touched the sales assistant button 492, team selector component 116 uses user interface component 112 to generate a user interface display with suggestions to fill the empty position. Receiving the touch gesture on the open sales assistant position as indicated by block 496 in FIG. 7 and generating the display with suggestions to fill the empty position as indicated by block 498.

Figure 7D:
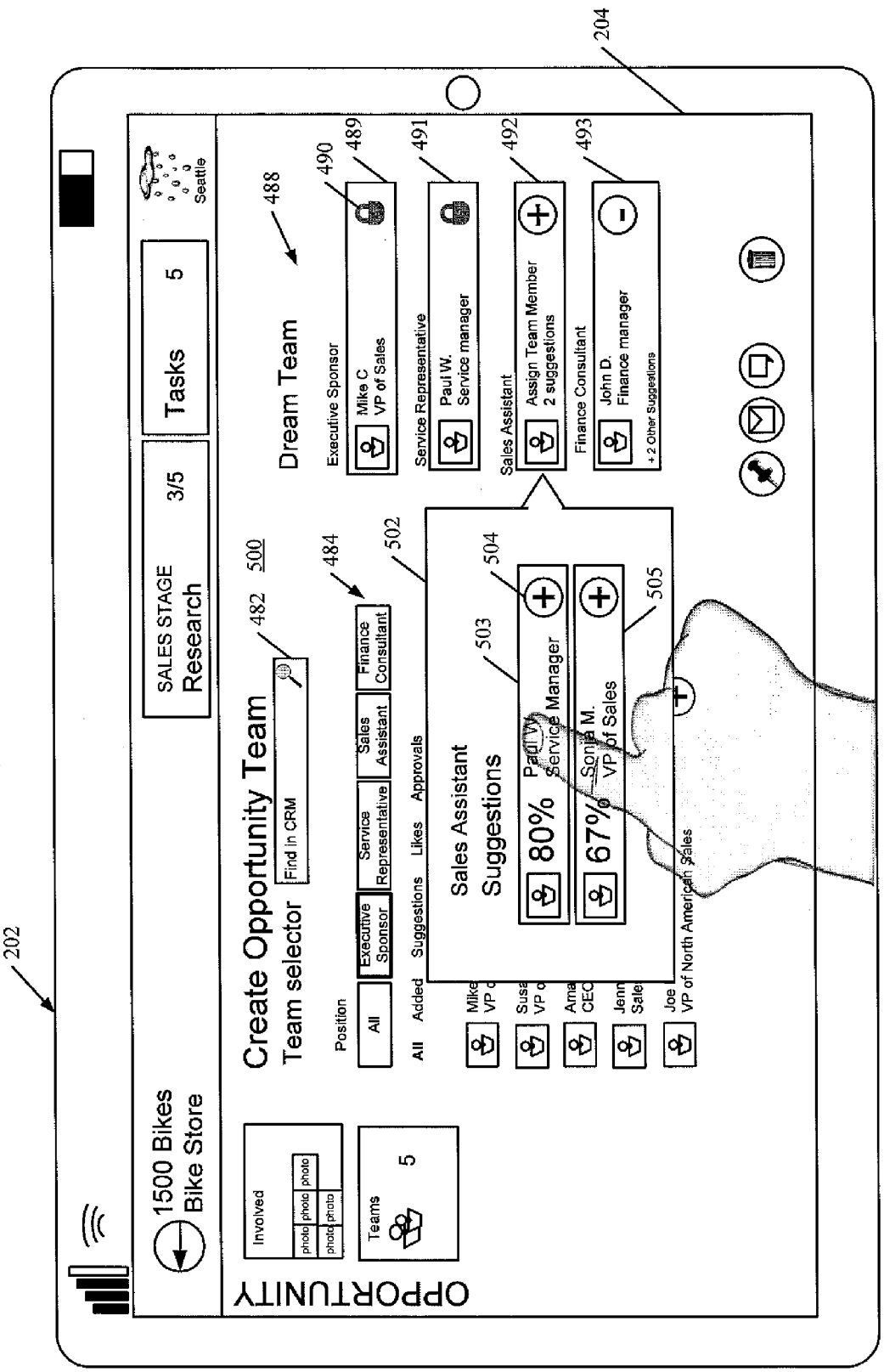

FIG. 7D is one illustrative user interface display 500 that shows a suggestion field 502 that provides suggestions for the sales assistant position. It can be seen that, in one embodiment, the suggestion field 502 provides two suggestions for the sales assistant position. The first is Paul W. and the second is Sonja M. Both suggestions have a corresponding user actuatable input mechanism 503 and 505. It can be seen that each of the suggestions also has a percent associated therewith. The percent can be calculated by suggestion component 115 based on a variety of different criteria. For instance, the percent may be calculated based on how likely it is that the sales assistant will close a sale with the company represented by the business opportunity. This may be based on the sales assistant's prior sales history with that company, based on prior sales history within the field, based upon the particular sales assistant experience, or based on a wide variety of other criteria. These are listed for the sake of example only. In any case, Paul W. has an associated percentage of 80% while Sonja M. has an associated percentage of 67%.

FIG. 7D shows that the user 108 is selecting Paul W. This can be done in a number of different ways. For instance, in the embodiment shown in FIG. 7D, the user simply needs to touch the Paul W. user input mechanism 503. However, in another embodiment, the user first selects the Paul W. user input mechanism 503 and then touches the "add" button 504 associated with the Paul W. field. In any case, receiving the touch input adding a suggested member to the team is indicated by block 506 in FIG. 7. In response, team selector component 116 adds the selected individual to the team, in the corresponding position (in this case, in the sales assistant position). This is indicated by block 508 in FIG. 7.

Figure 7E:
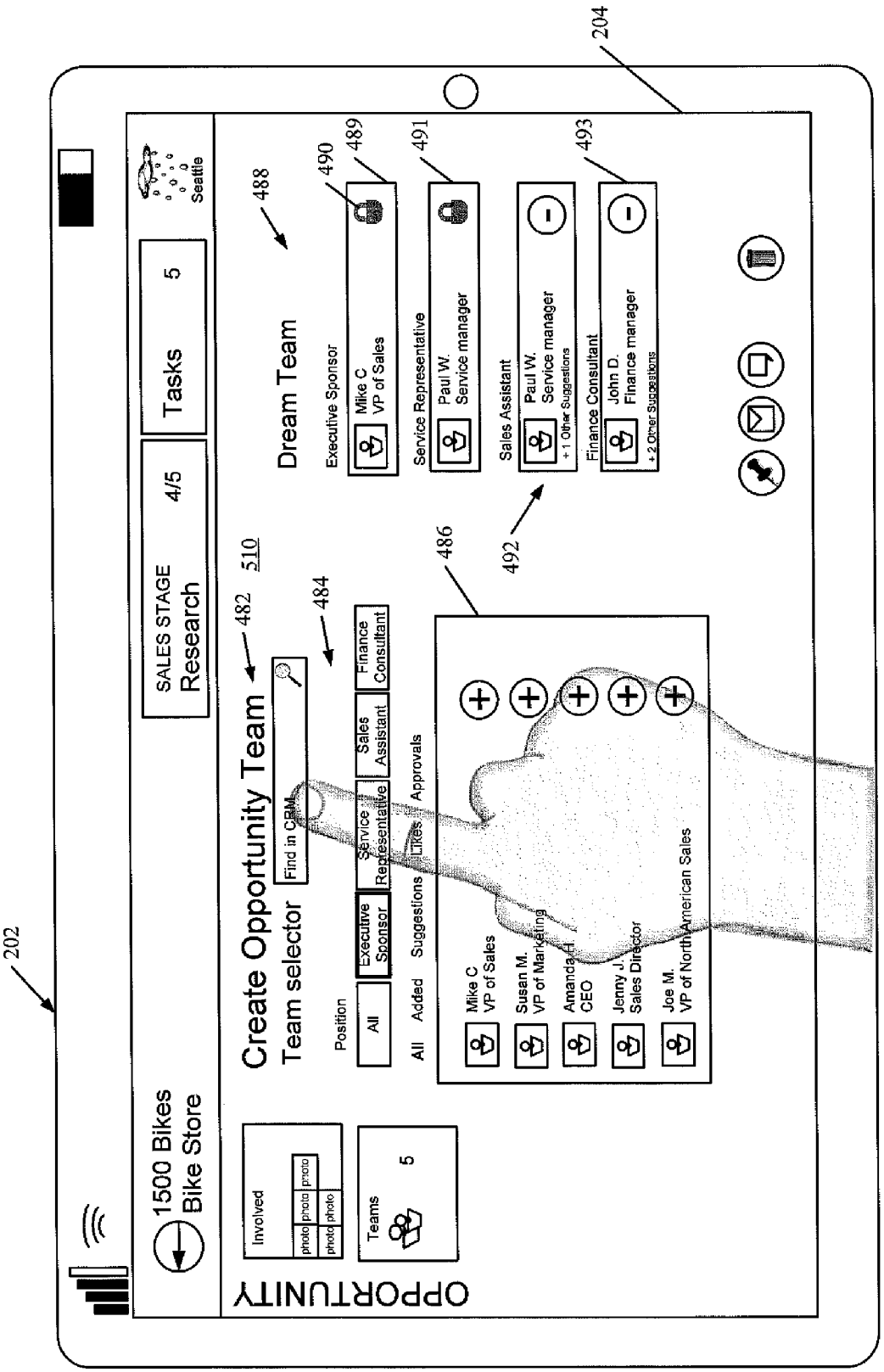
Figure 7F:
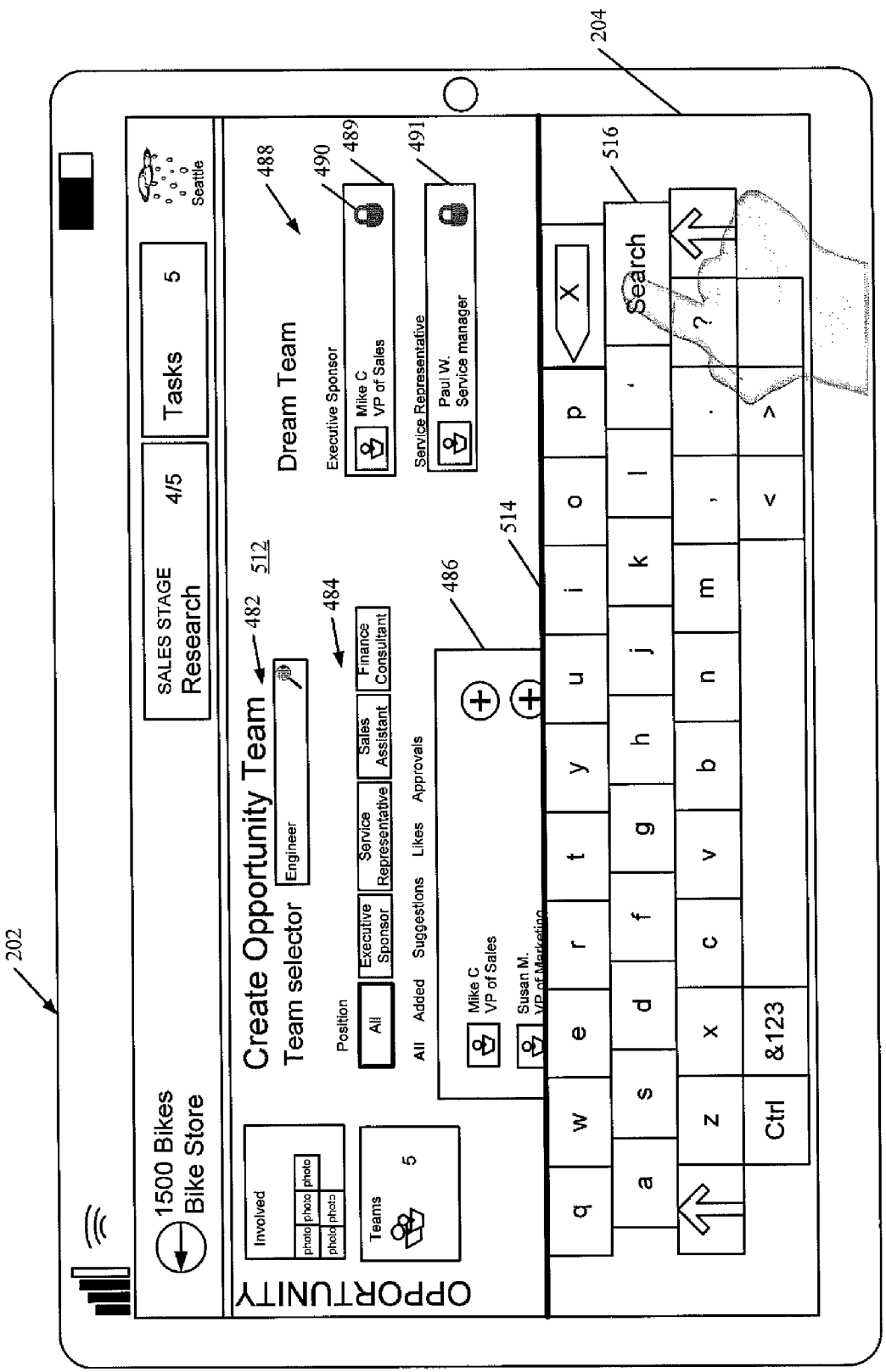

Returning again to block 404 in the flow diagram of FIG. 7, the user can touch the team selector search box 482 in order to input search criteria to define another team position or to find an individual to fill a team position, or to perform other searching. FIG. 7E is a user interface display 510 which shows that the user has touched the team selector search box 482. In one embodiment, team selector component 116 thus causes a user interface display, such as display 512 shown in FIG. 7F, to be generated. User interface display 512 is similar to user interface display 510, and similar items are similarly numbered. However, in the user interface display 512, it can be seen that a soft keyboard 514 is generated to receive user touch inputs to input search criteria in team selector search box 482. FIG. 7F shows that the user has typed the word "engineer" into team selector field 482 and is touching the "search" button 516. Receiving touch inputs with the search criteria is indicated by block 518 in FIG. 7.

While FIG. 7F shows that the user has input a position ("engineer") into search box 482, the search criteria could be other criteria a well. The position is indicated by block 520 in FIG. 7, but the search criteria could include availability specifying when the "engineer" is to be available (such as where the sales opportunity is on a tight or definite schedule.) This is indicated by block 522. The search criteria could also include a skill set that specifies the skills desired for an individual to fill the position. This is indicated by block 524. Of course, the search criteria could be other criteria as well, and this is indicated by block 526 in FIG. 7.

Figure 7G:
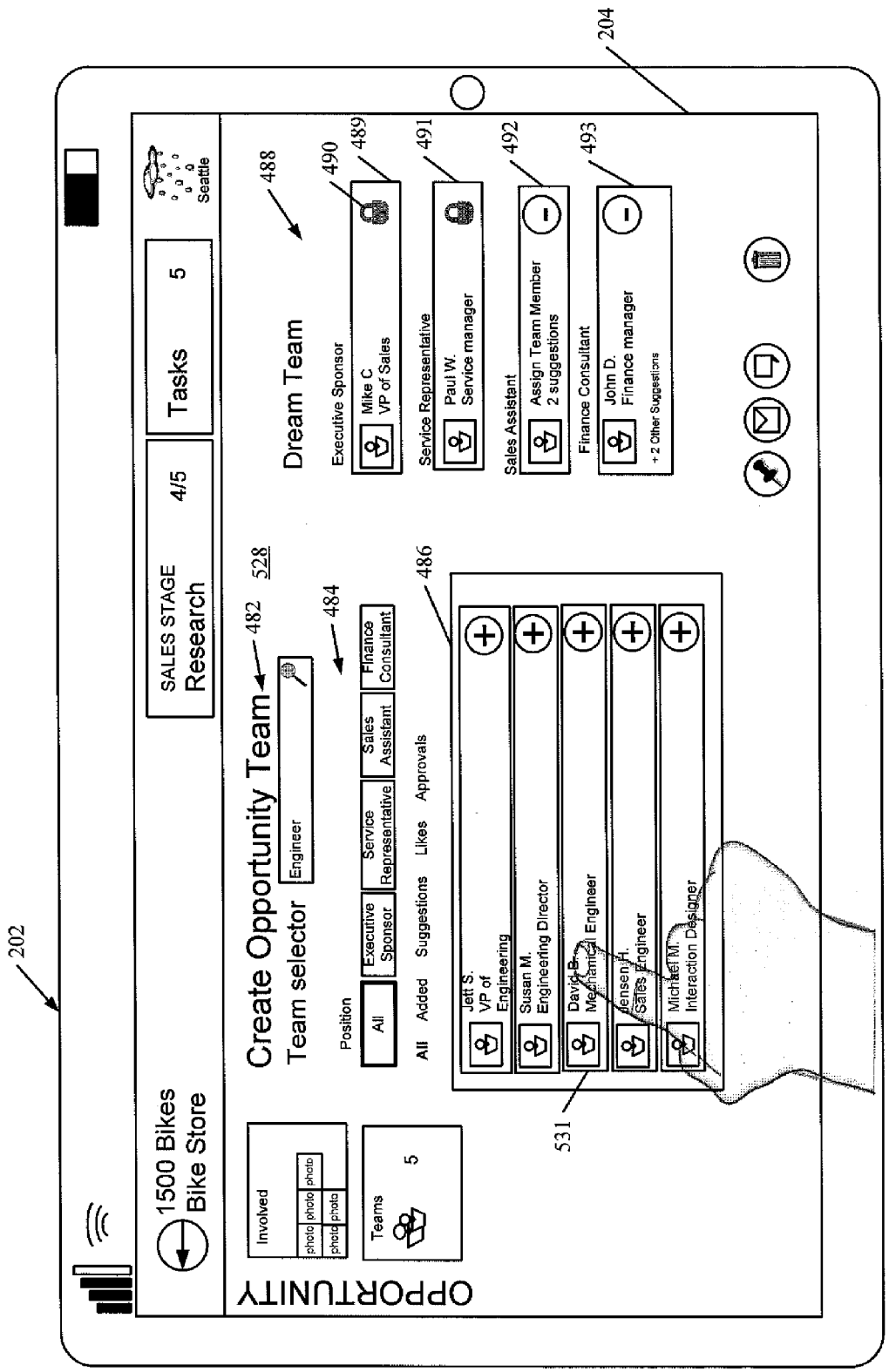

Once the user has actuated the search button 516 on keyboard 514, suggestion component 115 uses user interface component 112 to populate the suggestion field 486 with suggestions of individuals who meet the search criteria entered in search box 482. FIG. 7G shows one embodiment of a user interface display 528 that illustrates this. User interface display 528 shows that suggestion field 486 now has a plurality of different sections, each associated with a user actuatable button, of individuals that can fill the "engineering" position entered in search box 482. Generating and displaying the suggestions for a team member is indicated by block 530 in FIG. 7. FIG. 7G also shows that the user is selecting the user actuatable button 531 associated with one of the entries in field 486. In the embodiment shown, user 108 is selecting button 531 for "David B." who is a mechanical engineer.

Figure 7H:
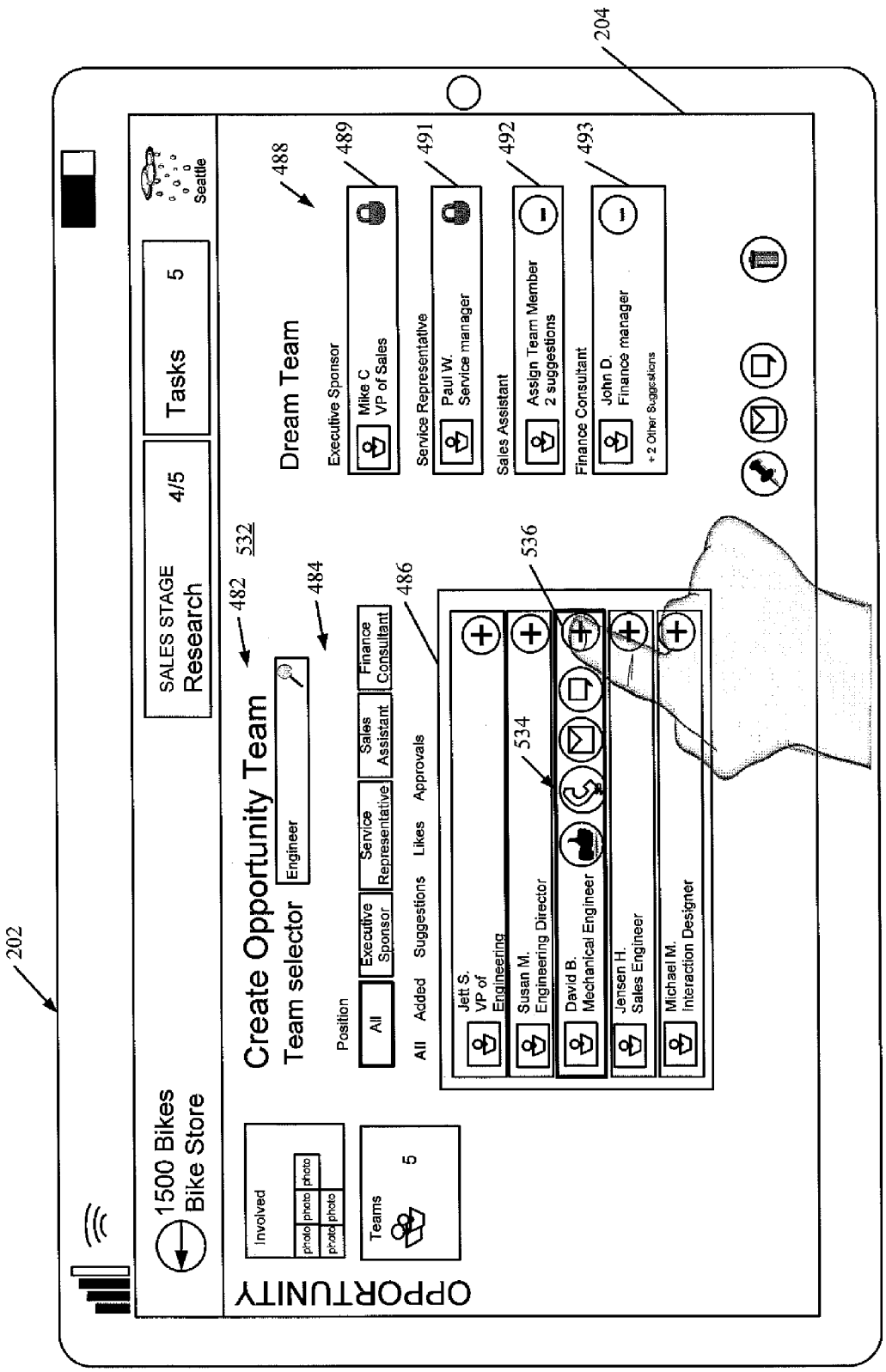
Figure 7I:
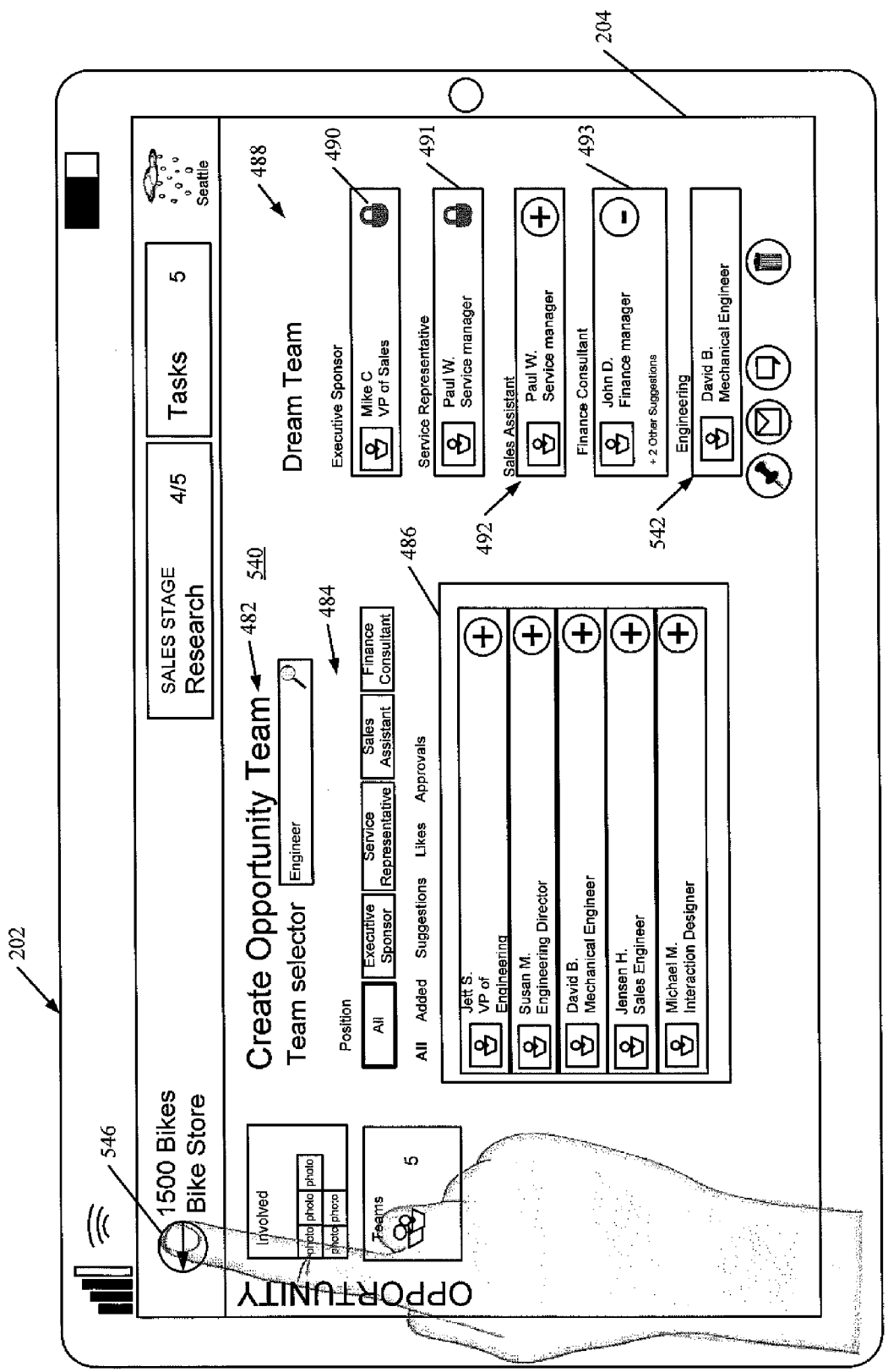

This causes team selector component 116 to use user interface component 112 to generate a user interface display, such as user interface display 532 shown in FIG. 7H. User interface display 532 shows that the user has selected "David B." and the user interface display, in one embodiment, shows a plurality of different mechanisms by which the individual can be contacted, generally indicated at 534, and also includes an "add" button 536 to add the corresponding individual to the team. FIG. 7H shows that the user has actuated add button 536. Receiving the touch input adding a suggested team member to the team for the opportunity record is indicated by block 538 in FIG. 7.

As a result of adding David B. to fill the engineering position, team selector component 116 uses user interface component 112 to generate a user interface display, such as user interface display 540 shown in FIG. 7I. User interface display 540 shows that David B. has been added to fill the engineering position, and this is shown generally at 542.

Of course, the above processes described with respect to FIGS. 7-7I can be repeated to add additional team members to the team for the opportunity. This is indicated by block 544 in FIG. 7.

If the user has finished selecting team members, the user can simply actuate the "back" button 546 to return to the basic opportunity record to exit the team selection experience and revert back to the basic opportunity record. This is also shown in FIG. 7I.

Figure 8:
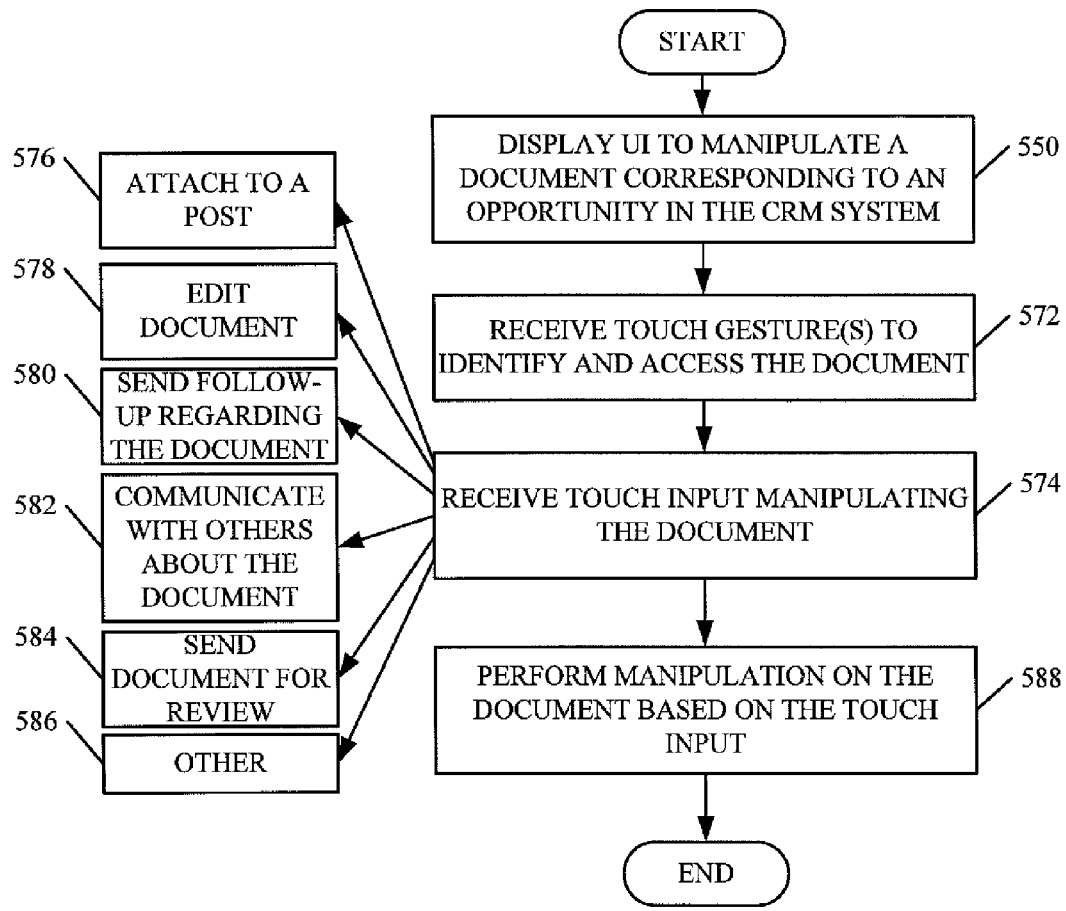
FIG. 8 is a flow diagram illustrating one embodiment of the operation of the system shown in FIG. 1 in manipulating a document corresponding to a business record based on touch gestures.
Figure 8A:
FIGS. 8A-8O show exemplary user interface displays.
Figure 8B:
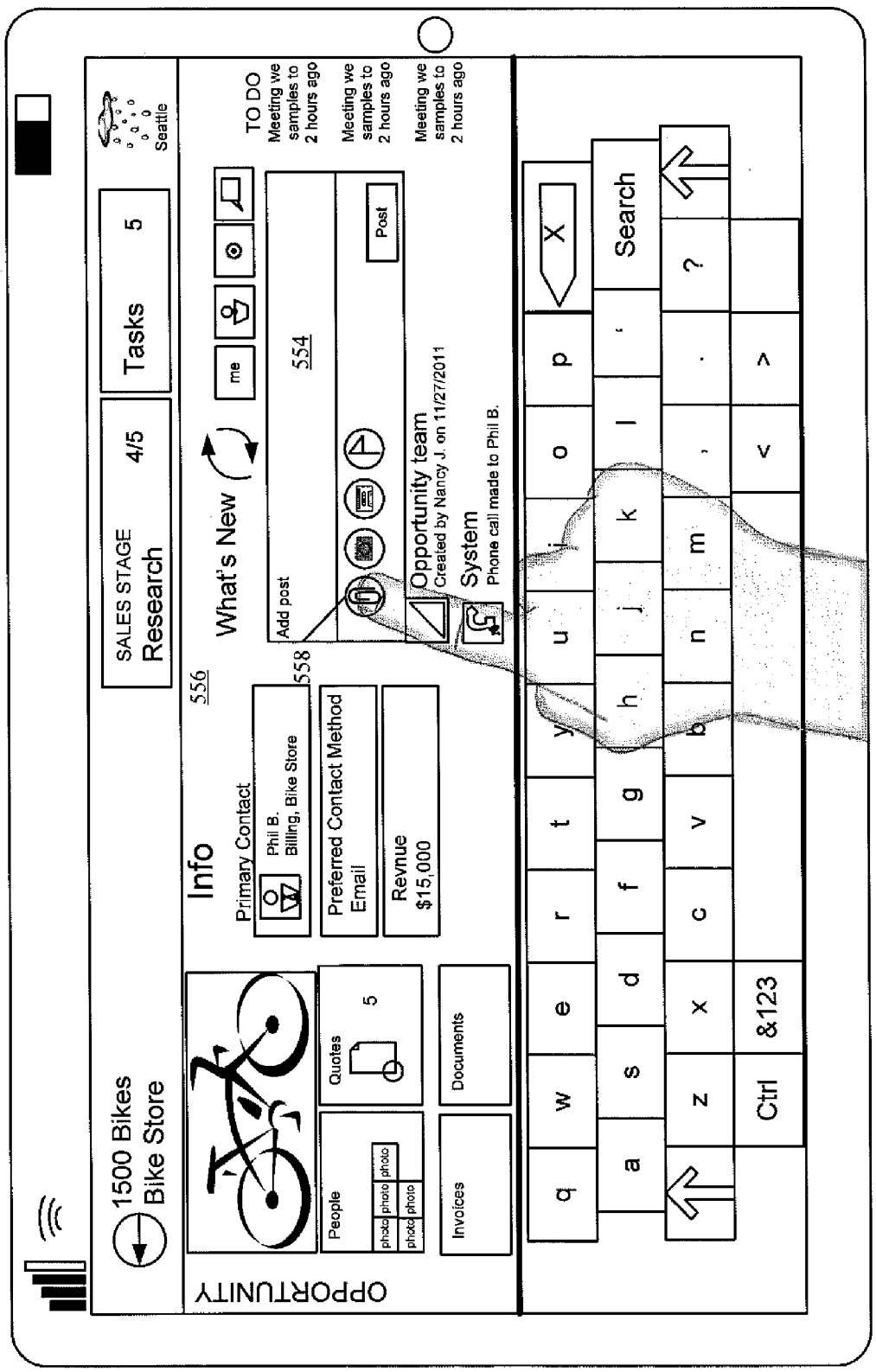

FIG. 8 is a flow diagram illustrating one embodiment of the operation of the system shown in FIG. 1 in allowing user 108 to manipulate a document within CRM system 100. FIGS. 8A-8O are illustrative user interface displays. FIGS. 8-8O will now be described in conjunction with one another.

Management component 119 first uses user interface component 112 to generate a user interface display that has user input mechanisms that allow user 108 to manipulate a document corresponding to the opportunity record in the CRM system 100. This is indicated by block 550 in FIG. 8. FIG. 8A shows one embodiment of a user interface display 552 that allows the user to do this. User interface display 552 is similar to user interface 228 shown in FIG. 3C, and similar items are similarly numbered. However, user interface display 552 shows that the user is actuating the "add post" text box 554 under the "what's new" section (or wall).

In response, document management component 119 generates user interface display 556 shown in FIG. 5B. It can be seen that the user 108 is provided with a number of user input mechanisms that allow user 108 to manipulate a post that is made to the "what's new" wall. In one embodiment, the buttons include an attachment button 558. User interface display 556 shows that the user is actuating button 558.

Figure 8C:
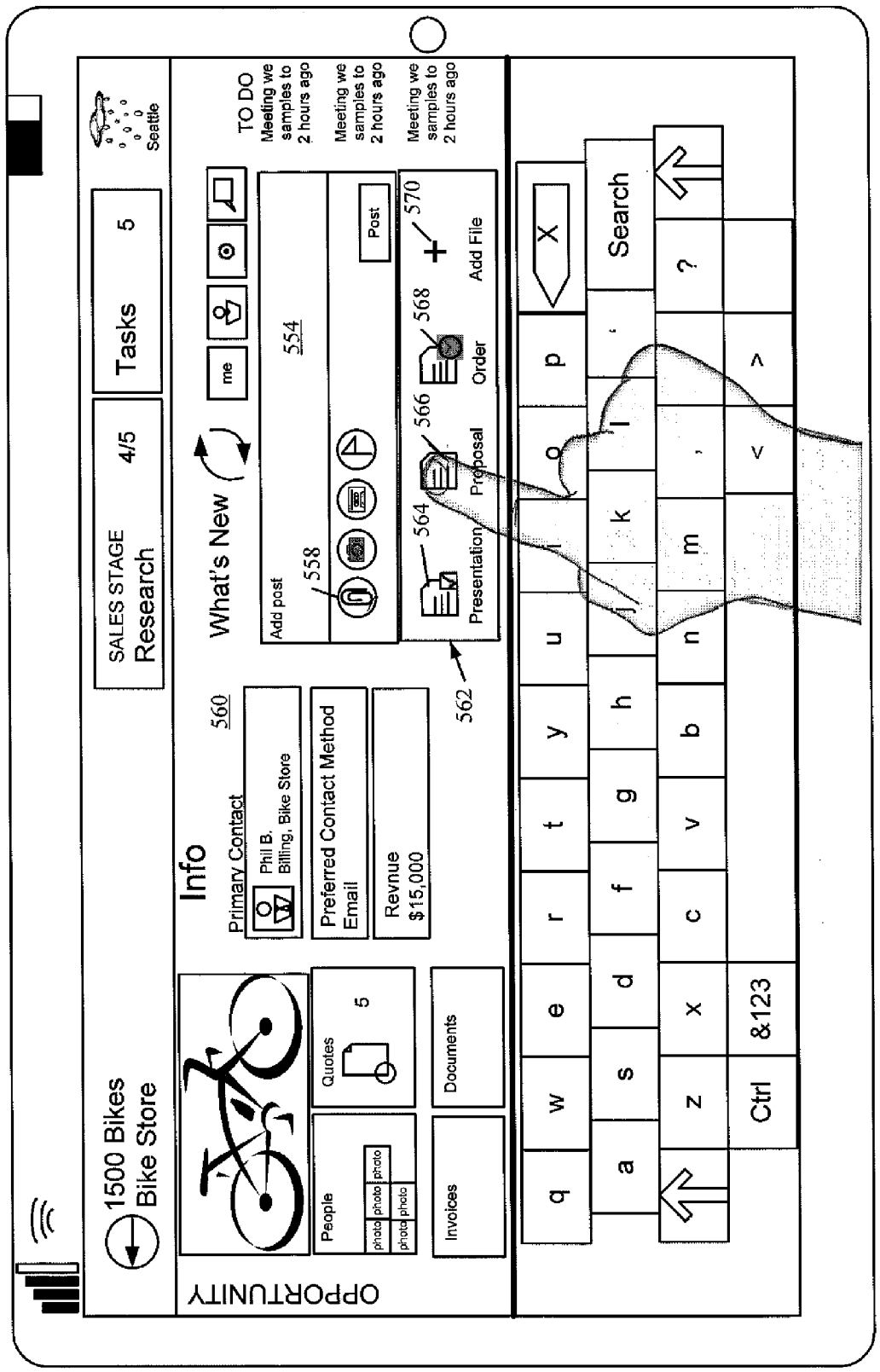

In response, document management component 119 generates a user interface display, such as display 560 shown in FIG. 8C. User interface display 560 is similar to user interface display 556, except that it now provides user input mechanisms (or section) 562 that allow the user to identify a specific document that is to be attached to the post. In the embodiment shown, the documents include presentation 564, proposal 566, and order 568. The user is also provided a user input mechanism 570 that allows user 108 to add another file as well. In any case, the documents identified in section 562 are illustratively documents that correspond to the sales opportunity record for which user interface display 560 is displayed. FIG. 8C shows that the user is touching the user input mechanism associated with proposal 566. Receiving the touch gesture identifying and accessing a given document is indicated by block 572 in FIG. 8.

Document management component 119 then retrieves the selected document (the proposal) from data store 102 or from another location and displays it for user manipulation. In one embodiment, component 119 uses user interface component 112 to generate one or more user interface displays with user input mechanisms that receive touch inputs from the user 108, so user 108 can manipulate the selected document. Receiving the touch gestures is indicated by block 574 in FIG. 8. The manipulation steps can take a wide variety of different forms. For instance, manipulating the document can simply mean attaching it to a post as indicated by block 576. It can also mean editing the document itself as indicated by block 578, or sending a follow-up regarding the document as indicated by block 580. In addition, the manipulation can include communicating with others about the document (e.g, asking others for assistance in modifying or editing the document or preparing the document, etc.) as indicated by block 582, or sending the document out for review as indicated by block 584. Of course, the manipulation steps could take a wide variety of other forms as well, and this is indicated by block 586.

Once the user touch gestures are received to manipulate the document, document management component 119 performs the manipulation on the document based upon the touch inputs. This is indicated by block 588 in FIG. 8.

FIGS. 8D-8O are exemplary user interface displays that are generated by document management component 119 or follow-up component 120, using user interface component 112. These user interface displays illustratively allow user 108 to perform various document manipulation operations.

Figure 8D:
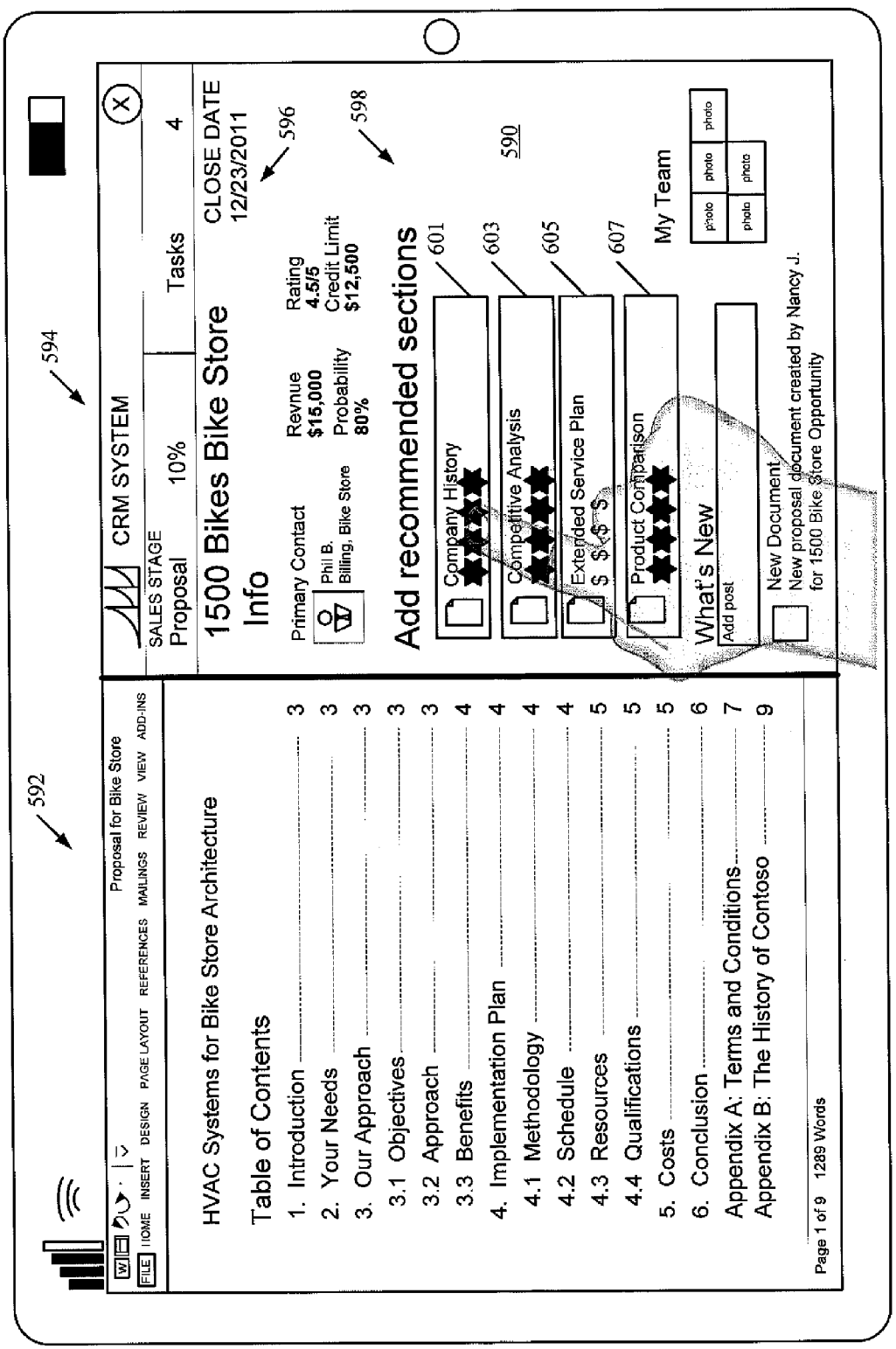

FIG. 8D shows one illustrative user interface display 590. User interface display 590 shows a document section 592 that displays the selected document. Display 590 also includes a wall section 594 that displays a wall corresponding to the document displayed in section 592. Wall section 594 includes an identifying portion 596 that identifies the document in section 592. It also identifies the primary contact for the document. In addition, in the embodiment shown in FIG. 8D, user interface 590 includes a recommendation section 598 that recommends additional sections to be added to the document shown in section 592. The recommended sections shown at 598 include "company history", "competitive analysis", "extended service plan", and "product comparison". In the embodiment shown, each of the recommended sections has an associated user actuatable button 601, 603, 605 and 607, respectively.

When the user actuates one of the buttons, the section is automatically added to the document shown at 592. FIG. 8D shows that the user is selecting button 601 the "company history" section for addition to the document. This causes document management component 192 to generate a display that allows the user to add the selected section to the document.

Figure 8E:
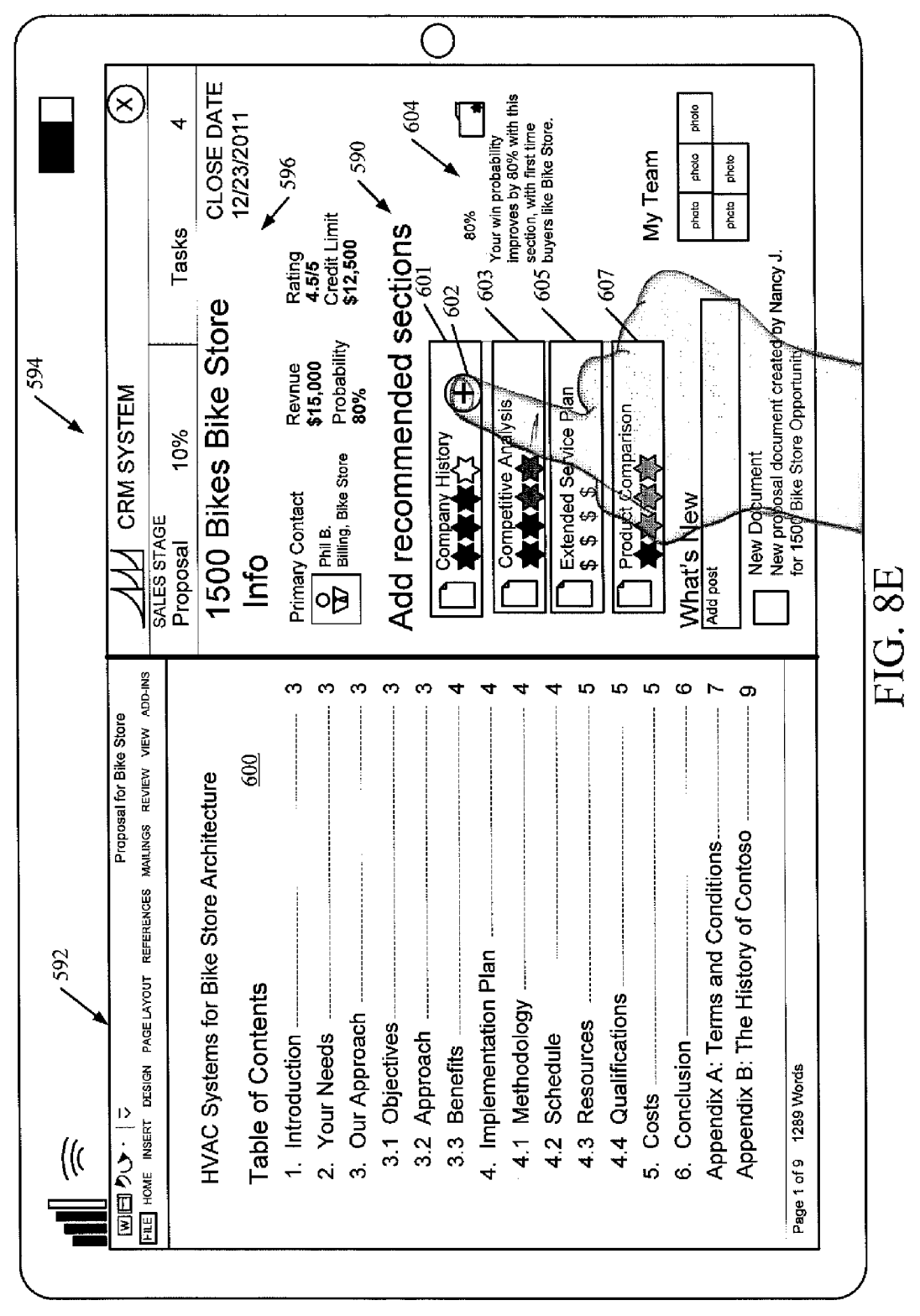

FIG. 8E shows a user interface display 600 that is similar to display 590 shown in FIG. 8D, and similar items are similarly numbered. However, user interface display 600 shows that, since the user has selected the "company history" button 601, it is highlighted on the display and an addition button 602 is added that allows the user to add the section to the document. FIG. 8E shows that the user 108 is actuating the addition button 602 to add the "company history" section to the document shown at 592.

FIG. 8E also shows that document management component 119 generates and displays a summary section 604 that describes how the probability of success improves based on the addition of the "company history" section to the proposal document. The narrative can be generated using a wide variety of different information sources. For instance, document management component 119 can track how many proposals are successful in different technology areas, and can calculate the percentage based on that. Of course, the document management component 119 can generate the narrative in a wide variety of other ways as well, including having it hand written by a human, based on off-line analysis. In any case, FIG. 8E shows that the user is selecting the company history section by actuating button 602.

Figure 8F:
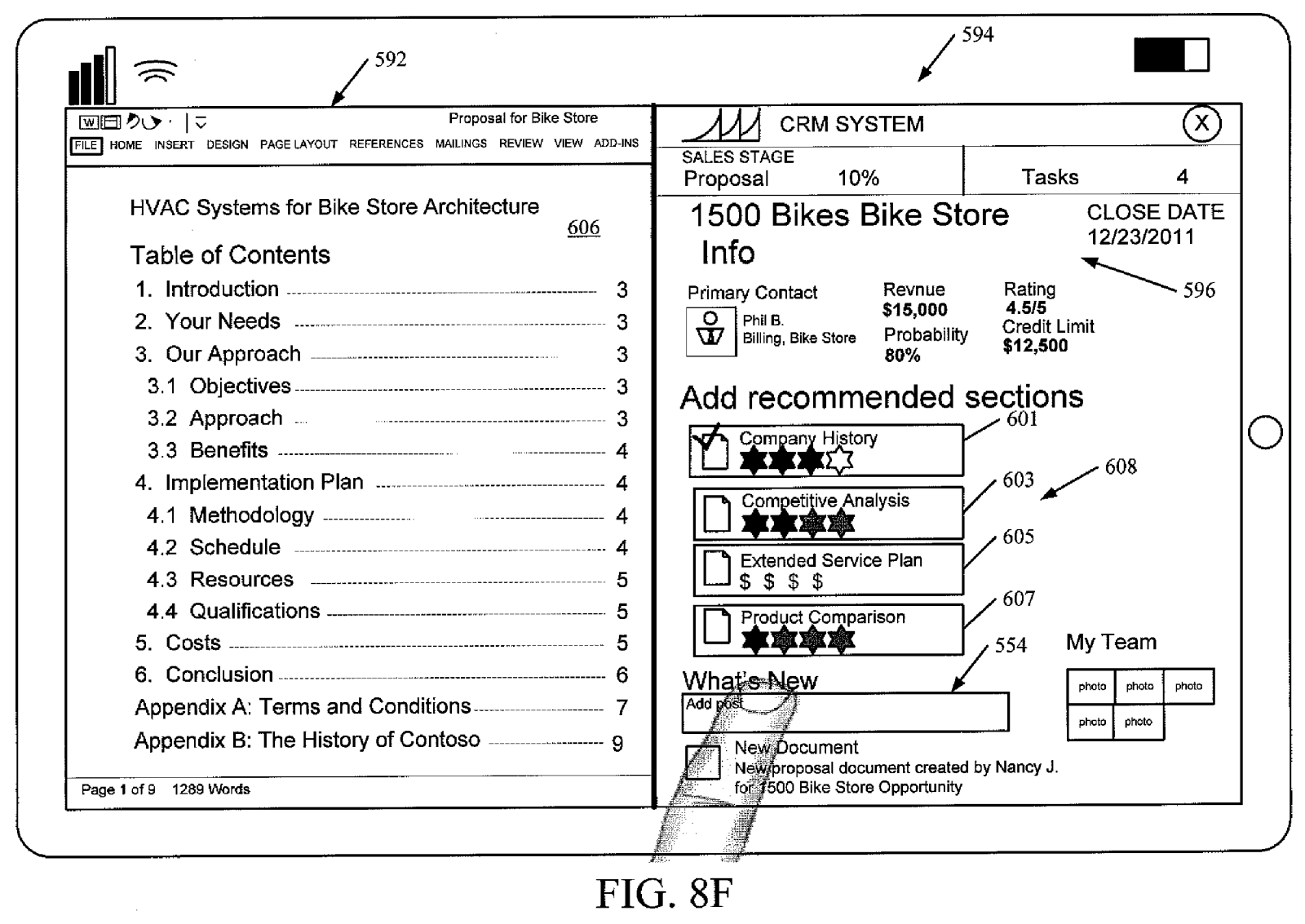

FIG. 8F shows a user interface display 606. User interface display 606 is similar to user interface display 600 shown in FIG. 8E, and similar items are similarly numbered. However, it can be seen in FIG. 8F that the document at 592 now includes a second appendix "Appendix B: The history of Contoso" which was automatically added by document management component 119 once the user added that section to the proposal by touching the add button 602 (shown in FIG. 8E). FIG. 8F also shows that the "company history" section 608 has a check mark next to it, indicating that it has been added to the proposal at 592.

Figure 8G:
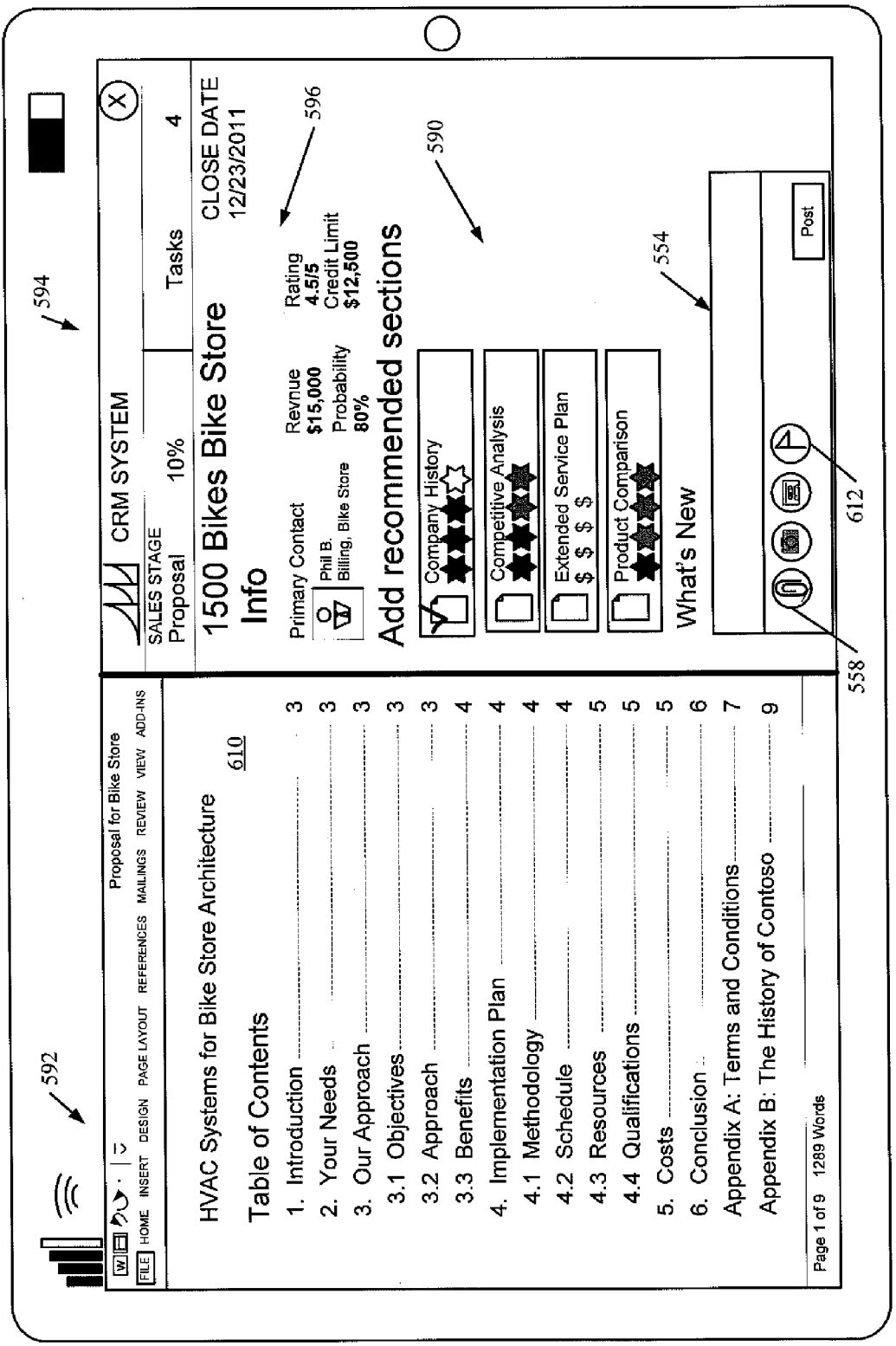

It can also be seen in FIG. 8F that the user has touched the "What's New" text box 554. This results in another user interface display. FIG. 8G shows a user interface display 610 which is similar to user interface display 606 shown in FIG. 8F, and similar items are similarly numbered. However, FIG. 8G shows that the dropdown menu containing a plurality of buttons (also seen in FIG. 8C) is shown. Among the buttons are the attachment button 558 which allows the user 108 to attach a document, as well as flag or follow-up button 612. Actuation of button 612 allows user 108 to set a follow-up right from the document wall section 594. FIG. 8H shows that the user has actuated the follow-up button 612 and has also entered text directed at an individual (Ted C.).

Figure 8I:
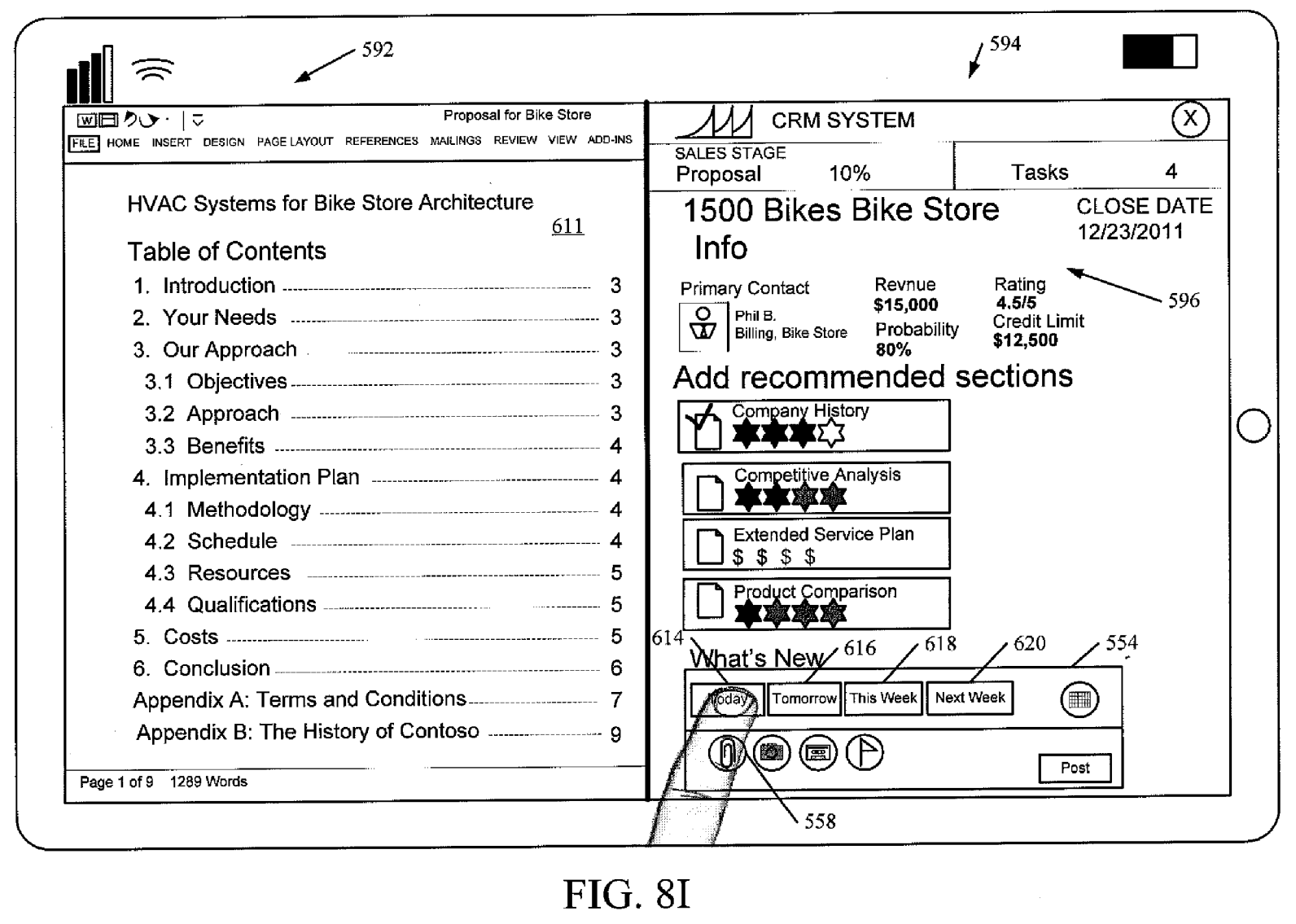

FIG. 8I shows another user interface display 611 which results from the user actuating the follow-up button 612. Follow-up component 120 generates the user interface display 611 shown in FIG. 8I which allows the user to set a time period for the follow-up. The time periods shown in FIG. 8I are each associated with a user actuatable button. The buttons include a today button 614, a tomorrow button 616, a this week button 618 and a next week button 620. The buttons, when actuated, indicate when the follow-up is to be sent to the individual identified at 554 in FIG. 8H. FIG. 8I also shows that the user has selected the "today" button 614.

Figure 8J:
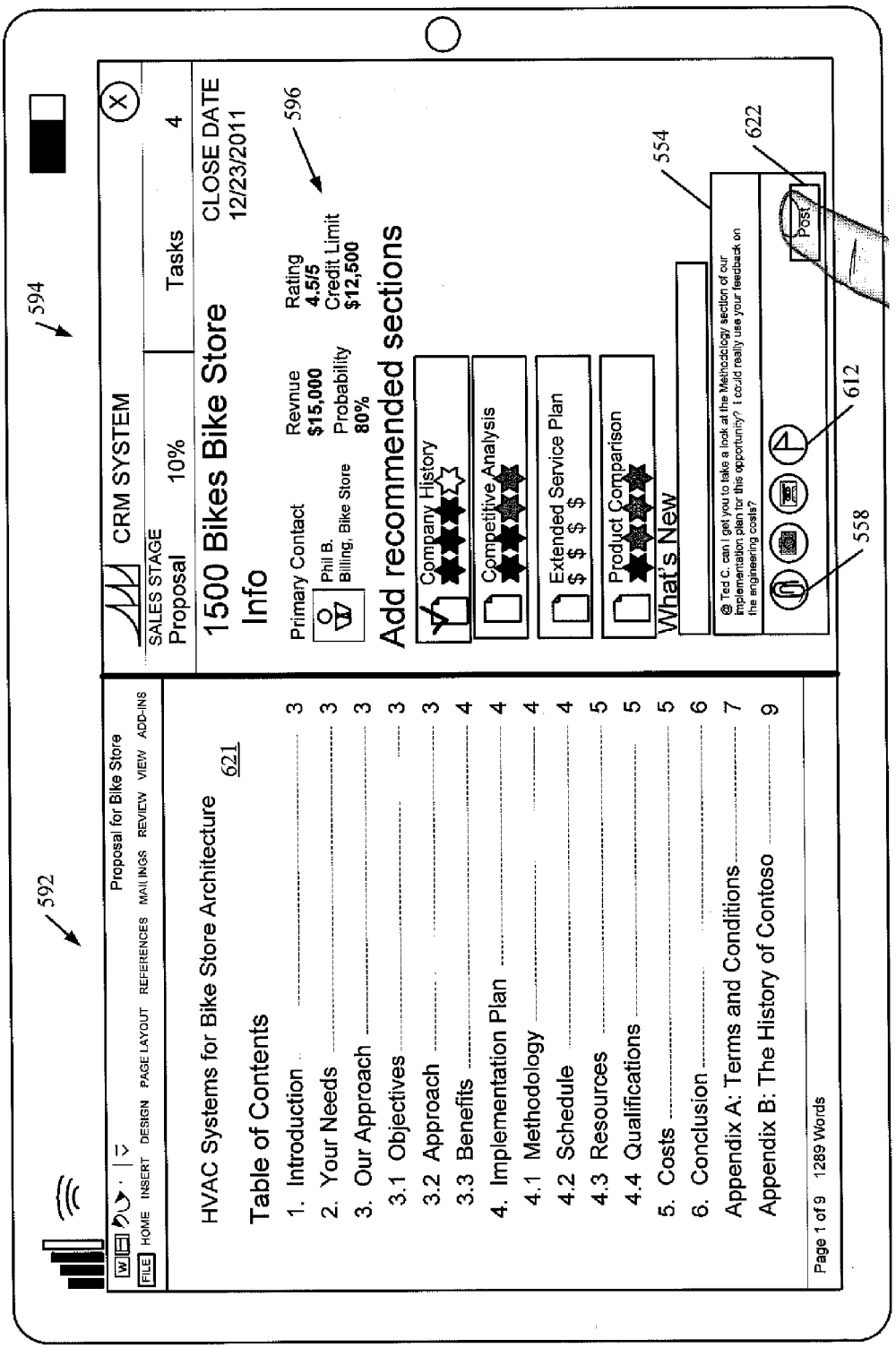
Figure 8K:
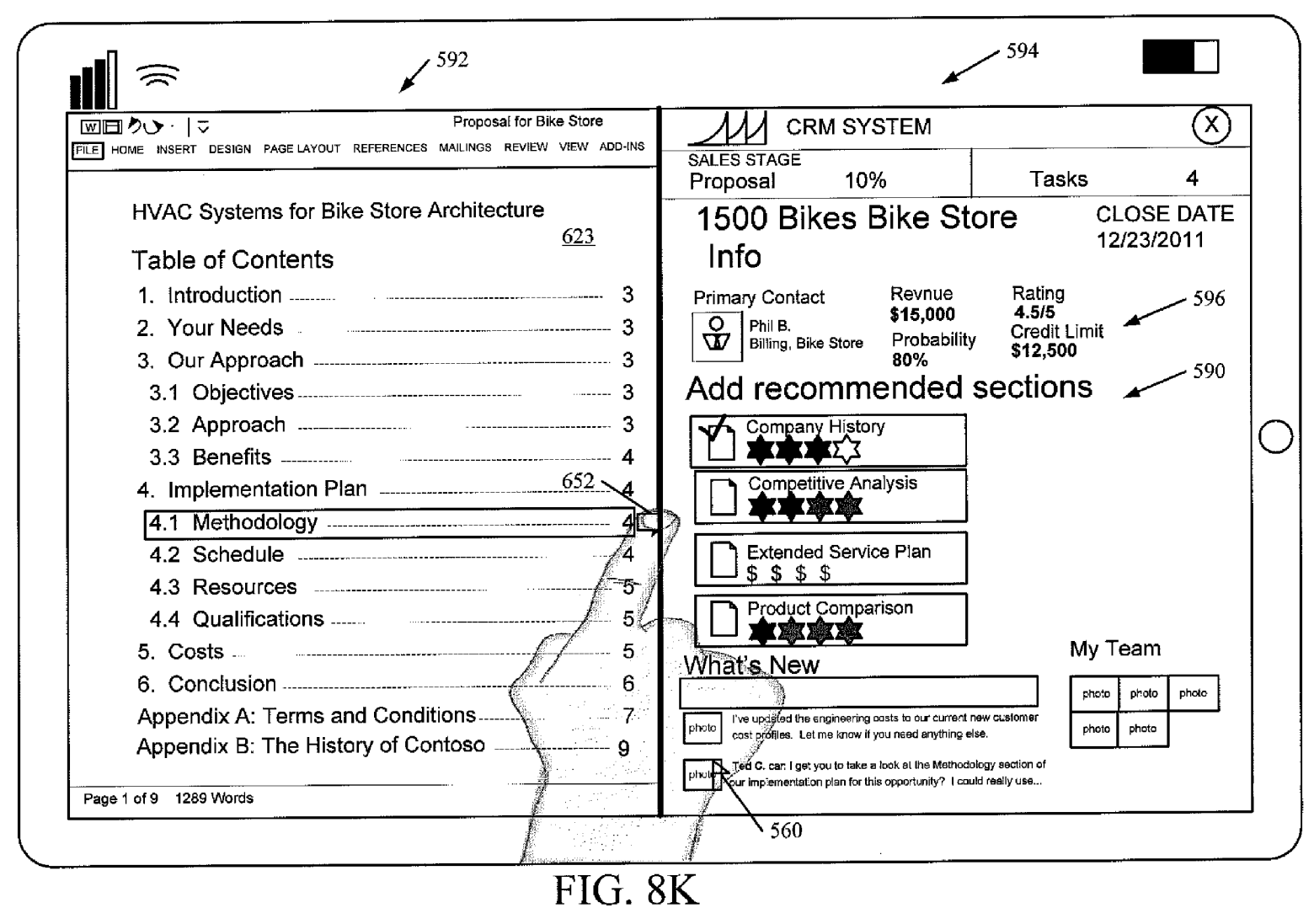

FIG. 8J shows another user interface display 621 in which the user is actuating the "post" button 622. This causes the message typed in text box 554 to be posted under the "what's new" section on the wall 594. FIG. 8K shows user interface display 623 that illustrates this. It can be seen that the post that was written by the user and had a follow-up placed on it is now displayed as the second message under the what's new section, and the flagged display 650 indicates that a follow-up is required by another individual.

FIG. 8K also shows that the recipient of the follow-up has commented on the section referred to therein. That is, the follow-up asks Ted C. if he can look at the methodology section of the proposal. Ted C. has then responded (under the what's new section) that he has updated the engineering costs, etc. When that happens, a message indicator 652 is displayed adjacent the "methodology" section of the proposal. FIG. 8K shows that the user is actuating the message indicator 652.

Figure 8L:
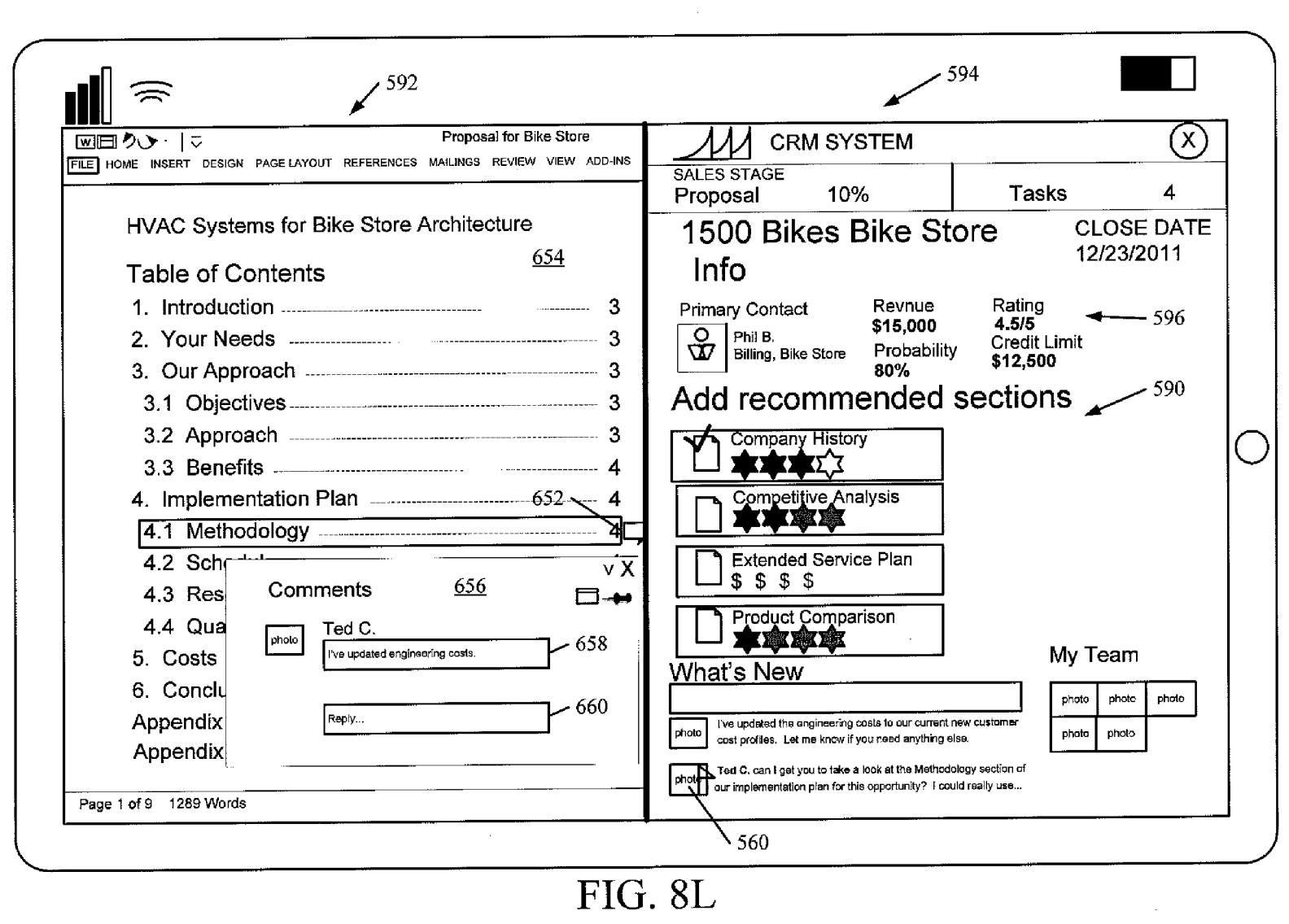

FIG. 8L shows a user interface display 654 that is generated when user 108 actuates message indicator 652. It can be seen that an instant messaging box 656 is displayed. The message from Ted C. is shown in text box 658. A reply text box 660 is also displayed where the user can reply. In doing so, the user can simply touch box 660 and the virtual or soft keyboard is displayed so the user can type a message and send it back to Ted C.

Figure 8M:
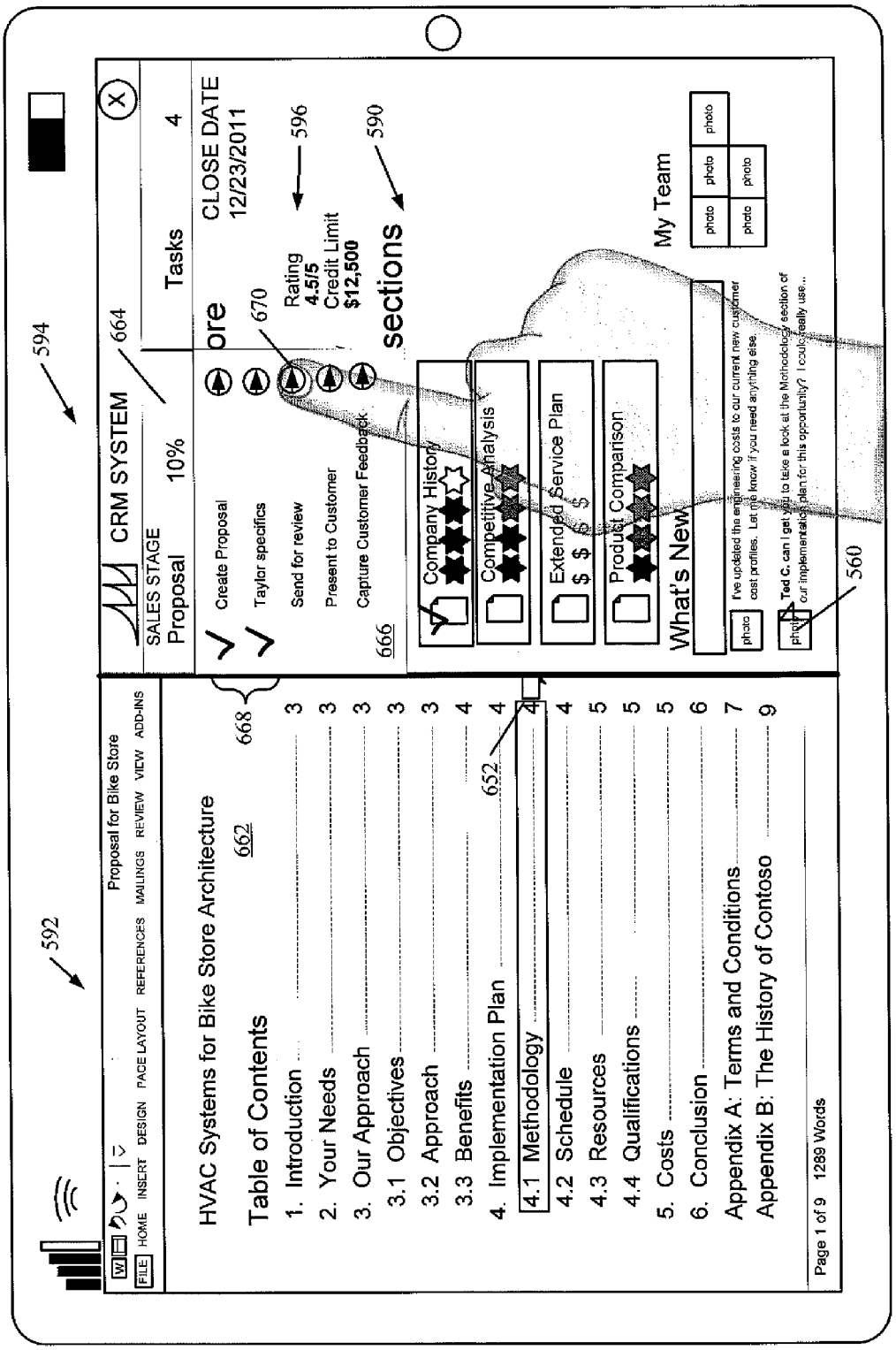

FIG. 8M shows another user interface display 662. In user interface display 662, the user has touched the proposal button 664 and a dropdown menu 666 is displayed with a plurality of different tasks. The tasks shown include "create proposal", "tailor specifics", "send for review", "present to customer", and "capture customer feedback". It can be seen that check marks 668 show that the first two items in dropdown menu 666 have been completed and the user is touching an actuatable button 670 to send the proposal for review.

Figure 8N:
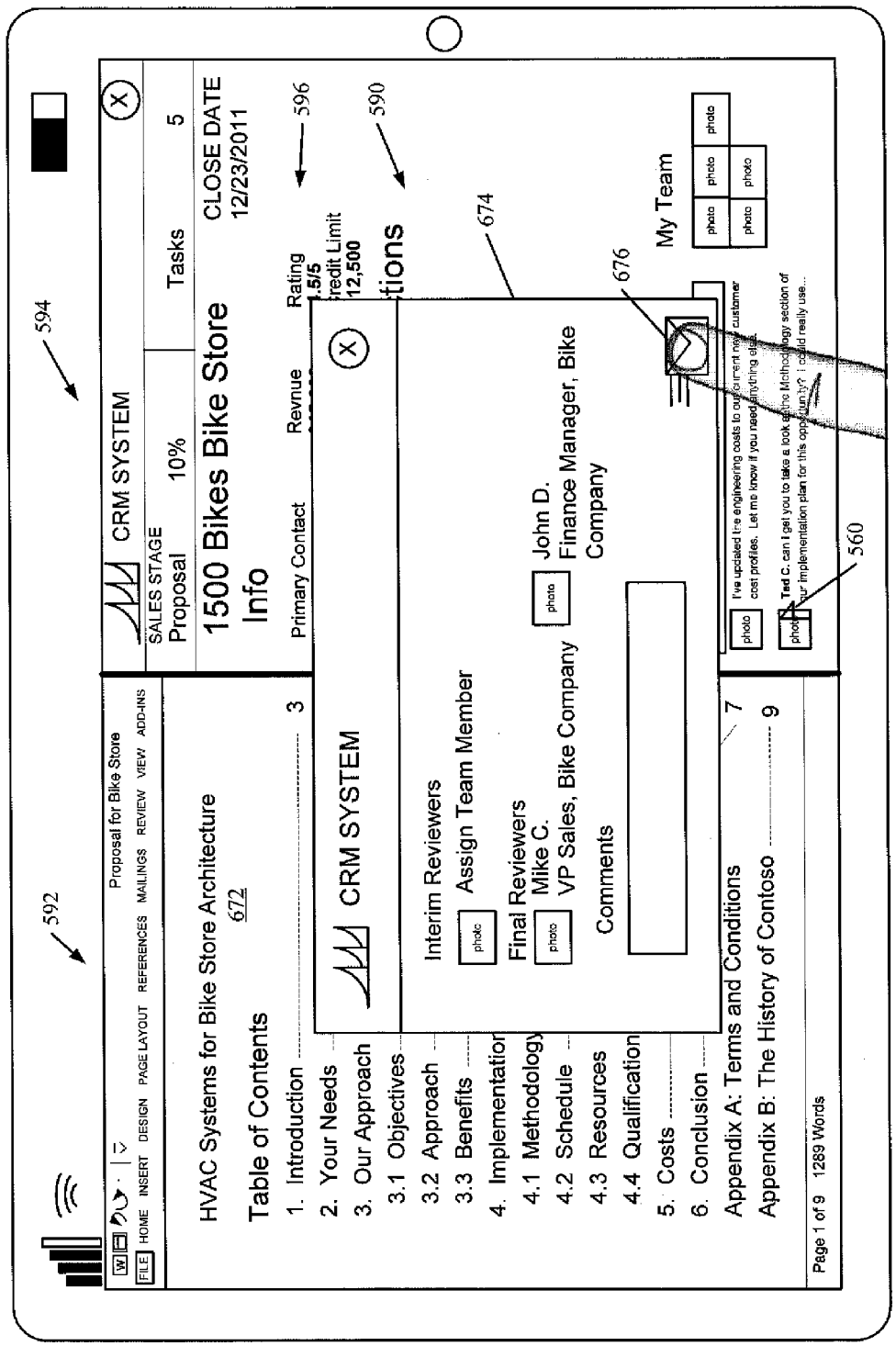
Figure 80:
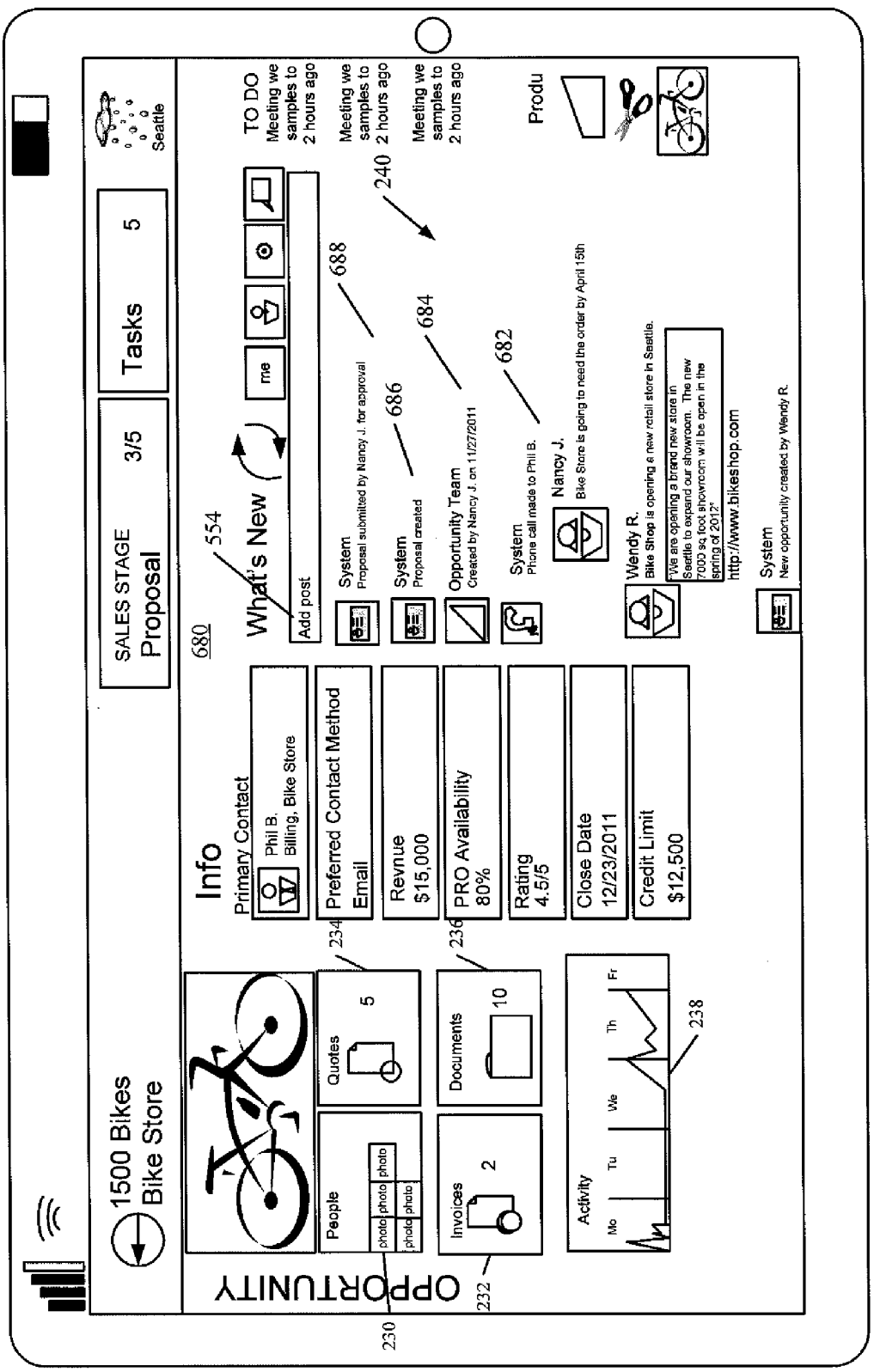

FIG. 8N shows a user interface display 672 in which popup menu (or popup display) 674 is displayed allowing user 108 to send the proposal for review. Popup display 674 shows an example where both interim reviewers and final reviewers can be selected. It can be seen that an interim reviewer has not yet been assigned. However, two final reviewers have been assigned. Therefore, when the user touches the send button 676, the proposal is sent to the final reviewers. Once this is complete, the user can return to the main user interface display for the opportunity data record.

FIG. 8O shows one embodiment of a user interface display 680. The user interface display 680 is similar to user interface display 228 shown in FIG. 3C, and similar items are similarly numbered. However, it can be seen that the "what's new" section has now been updated to reflect a number of the tasks that have been performed. For instance at 682 the section shows that a phone call was made to the primary contact, Phil B. At 684 it shows that the opportunity team was created. At 686, the section illustrates that the proposal was created, and at 688, the section indicates that the proposal was submitted for review or approval.

It will be noted that the tasks, operations, and workflows discussed herein are exemplary only. It will also be noted that the user interface displays are exemplary as well. It can be seen, however, that the user 108 can perform a variety of different workflows, operations and tasks within the business data system (e.g., the CRM system 100) using only touch gestures or touch inputs. It also allows the user to conduct work from a device that has a touch sensitive display. This can enhance productivity and reduce the cumbersome and time consuming nature of using other types of user input mechanisms.

FIG. 9 is a block diagram of system 100, shown in FIG. 1, except that it is disposed in a cloud computing architecture 700. Cloud computing provides computation, software, data access, and storage services that do not require end-user knowledge of the physical location or configuration of the system that delivers the services. In various embodiments, cloud computing delivers the services over a wide area network, such as the interne, using appropriate protocols. For instance, cloud computing providers deliver applications over a wide area network and they can be accessed through a web browser or any other computing component. Software or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 9 some items are similar to those shown in FIG. 1 and they are similarly numbered. FIG. 9 specifically shows that CRM system 100 (or, of course, another business data system such as an ERP system, LOB application, etc.) is located in cloud 702 (which can be public, private, or a combination where portions are public while others are private). Therefore, user 108 uses a user device 104 to access those systems through cloud 702.

FIG. 9 also depicts another embodiment of a cloud architecture. FIG. 9 shows that it is also contemplated that some elements of business system 100 (or architecture 90) are disposed in cloud 702 while others are not. By way of example, data store 102 can be disposed inside of cloud 702 (with CRM system 100) or outside of cloud 702, and accessed through cloud 702. In another embodiment, communication component 114 is also outside of cloud 702. Regardless of where they are located, they can be accessed directly by device 104, through a network (either a wide area network or a local area network), they can be hosted at a remote site by a service, or they can be provided as a service through a cloud or accessed by a connection service that resides in the cloud. All of these architectures are contemplated herein.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
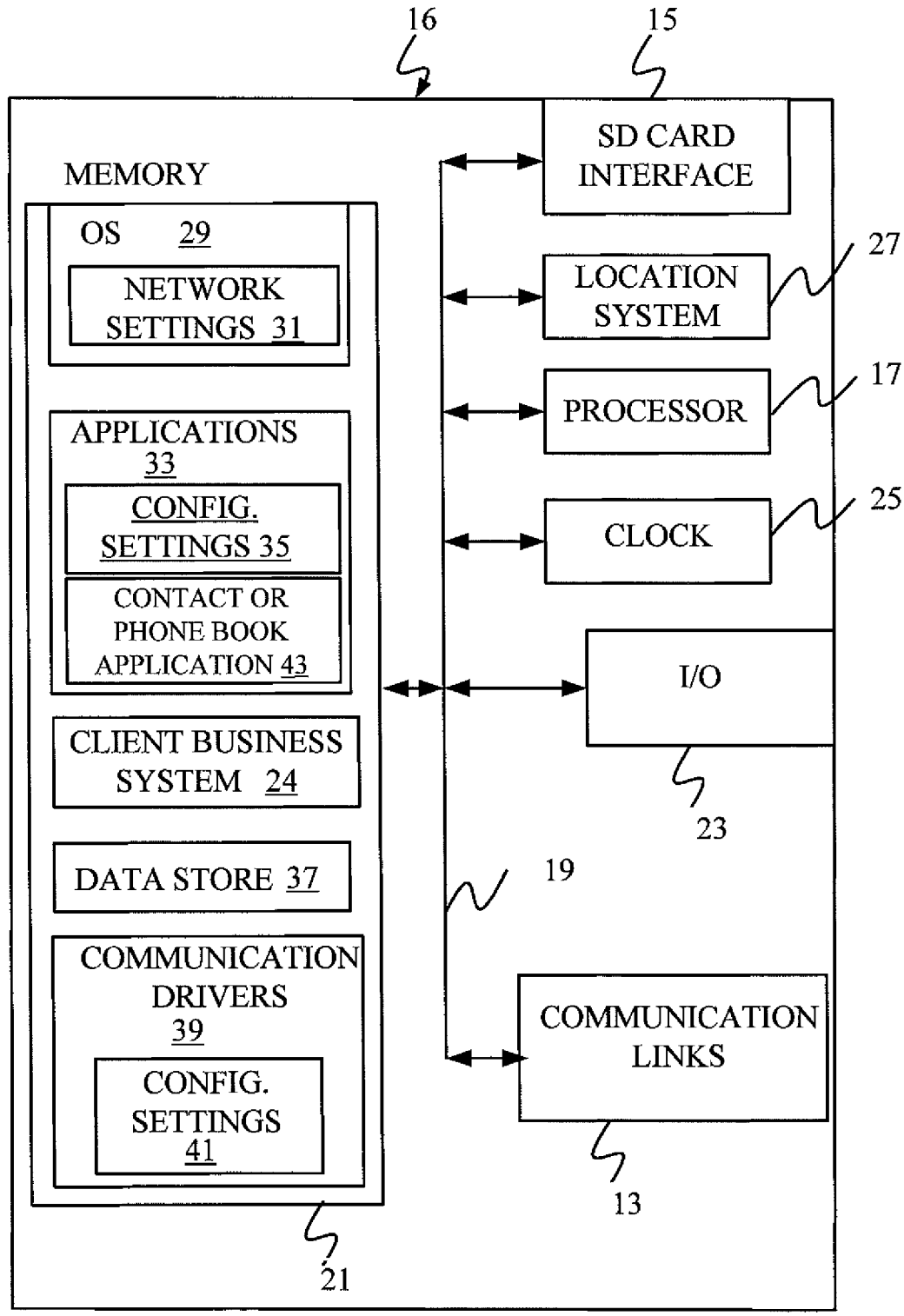
FIGS. 10-14 illustrate various mobile devices.

FIG. 10 is a simplified block diagram of one illustrative embodiment of a handheld or mobile computing device that can be used as a user's or client's hand held device 16 (e.g., device 104), in which the present system (or parts of it) can be deployed. FIGS. 10-14 are examples of handheld or mobile devices.

FIG. 10 provides a general block diagram of the components of a client device 16 that can run components of system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like system 100) are received on a removable Secure Digital (SD) card that is connected to a SD card interface 15. SD card interface 15 and communication links 13 communicate with a processor 17 (which can also embody processor 146 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. System 100 or the items in data store 102, for example, can reside in memory 21. Similarly, device 16 can have a client business system 24 (e.g., client CRM system 144) which can run various business applications or embody parts or all of business system 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 11:
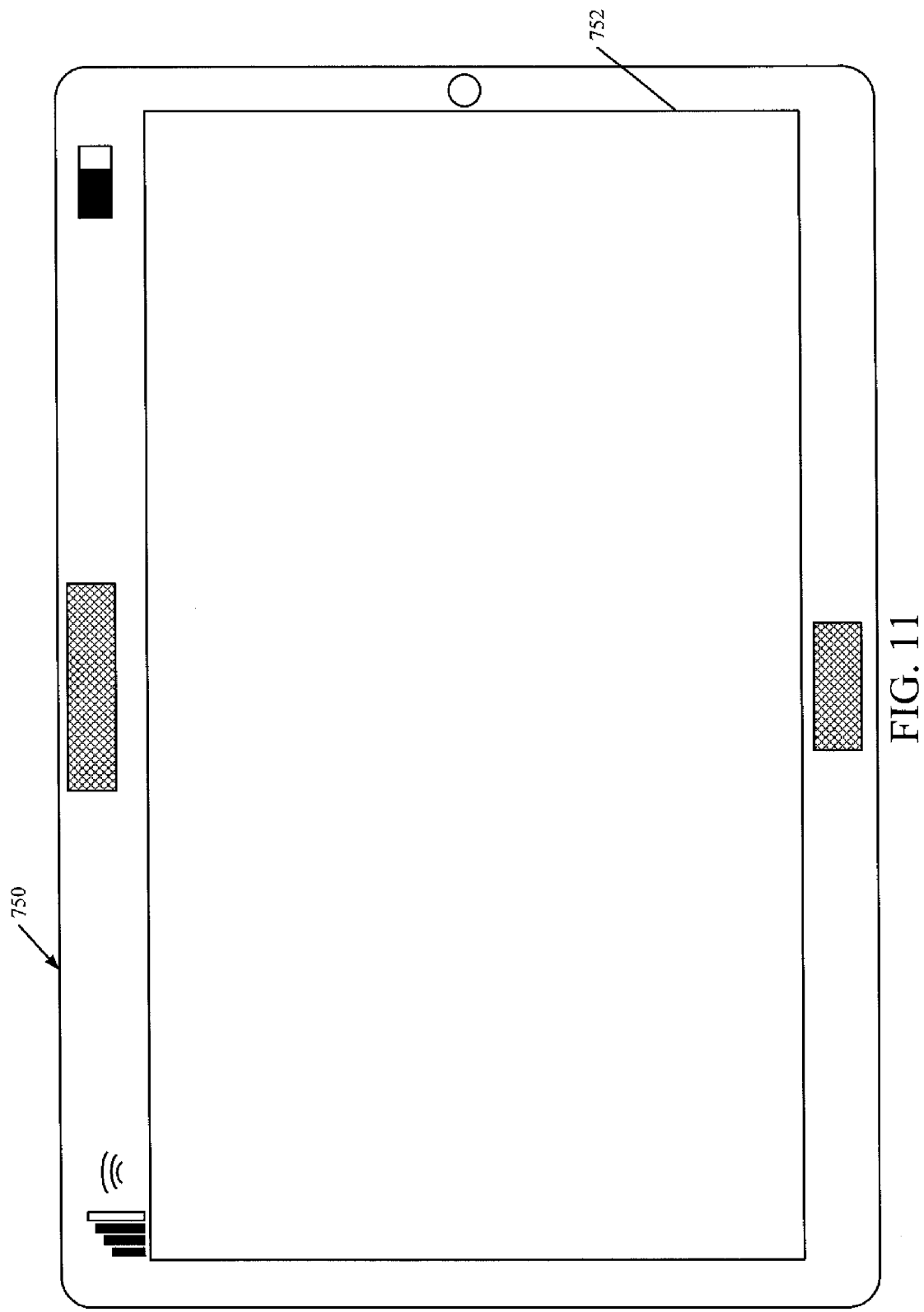

FIG. 11 shows one embodiment in which device 16 is a tablet computer 750 (also shown in FIGS. having illustrative displays discussed above). Screen 752 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 750 can also illustratively receive voice inputs as well.

Figure 12:
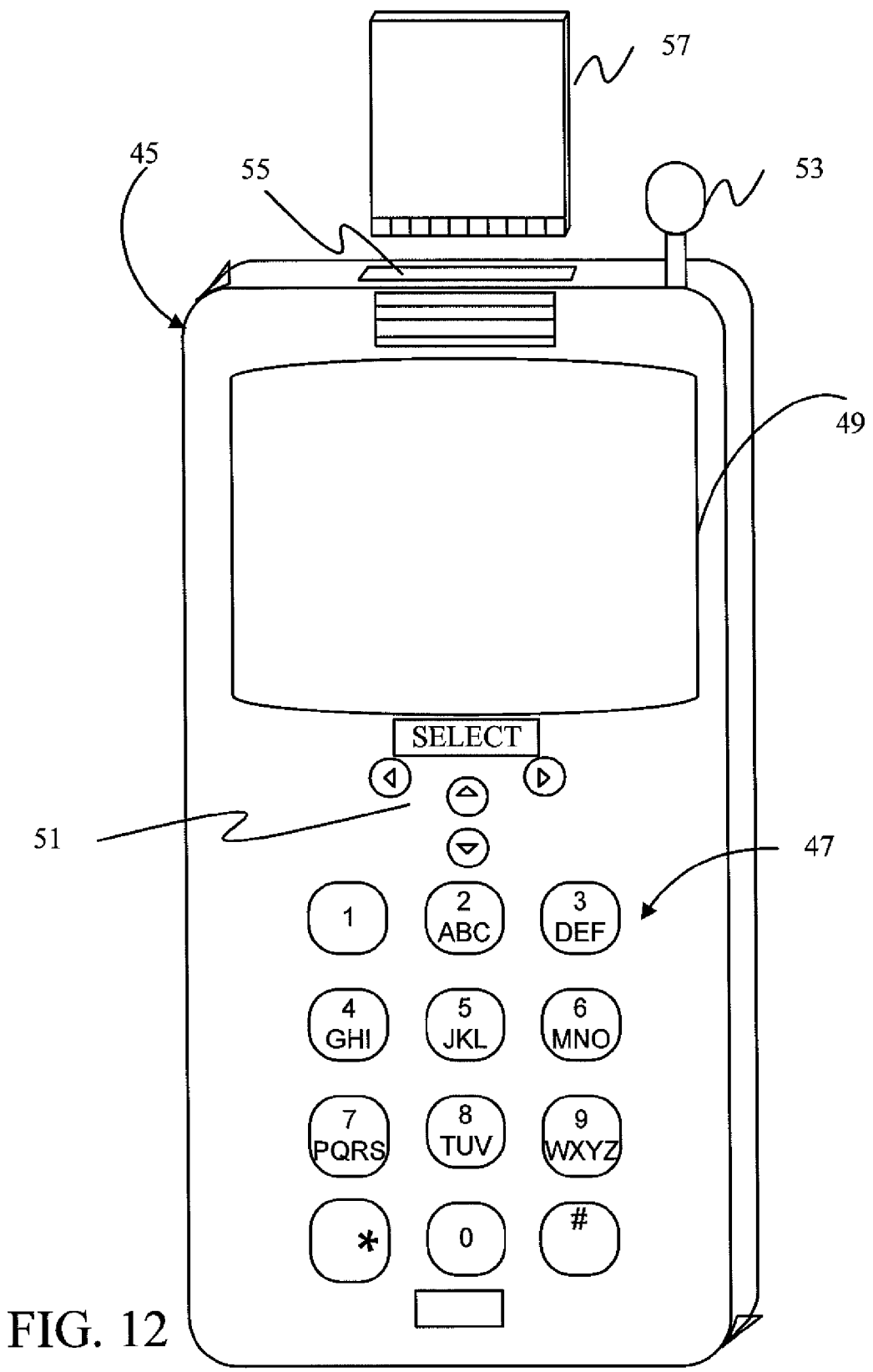
Figure 13:
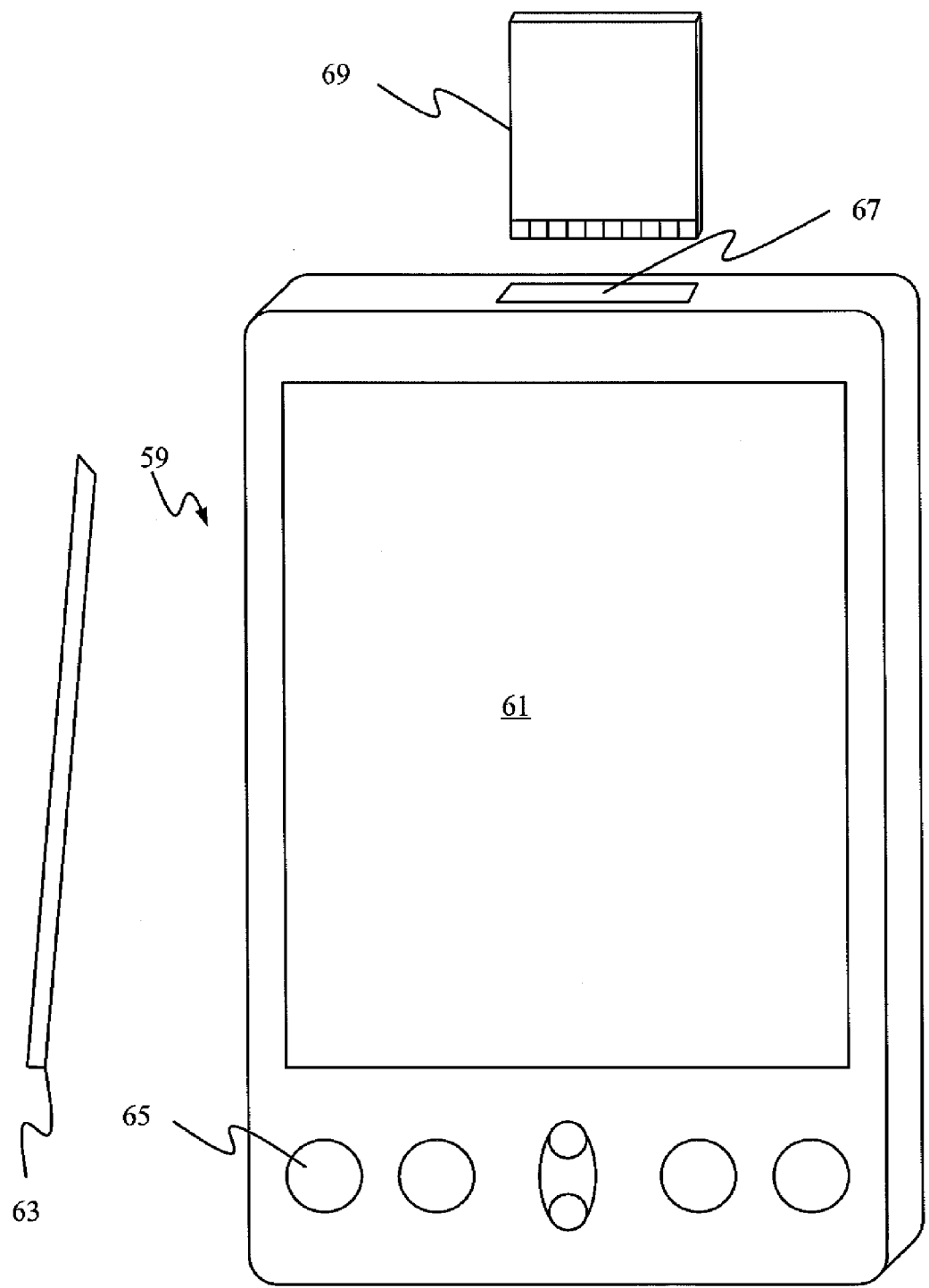
Figure 14:
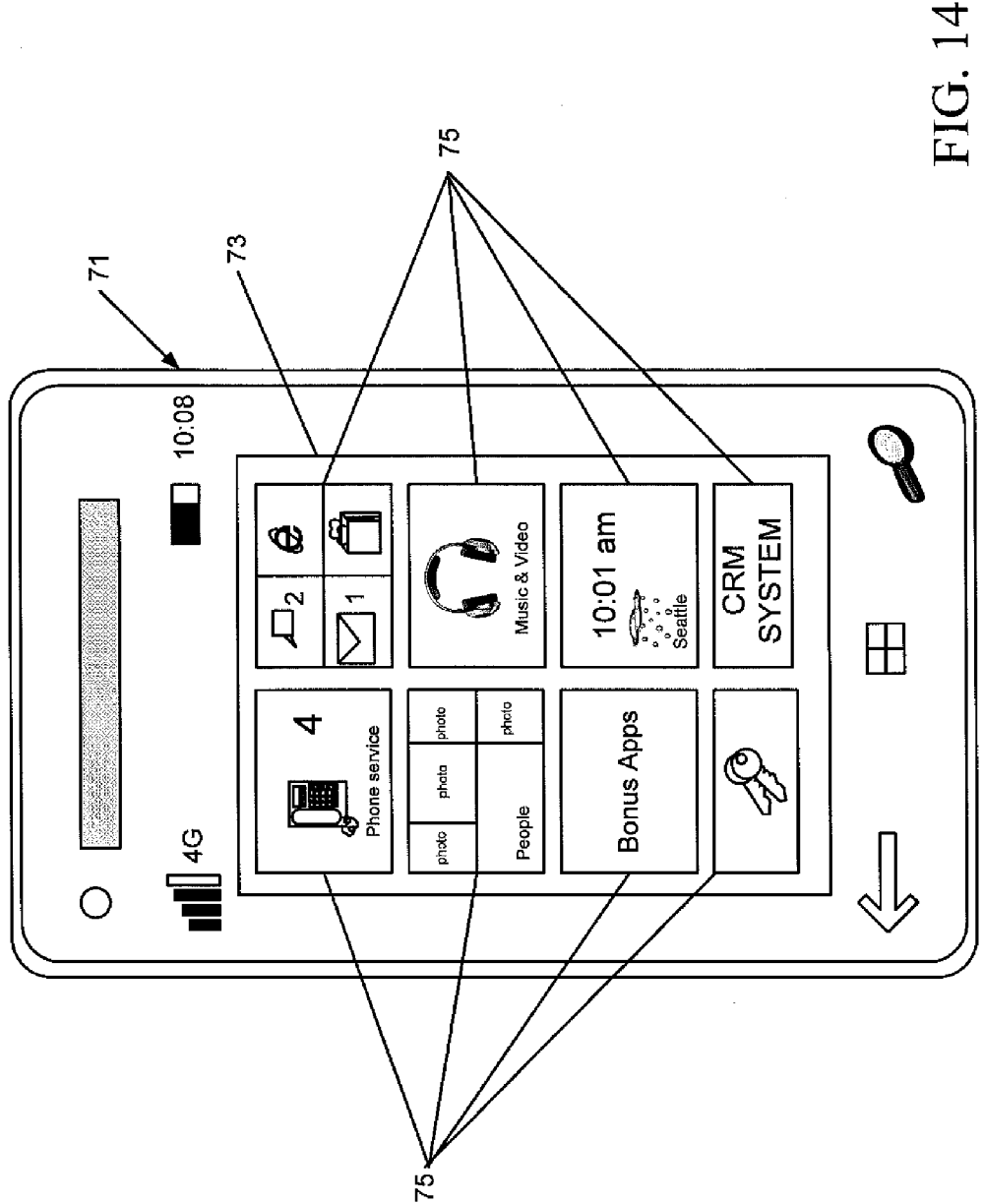

FIGS. 12, 13 and 14 provide additional examples of devices 16 that can be used, although others can be used as well. In FIG. 12, a mobile phone 45 (or feature phone) is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 13 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USE port. As such, these connections are non-network connections. In one embodiment, mobile device 59 also includes a SD card slot 67 that accepts a SD card 69.

FIG. 14 is similar to FIG. 13 except that the phone is a smart phone 71. Smart phone 71 has a touch sensitive display 73 that displays icons or tiles or other user input mechanisms 75. Mechanisms 75 can be used by a user to access a business data system (like CRM system 100) run applications, make calls, perform data transfer operations, etc. In general, smart phone 71 is built on a mobile operating system and offers more advanced computing capability and connectivity than a feature phone.

Note that other forms of the devices 16 are possible.

Figure 15:
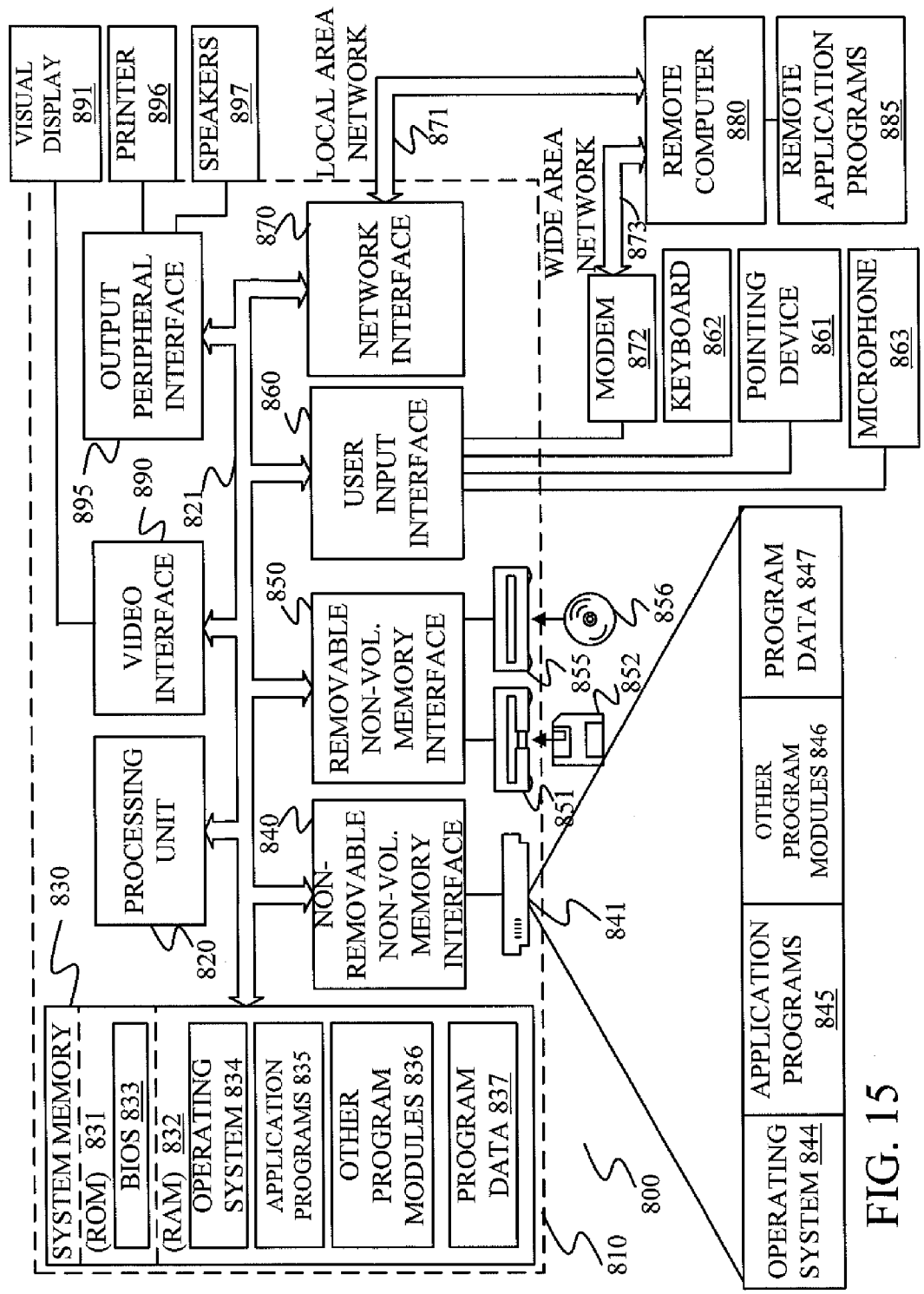
FIG. 15 is a block diagram of one illustrative computing environment.

FIG. 15 is one embodiment of a computing environment in which system 100 (for example) can be deployed. With reference to FIG. 15, an exemplary system for implementing some embodiments includes a general-purpose computing device in the form of a computer 810. Components of computer 810 may include, but are not limited to, a processing unit 820 (which can comprise processor 110 or 144), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 15.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 15 illustrates operating system 834, application programs 835, other program modules 836, and program data 837.

The computer 810 may also include other removable/non-removable volatile/nonvolatile computer storage media. By way of example only, FIG. 15 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 15, provide storage of computer readable instructions, data structures, program modules and other data for the computer 810. In FIG. 15, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 15 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 15 illustrates remote application programs 885 as residing on remote computer 880. It will be appreciated that the network connections shown are exemplary and other means of establishing a communications link between the computers may be used.

It should also be noted that features from different embodiments can be combined. That is, one or more features from one embodiment can be combined with one or more features of other embodiments. This is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   identifying a data record in a business data system, the business data system configured to perform a workflow on the data record;
   generating a representation of a user interface display that represents the data record and includes a document display pane that displays a document corresponding to the data record;
   identifying a data item based on the workflow;
   generating a representation of a touch-enabled actuator element on the user interface display, the touch-enabled actuator element representing a document edit operation that corresponds to the identified data item, the touch-enabled actuator element comprising:
      a visual border that distinguishes the touch-enabled actuator element from another user interface element on the user interface display;
      a first touch-enabled user input mechanism displayed within the visual border of the touch-enabled actuator element and comprising text that identifies the data item;
   receiving an indication of a first manipulation touch gesture that actuates the first touch-enabled user input mechanism;
   in response to the indication of the first manipulation touch gesture,
      generating a representation of a summary section on the user interface display that includes a visual indication of an effect of the document edit operation on the data record or workflow; and
      generating a second touch-enabled user input mechanism displayed within the visual border of the touch-enabled actuator element and visually associated with the first touch-enabled user input mechanism;
   receiving an indication of a second manipulation touch gesture that actuates the second touch-enabled user input mechanism;
   based on the indication of the second manipulation touch gesture, automatically performing the document edit operation to edit the document based on the data item, wherein performing the document edit operation comprises automatically adding the data item to the document in the document display pane; and
   modifying the representation of the touch-enabled actuator element to indicate that the document edit operation was performed on the document displayed in the document display pane.

2. The computer-implemented method of claim 1, comprising:
   identifying a plurality of different document manipulation operations; and
   generating a representation of a plurality of touch-enabled actuator elements on the user interface display, each of the touch-enabled actuator elements corresponding to one of the document manipulation operations and being actuatable to automatically perform the corresponding document manipulation operation.

3. The computer-implemented method of claim 1, wherein the business data system comprises at least one of a customer relations management (CRM) system or an enterprise resource planning (ERP) system.

4. The computer-implemented method of claim 1, further comprising:

identifying a plurality of different data items based on data in the business data system; and generating a representation of a plurality of touch-enabled actuator elements on the user interface display, each of the touch-enabled actuator elements corresponding to one of the different data items and comprising:

a visual border that distinguishes the touch-enabled actuator element from another user interface element on the user interface display;

a first touch-enabled user input mechanism displayed within the visual border of the touch-enabled actuator element and comprising text that identifies the data item, wherein the first touch-enabled user input mechanism is actuatable to generate a representation of a summary section on the user interface display and to generate a second touch-enabled user input mechanism displayed within the visual border of the touch-enabled actuator element and visually associated with the first touch-enabled user input mechanism, the second touch-enabled user input mechanism being actuatable to automatically add the corresponding data item to the document.

5. The computer-implemented method of claim 1 and further comprising:

generating a representation of a touch-sensitive keyboard on the user interface display; and receiving an indication of a keyboard touch gesture on the touch-sensitive keyboard to edit the document.

6. The computer-implemented method of claim 1, and further comprising:

receiving an indication of a communication touch input from a user;

based on the indication of the communication touch input, identifying another user and generating a communication to the other user regarding the document;

posting the communication to a communication channel;

updating the representation of the user interface display to indicate that the communication has been posted to the communication channel;

receiving an indication of a response to the communication from the other user; and updating the representation of the user interface display to display the response in the communication display pane.

7. The computer-implemented method of 6, wherein the indication of the response comprises a user-actuatable input mechanism that is actuatable to display the response from the other user.

8. The computer-implemented method of claim 7, and further comprising:

updating the representation of the user interface display to include a flag proximate the post indicating a relative importance of the post to other posts.

9. The computer-implemented method of claim 8, wherein the flag is indicative of a user-defined follow-up related to the post, and the method comprises sending the follow-up to the other user.

10. The computer-implemented method of claim 9, and further comprising:

updating the representation of the user interface display to include a touch-enabled time definition user input mechanism that receives a user touch input that defines a time for the follow-up.

11. The computer-implemented method of claim 10, and further comprising:

attaching the document to the communication and send the communication with the attached document to the other user.

12. A computing system comprising:

a processor; and memory storing instructions executable by the processor, wherein the instructions configure the computing system to:

identify a data record in a business data system, the business data system configured to perform a workflow on the data record;

generate a representation of a user interface display that represents the data record and includes a document display pane that displays a document corresponding to the data record;

identify a data item based on the workflow;

generate a representation of a touch-enabled actuator element on the user interface display, the touch-enabled actuator element representing a document edit operation to add the identified data item to the document, the touch-enabled actuator element comprising:

a visual border that distinguishes the touch-enabled actuator element from another user interface element on the user interface display;

a first touch-enabled user input mechanism displayed within the visual border of the touch-enabled actuator element and comprising text that identifies the data item;

receive an indication of a first manipulation touch gesture that actuates the first touch-enabled user input mechanism;

in response to the indication of the first manipulation touch gesture, generate a representation of a summary section on the user interface display that includes a visual indication of an effect of adding the data item to the document; and generate a second touch-enabled user input mechanism displayed within the visual border of the touch-enabled actuator element and visually associated with the first touch-enabled user input mechanism;

receive an indication of a second manipulation touch gesture that actuates the second touch-enabled user input mechanism;

based on the indication of the second manipulation touch gesture, automatically perform the document edit operation to add the data item to the document displayed in the document display pane; and modify the representation of the touch-enabled actuator element to indicate that the document edit operation was performed.

13. The computing system of claim 12, wherein the business data system comprises at least one of a customer relations management (CRM) system or an enterprise resource planning (ERP) system.

14. The computing system of claim 12, wherein the instructions configure the computing system to:

identify a plurality of different data items based on data in the business data system; and generate a representation of a plurality of touch-enabled actuator elements on the user interface display, each of the touch-enabled actuator elements corresponding to one of the different data items and being actuatable to automatically add the corresponding data item to the document.

* * * * *